United States Patent

[11] 3,585,599

[72] Inventors Donald C. Hitt
Wappingers Falls, N.Y.;
Robert J. Woessner, Stewartville, Minn.

[21] Appl. No. 743,567
[22] Filed July 9, 1968
[45] Patented June 15, 1971
[73] Assignee International Business Machines Corporation
Armonk, N.Y.

[54] UNIVERSAL SYSTEM SERVICE ADAPTER
32 Claims, 53 Drawing Figs.

[52] U.S. Cl. .......... 340/172.5
[51] Int. Cl. .......... G06f 11/00
[50] Field of Search .......... 340/172.5, 146.1, 149; 235/157, 153; 324/73

[56] References Cited

UNITED STATES PATENTS

| | | | |
|---|---|---|---|
| 3,219,927 | 11/1965 | Topp et al. | 324/73 |
| 3,237,100 | 2/1966 | Chalfin et al. | 340/172.5 X |
| 3,343,141 | 9/1967 | Hackl | 340/172.5 |
| 3,405,258 | 10/1968 | Godoy et al. | 340/172.5 X |
| 3,380,033 | 4/1968 | Cerny | 340/172.5 |
| 3,387,276 | 6/1968 | Reichow | 340/172.5 |
| 3,497,685 | 2/1970 | Stafford et al. | 235/153 |

*Primary Examiner*—Paul J. Henon
*Assistant Examiner*—Sydney Chirlin
*Attorneys*—Hanifin and Jancin and Robert Lieber

ABSTRACT: A universal adapter provides a standard interface to external equipment for testing and generally communicating with a data processing system. Linking main control elements of the system with diverse external test equipment, through a bit-serial binary communication terminal, the adapter provides a basis for testing the system while the latter is in a stopped or disabled condition. Responses to tests are sensed by the adapter through comparisons of selected status signals obtained from the system with predetermined reference signals furnished by the external test equipment. The adapter also cooperates with special monitoring circuits to selectively monitor and transmit to the external equipment signals representing internal system status. These signals are recorded and/or analyzed at the external equipment.

INVENTORS
DONALD C. HITT
ROBERT J. WOESSNER
BY Robert Lieber
ATTORNEY

SYSTEM TIMING

CPU/ROS (EXPANDED SCALE)

LOCAL STORES

MAIN STORE/ SUBSIDIARY STORE

CONSOLE UNIT (MONITOR FUNCTION)

SERAD RECEIVING OPERATIONS

* NOTE: SERAD MODE IS TURNED BACK ON BY
1. CPU DETECTED ERROR IN REMOTE MODE
2. MICRO-PROGRAM CODE POINT FROM NORMAL ROS
3. CYCLE COUNTER=0
4. RESET COMMAND FROM SERAD
5. MANUAL RESET BUTTON

SERAD "DATA" INPUT TO SYS (VIA E-SWITCH UNDER SYS MICRO-PROGRAM ROSDR CONTROL

LOG TRANSMIT OPERATION

NOTE 1. THE FILE OPERATION MAY ALSO BE STARTED BY A ROSDR CODE POINT WHICH SETS THE TRACK AND SECTOR COUNTER FROM THE CPU Z BUS (BYTE 0).

NOTE 2. THE FILE OPERATION MAY BE STOPPED & THE HEAD DIS-ENGAGED BY A SERAD ERROR STOP OR BY A ROSDR (Y PROGRAM) CODE POINT.

UNIVERSAL SYSTEM SERVICE ADAPTER

BACKGROUND OF THE INVENTION

1. Field of the Invention

Testing of data-handling apparatus.

2. Description of the Prior Art

Pat. Nos. such as 3,325,788 and 3,343,141, both to F. J. Hackl and both assigned to the assignee of this application, disclose a data processing system which is capable of automatically testing itself under internal stored program control. However, before a test program can be loaded into internal (main) storage, it is necessary to have operational in the system a substantial portion of the system input channel circuitry, data handling circuitry, clocking circuitry and practically the entire internal store. Then before a loaded test program can be executed it is necessary to have operational the output gating circuit of the internal store. In contrast the present adapter is able to operate virtually independent of the system being tested, under external control, to test and verify the status of discrete elements of the system while the system is in a passive or stopped condition.

The present adapter includes a nucleus of test control circuits and response evaluation circuits which is more compact and more adaptable to external control than earlier arrangements. Thus, verification of the operational status of the adapter itself is simplified. The adapter, as compared to the known art, accomplishes its testing function with notably few connections to the system under test.

Art exemplified by U.S. Pat. No. 3,219,927, contemplates specialized test equipment packaged in a physically separate unit package with specialized connections to the system under test. Testers of this type, however, are too costly and too specialized for general usage; e.g. for alternate use at manufacturing sites or field locations. They require a specialized source of testing signals, such as a punch card operated programmer, and generally more complicated methods of sending test signals to the device under test and of conducting the actual test.

The present adapter is not subject to these disadvantages being designed for inclusion as an element of a general purpose system with specific emphasis on adaptability and compactness. For adaptability, the present adapter is arranged to communicate with a variety of external devices through its standardized bit-serial binary communication terminal. Thus the external device and adapter may even communicate over long distances through radio or telephone channels.

Earlier data processing systems have included log-out facilities for collecting status signal indications from numerous registers, status triggers and other important elements of the system. Such status would be collected in internal (main) storage for visual presentation on a display panel and, in many instances, for transmission to peripheral equipment for external logging (recording). Such transmission normally is carried out through the established input/output circuit paths and relies therefore on the operability of circuits in such paths. The present invention improves upon the organization of this status signal collection and external transmission function.

A preferred embodiment of a system incorporating the invention, which is described herein, makes extensive use of the so-called Large Scale Integrated (LSI) circuit technology. Large numbers of basic circuits (e.g. ANDS, ORS, Triggers, etc.), together with their interconnecting wires, are integrally packaged in printed circuit units (e.g. boards). Connections between units are made through pin terminations on the unit package and connecting lines between packages. The connecting lines may be printed on a plug-in hub into which the unit packages are plugged. The density and spacing of pin terminations on the unit packages is critical to effective system construction and usage.

In recognition of this the present invention seeks to ease the external pin termination burden imposed by the test and monitoring functions on the unit circuit packages of other system functions. Thus, circuit portions of the facility for collecting status signals are spatially associated with the system circuit from which the status signals are collected, and portions of the switching logic for transferring test control signals from the adapter to internal control elements of the system are similarly packaged in intimate spatial association with system circuits incorporating the control elements.

In the prior art it is customary to test a system by applying desired state signals as inputs to individual bistable elements under test and thereafter examining states of such elements individually after causing the system to operate for a predetermined number of basic operating cycles.

This generally involves provision of an appreciable number of connections between the testing equipment and the system under test. A notable exception to this is described in copending Pat. application Ser. No. 506,204, on behalf of T. S. Stafford et al. filed on Nov. 3, 1965, now U.S. Pat. No. 3,497,685 and assigned to the assignee of the present application. In said application numerous signals transferred through relatively few physical connections enable one system to operate another relatively asynchronous system and recover information from the other system from which it is possible to determine the locations of faults within reduced circuit portions of the other system. This invention seeks to improve upon such techniques by providing testing connections from external test equipment only to a small subset of the set of all circuit elements to be tested and response evaluating connections in the reverse direction only from another small subset of the system under test to external test equipment.

The test receiving subset includes key micro-operation control elements of the system under test. Emit field connections from such key control elements to other elements of the system, enable the system to propagate test conditions under internal control, to the other elements of the total set.

In earlier systems testing of the console unit housing the external panel indicators and manual controls of the system has generally been accomplished manually. In the present invention connections from the test adapter to a buffer register which is strategically positioned in multiple signal paths of the console unit enable the adapter to test substantially all elements of the console unit, and the associated status collection circuit elements spatially integrated in the system, with little increase in the basic cost of the adapter.

For manufacturing tests, design evaluation tests or field diagnostic tests of a complex nature, the adapter communicates with sophisticated external test equipment such as a remote master processor. Such equipment sends its testing signals through the adapter to the system and indicator console unit, and receives status logs from the console unit via the adapter for permanent recording and/or analysis. Analysis is by programs which form no part of the present invention, and therefore will not be described in detail herein. Signaling between test equipment and adapter is conducted, through a binary communication terminal coupled to the adapter, in a standard bit-serial nine-element binary code communication system. Start and stop elements added to each nine-element transmission code group synchronize the reception of the group.

For basic field tests a relatively inexpensive Load Diagnostic (LD) disc drive unit is provided locally at the site of the system being tested. This unit permits playback at the system site of basic test programs prerecorded on magnetic disc records. Arrangement of such records in the above-mentioned bit-serial nine-element plus start-stop communication code format enables the adapter to receive the reproduced signals via its communication terminal with little additional connecting circuitry.

Signals from remote test equipment, or from local playback of prerecorded disc records on the LD unit, are assembled in buffer circuits in the adapter into a form suitable for controlling both the adapter and its host system under test to carry out desired testing and status log transmission functions.

SUMMARY

The adapter of this invention can:

a. Receive information from an external source and use a portion of such information to control itself and its host data processing system.

b. Receive information from an external source and, under control of its host system, transfer such information to registers of the host system.

c. Transmit system status information to an external device in accordance with instruction information received earlier from an external source.

d. Transmit system information (status or other) to an external device under control of the host system.

Subject adapter is organized to control diagnostic testing of itself and its host data processing system. Size, cost, and packaging advantages are achieved by efficient organizations of circuits in the adapter unit and in a console unit communicating with the adapter for system status monitoring and external transmission (log) functions. Input and feedback connections between the adapter and the system control elements are used quite effectively in testing the total system.

Externally, the adapter communicates, in a bit-serial nine-element plus start-stop binary code communication system, through wire or other suitable media, with a variety of test equipment both local (e.g. LD Disc File unit) and remote (e.g. a master processor). Thus a central computer in, for example, Chicago, may be used to test other computers throughout the state of Illinois.

Test control and status monitoring subsystems comprise LSI packages of gate circuits and associated gate selection control circuits integrated spatially with other LSI circuit packages of the host system. These integrated gate and gate selection circuits are controlled from the adapter and from the indicator console unit of the system. The status monitoring subsystem incorporated in the console unit collects status log signals for: indication on console indicator lights, temporary storage in the console unit, and external transmission through the adapter (for remote recording and/or analysis). Redundant parity check information developed in the console unit is buffered and transmitted separately to aid in distinguishing console unit faults from other system faults.

In accordance with the foregoing, some of the general objects of the invention are:

To provide a universal test adapter linking external equipment, either remote or local, to a data processing system for conducting tests of the system;

To provide a universal adapter for data processor tests which has economical and simple construction;

To provide such an adapter having relatively few direct input connections to the system under test and output status monitoring connections from the system;

To provide such an adapter with the facility to communicate bidirectionally with a variety of external test equipment, local or remote, in a standard bit-serial communication code including start and stop bit elements delimiting byte signal groups for reception;

To provide an adapter as mentioned which also serves as a focal point for encoding and externally transmitting system status log messages;

To provide an adapter in which the message format is useful in diagnosis of faults.

To provide in a data processor improved monitoring, buffer storage, and transmission subsystems for monitoring and externally recording processor status information;

To provide an adapter with improved packaging of status input and status monitoring connecting circuits to its host system wherein the host system is organized in integrated circuit (LSI) unit packages.

Other objects of the invention will become apparent as the following description proceeds.

BRIEF DESCRIPTION OF THE DRAWING

FIGS. 2A through 2D illustrate drawing conventions used in the data flow diagrams of other figures of drawing.

DETAILED DESCRIPTION

Outline of Description

Figure 8A:
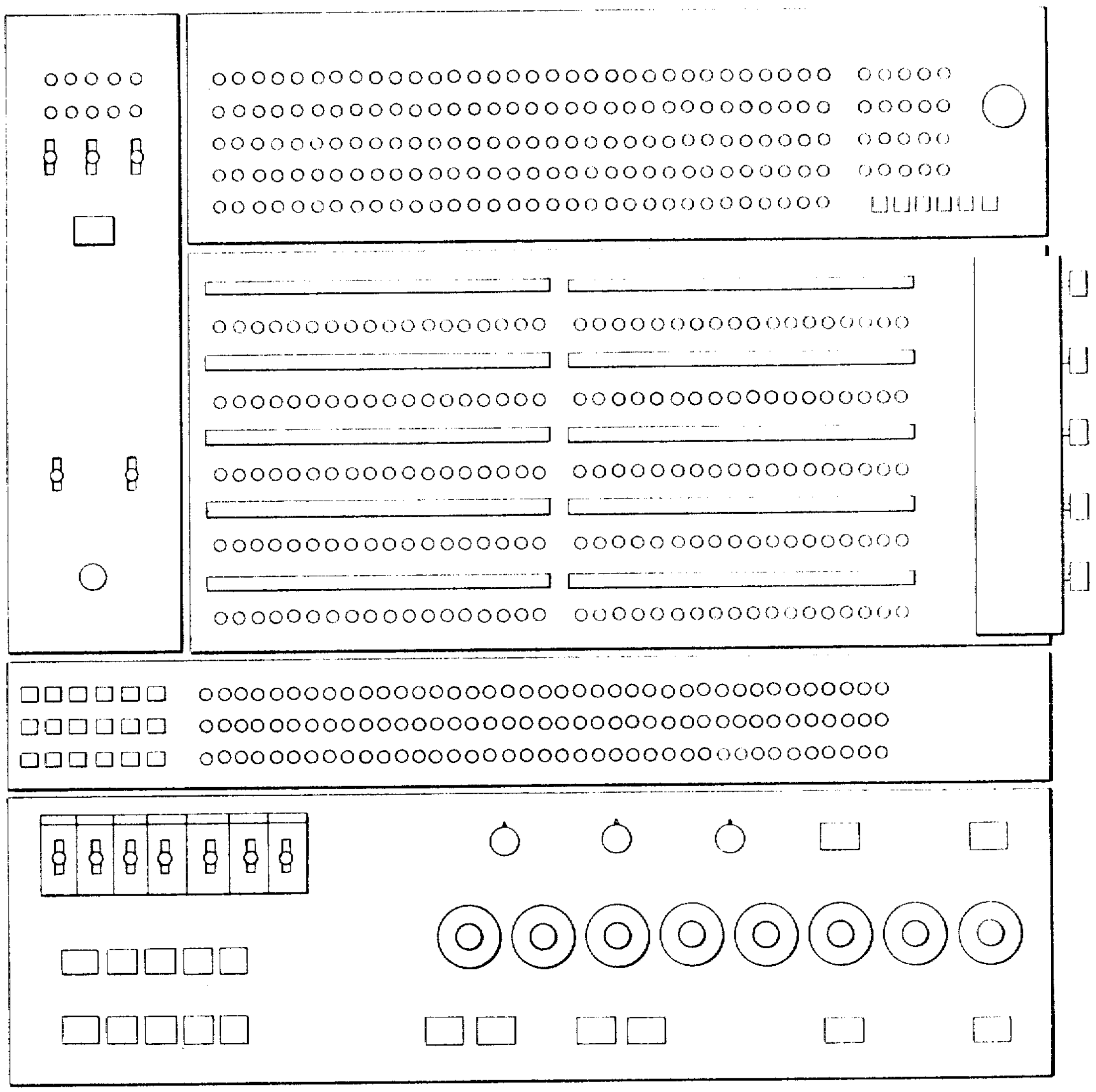
FIG. 8A is an exterior view of the status monitoring console unit of the system incorporating the subject adapter.
Figure 8B:
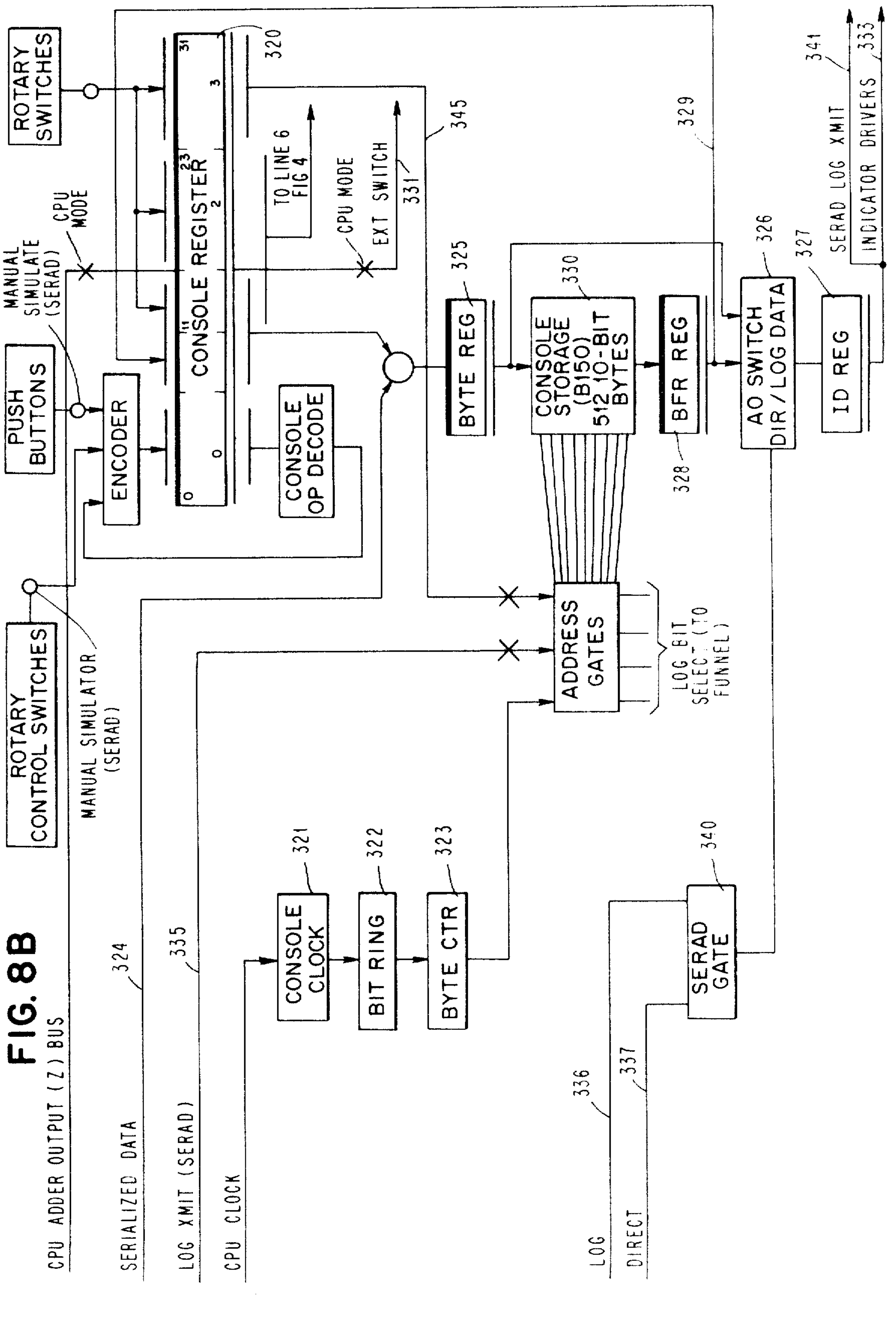
FIG. 8B is a data flow diagram of the same unit. This unit, which serves as a focal point for status log collection and external transmission, also contains the external indicating lights and manual controls needed for operator communication with the system.
Figure 9:
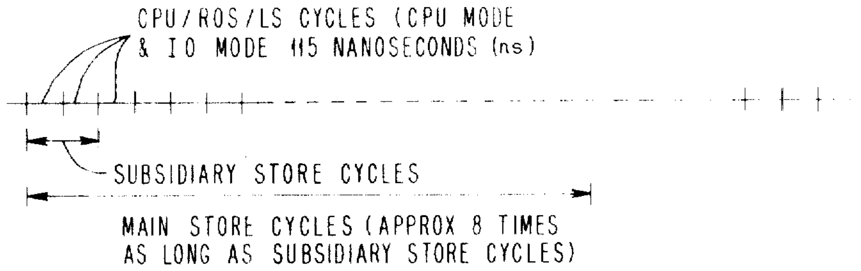
FIGS. 9 through 14 represent timing diagrams illustrating the timing of various sections of the system incorporating the adapter.

Introduction
Processor System–General Organization (FIG. 1)
Drawing Conventions for Data Flow Diagrams (FIG. 2)
Service Adapter (SERAD) Data Flow (FIG. 3)
Control Section Data Flow (FIG. 4)
Computing (CPU)/Local Storage Subsystems (FIGS. 5A—5C)
Main Storage Subsystem (FIGS. 6A—6F)
Input-Output Subsystems (FIGS. 7A—7C)
System Control Panel-Console (FIGS. 8A, 8B)
System Timing (FIG. 9)

Figures 22, 22A:
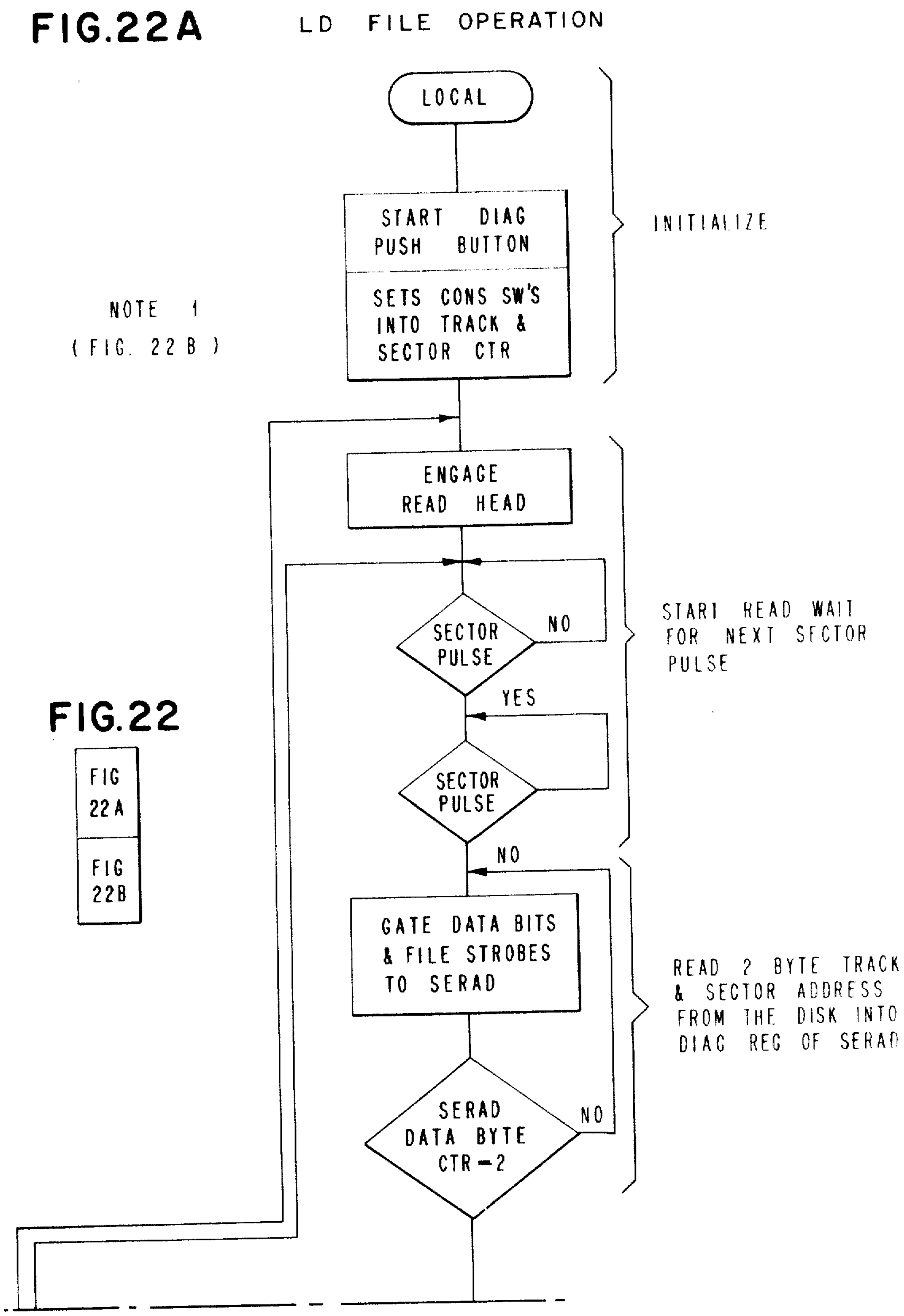
FIGS. 22A and 22B illustrate adapter operations in LOCAL TEST mode.
Figure 23:
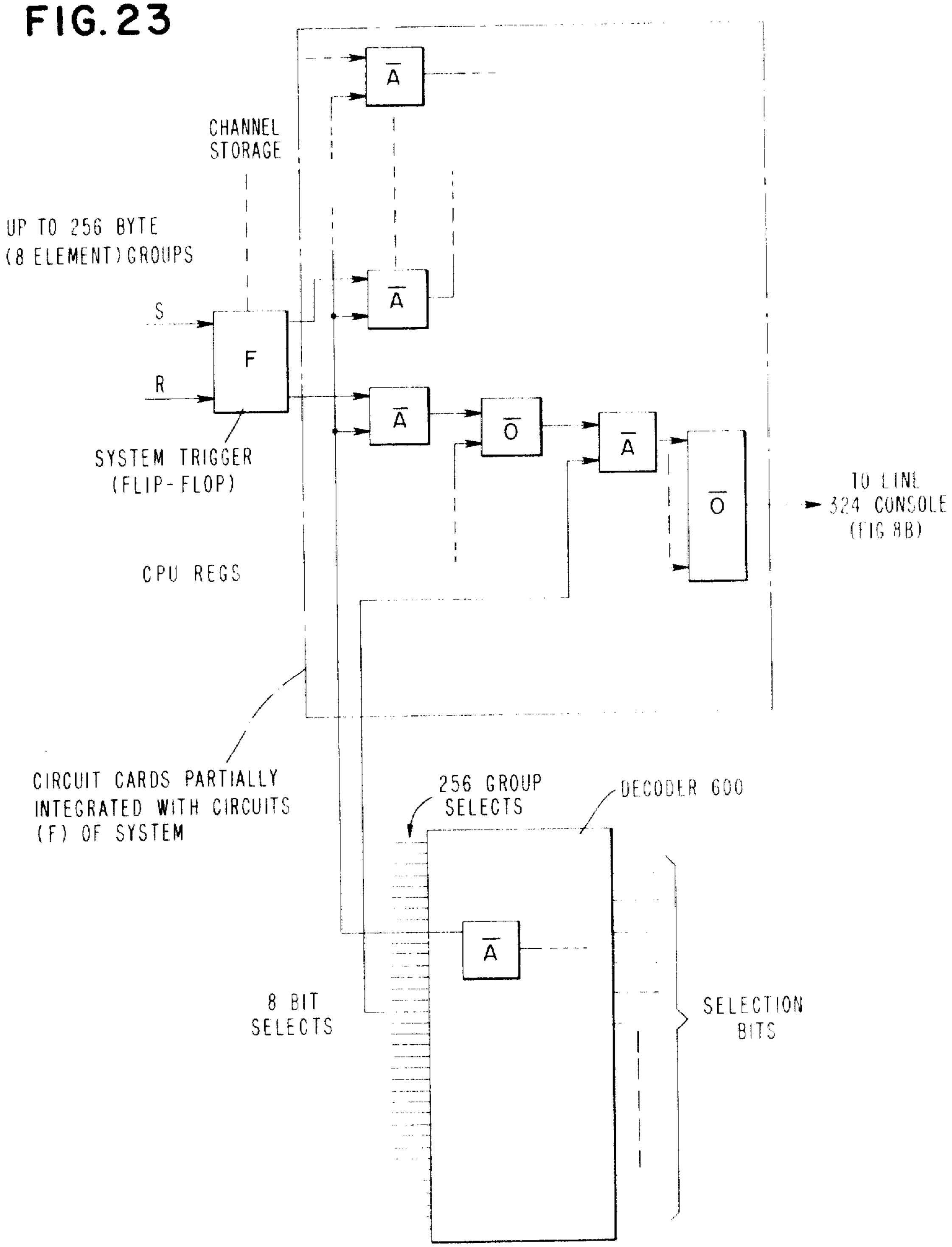
FIG. 23 illustrates schematically the principles of large scale circuit integration (LSI) employed in the construction of the serialization networks through which status log signals are collected from an integrated circuit system under test.

Control and CPU Timing (FIG. 10)
Storage Timing
Local Stores (FIG. 11)
Main Store (FIG. 12)
Console Timing (FIG. 13)
SERAD Timing (FIG. 14)
SERAD Operations (FIG. 15A—15H)
SERAD Control Section (FIG. 16)
System Configuration-Remote Service (FIG. 17)
System Operational Sequence-Remote Service (FIG. 18)
System Configuration—SERAD/Local LOAD DIAGNOSTIC (LD)
Disc Store (FIG. 19)
System Operational Sequence-Local Service (FIG. 20)
SERAD Operational Sequence—Remote Service (FIG. 21)
SERAD Operational Sequence—Local Service (FIG. 22)
Log Collection Serializer Net (FIG. 23)

Introduction

The present invention concerns a universal service adapter, hereinafter denoted SERAD, which provides a compact, simple and standardized test and response interface between a data processing system and external equipment seeking to test the system. A bit-serial binary code communication system is used to transmit messages, including diagnostic test control information, from the external equipment to the adapter, and to transmit response messages, incorporating system status intelligence, from the adapter to the external equipment. As may be inferred from the foregoing, the adapter is arranged to be able to fully control the system in the test and response observance process, whereby the operativeness of the system, with the exception of the adapter and the system power sources, is not critical to the conduct of any diagnostic test.

Thus, the adapter of the present invention includes a small nucleus of circuitry devoted exclusively to the functions of controlling the adapter and the host system in which it is incorporated under the control of signals received in messages sent from external equipment. The message communication is standardized, enabling the adapter to couple to a variety of types of test equipment, local and remote. Standardization, in the preferred embodiment disclosed herein, involves the encoding of the test and response messages in bit-serial binary communication code signals including start and stop-bit signals, the latter to delimit consecutive groups of signals (bytes) within the message to aid reception of the byte signals in groups. Communication with the host system is in a form most effective for the host system.

The economy and effectiveness of the organization for internal communication with the host system is enhanced by providing test control connections from SERAD only to key control elements of the host system; specifically, to system clocking controls, to system micro-operation controls and to a buffer register of the indicator console unit of the system. Additional benefits are realized by spatially integrating with LSI circuit packages of the system, some of the gating circuits through which the adapter transfers signals to the micro-operation control register of the system. Although with this arrangement the adapter does not have direct access to inputs of all triggers, registers, and other elements of the host system which may need testing, it is sufficient for diagnosis of many system component failures and/or design errors to be able to operate the elements of the system indirectly through the SERAD to control register connections.

A pair of response line connections to SERAD from the next state selection logic of the system micro-operation controls, and existing EMIT field connections from the micro-operation controls to the data signal paths of the system, enable the adapter to operate the total system and to detect, in a coarse "pass/fail" sense, the validity of response of the total system to each test input. Thus the adapter itself may halt the test process and "freeze" the system state after a "fail" response.

With the system state "frozen" test personnel may attempt to localize the particular cause of a "fail" response through observance of status indicators on the system indicator panel. Repairs may be made by replacing circuit cards. If needed, diagnostic information may be obtained by telephone from personnel at a remote test station which is linked to the SERAD adapter. To assist the latter personnel, status logs may be transmitted to the remote station via SERAD, for remote inspection and analysis. Such logs are communicated as messages to a remote station as follows.

An efficiently organized status log collection and transmission system operates through LOG TRANSMIT circuits of the SERAD unit to transmit binary messages incorporating system status logs to external equipment. The SERAD unit is provided with a bit-serial binary code communication channel for this purpose. Start and stop bits are appended to the status log message bytes, by SERAD, as an aid to external byte reception. The status logs represent the status at an earlier monitoring period of registers, status triggers, and other elements of the system to which the log collection subsystem connects. External facilities receiving such messages may be programmed to store and even to analyze the same to diagnose system problems.

The status log collection system includes a byte register housed in the indicating console unit of the system. The console unit receives status signals in its byte register from system elements under test. Gating circuits spatially integrated in LSI circuit packages in the console frame distribute signals bit-serially, in byte groups, to the byte register (console bytes consist of 10 bits). Converging pyramids of monitor gate circuits, spatially integrated with system processing circuits in other LSI system packages, receive status log signals from the system processing circuits and funnel them to a single collection point for bit-serial application to the console byte register input gating circuits.

The converging pyramids of monitor gates just mentioned are under control of decoding networks. These monitor gates and decoding networks are integrated spatially in LSI packages with the monitored data handling and control circuits of the system. The decoding networks are controlled by coded selection signals sent from the console frame. In this manner status log and indication signals are selected bit-serially, for transfer to the console unit, under control of coded selection signals sent from the console unit to the monitoring gate circuits. Such status log and indication signals are accumulated bit-serially in the console unit byte register and passed along byte-serially to other parts of the system.

In response to external requests the LOG TRANSMIT circuits in SERAD cooperate with circuits in the console unit to selectively monitor system status and to transmit messages incorporating the monitored status to external equipment. The status intelligence in such messages is obtained either from a buffer storage unit in the console, which is connected to accumulate log signals byte-serially from the console byte register, or from the above-mentioned byte register directly through lines bypassing the buffer storage unit. In transmission SERAD receives console bytes (10 bits), isolates two bits of each byte (parity and console parity check bits) for transmission in separate bytes, appends to these truncated bytes a generated parity bit (developed within SERAD) and byte delimiting start and stop-bits, and transmits the modified bytes bit-serially on its outgoing binary communication channel. The isolated parity and check bits stripped from the console status bytes are saved and assembled into check bytes which are transmitted interleaved with status bytes (one check byte per four status bytes), with SERAD-produced parity, parity check, start and stop bits appended. Such separation of status and check bytes is useful to distinguish console unit faults from other system faults.

Testing of a system through SERAD may involve, progressively: testing operational status of SERAD; testing operational status of the gates interconnecting SERAD and the system micro-operation control register; testing the control register and the control section of which it is a part; testing status of the SERAD—Console subsystem used for status monitoring, indication and log transmission; and testing status of other sections of the host system and its satellite equipment. The latter tests may progress in stages from direct tests of the complete control section, to indirect tests of other elements of the central processing unit (CPU), to indirect tests of the complete central storage facilities, and finally to indirect tests of the input-output channels and peripheral equipment.

Connections from SERAD to the host system include: (1) connections to the console unit, for simulating effects of manual operations; e.g. manipulations of panel pushbuttons and dial switches; (2) connections to the cycle timing controls and the main micro-operation control register of the host system, the latter through group switching circuits spatially integrated with LSI circuit packages of the host system; and (3) Connections to system data registers through an External Switch in the main data handling section (CPU) of the system. The control register connections permit selective establishment of status both in the control register and elsewhere in the host system through EMIT connections from the control register to other elements of the CPU section of the host system. Immediate observance of responses of the host system to tests initiated by SERAD is available through examination of instantaneous feedback states of the host system in SERAD comparator circuits. Such observance involves merely sensing the instantaneous state of the addressing section of the micro-operation control system associated with the control register. In certain instances this involves simply an exclusive-OR comparison of reference information with two particular address bits of the control storage addressing section. These bits, known as A and B branch address control bits, are compared with respective A and B reference bit signals accompanying the test information in the external test message sent to SERAD. Connections of other system elements—e.g. registers, status triggers, etc.—to the A and B branch selecting logic relate the status of such other elements to the A and B branch bit states, and thereby permit observance of the coarse pass-fail effect of most tests, although the cause and/or location of a fault may not be so indicated.

Normal data flow paths allow the console reg to be gated into the data flow—thus the result of manual operation may be tested as per "A" "B" branch tests. The SERAD connections parallel the manual controls on the console panel enabling SERAD (and therefore remote test equipment) to simulate manual input operations at console unit panel keys and dial switches. This serves as a basis for testing the console unit, including its internal controls and its associated log monitoring and indication transferral circuits.

System Organization–General

Figure 1:
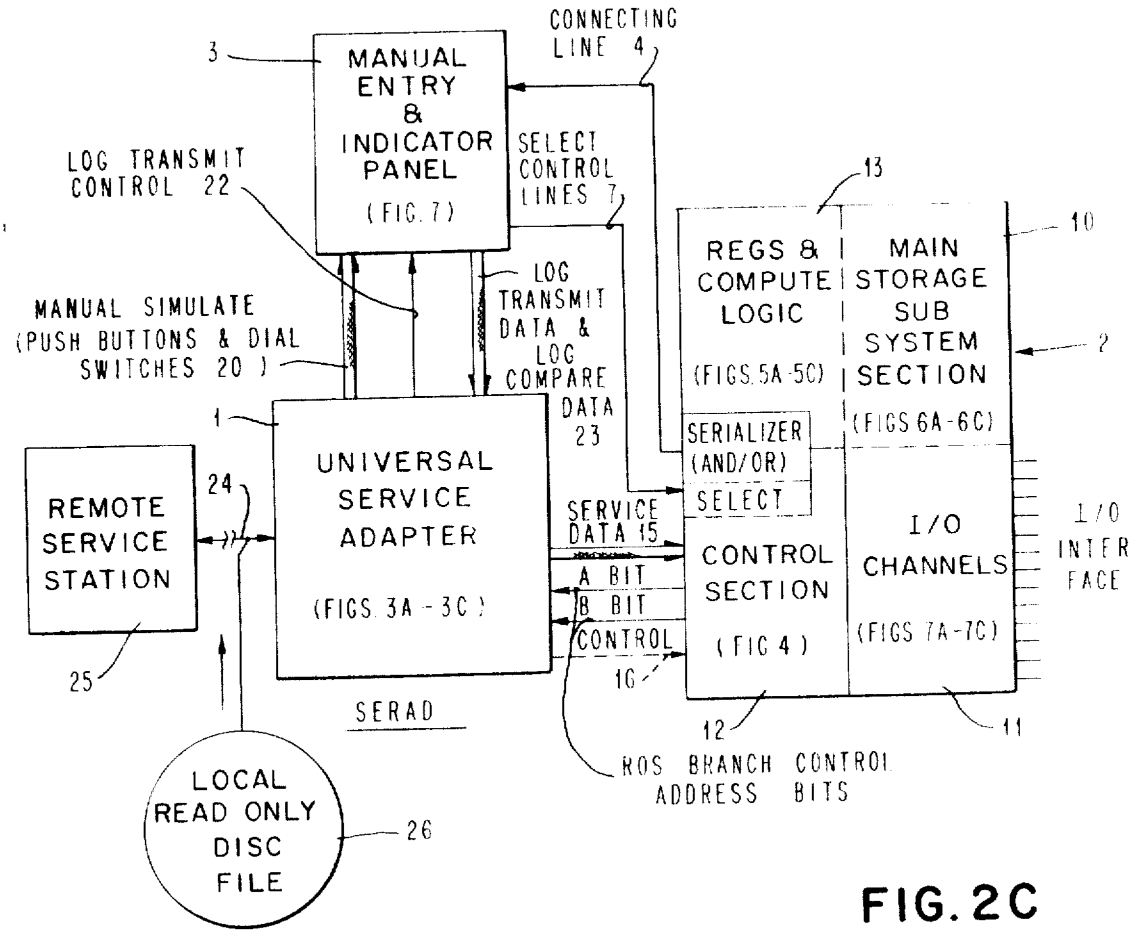
FIG. 1 is a schematic block diagram of the general organization of a system incorporating the universal service adapter of the present invention.

Referring now to FIG. 1, the universal adapter (SERAD) of the subject invention is shown as a discrete modular unit 1, within a larger (host) data handling system, including a main section of circuitry 2 and a console unit 3. The latter unit houses the manual controls and panel indicators of the host system. A line 4 is provided for conveying status signals bit-serially from internal registers, status triggers, and other pertinent circuit checking points in the main section 2, to the console unit. Console unit circuits collect such status signals for indication on panel indicators, for storage within console buffers in block units, for transmission to external test equipment via SERAD, and for reapplication to the main section for storage and/or further handling.

Gates 5 and gate selecting circuits 6, in the main section 2, selectively monitor numerous circuit points of the host system, one point at a time, transferring corresponding status signals to the connecting line 4. This activity is controlled by the console unit. Control from the console unit is achieved through coded selection signals sent over a number of selection control lines suggested at 7.

The main section 2 includes subsections designated main storage 10, input/output (I/O) channels 11, control section 12, and registers and computing logic 13. Subsections 12 and 13 together are denominated the central processing unit (CPU) of the system. Parts of the CPU are used by the channels 11 for input-output handling relative to storage 10. During such use other functions of the CPU are temporarily suspended.

SERAD in combination with external equipment tests main section 2, through its connections to control section 12 and other connections to be described later. These connections include input (SERVICE DATA) status-setting connections 15 from SERAD to a micro-operation control register ROSDR (FIG. 4) in section 12, cycling control input connections 16 to the main system clocking controls (FIG. 4), and output, or sensory, connections (A, B. bit lines) to SERAD from sequence branch logic circuits in section 12. Main section 2 may be fully controlled by SERAD while being tested. When so controlled the main section receives cycling control impulses either asynchronously from SERAD or from its internal system clocking controls under SERAD supervision.

SERAD also tests the console unit 3 through MANUAL SIMULATE connections 20 electrically paralleling manually operated pushbuttons and dial switches on the console panel (FIG. 8B).

SERAD and the console unit interact for external status transmission via LOG TRANSMIT control lines 22 and LOG TRANSMIT data lines 23 SERAD presents status log message signals externally in bit-serial form, with group Start and Stop bits added. The message signals are carried out over binary communication terminal 24 attached to SERAD.

Terminal 24 generally carries two-way message communications between SERAD and remote testing equipment such as 25 (test messages into SERAD, status messages out to the remote equipment), and one-way communications (test messages into SERAD) from local disc record playback equipment 26, the latter operating in a playback only mode for the sake of economy. In the preferred embodiment message signal communication in either direction is bit-serial, in 11 bit byte groups, with each byte group containing a pair of start and stop bits for reception synchronization. A conventional modem (not shown) may be included in the terminal 24 to modulate and demodulate the transmission impulses. The communication medium may be wire, teletype, telephone, radio, or any suitable transmission medium, the exact form of the same being immaterial to the present invention. With sophisticated external computing equipment at centers such as 25 SERAD may be used to conduct basic design evaluation and manufacturing tests on its host system. With less elaborate equipment such as Disc Package 26 (LD File) SERAD may be used in field diagnostic tests of a more primitive nature.

Data Flow Drawing Conventions (FIGS. 2A—2D)

In data flow diagrams to be considered later conventions indicated in FIGS. 2A—2D are employed. Numbers such as 0 and 35, in opposite corners of the rectangle used as the symbol for a register (FIG. 2A), denote the bit capacity (36 bits in this instance) of the register, and the relative significance, of bits entering the register (0-most significant) when the bits are part of a number representation. Groups of parallel input connections to a register, with gating implied, are shown by horizontal lines above the register symbol and for each group a single line extending downward to the horizontal line.

The horizontal line represents a group of input gates and its vertical extension represents a corresponding group of bit carrying input lines feeding the gates. The number of elements in any group is proportional to the relative length of the horizontal line representing the group compared to the width of the register rectangle. The register positions to which the lines of an input group connect are defined by the positions of end points of the associated horizontal lines.

Figure 2A:
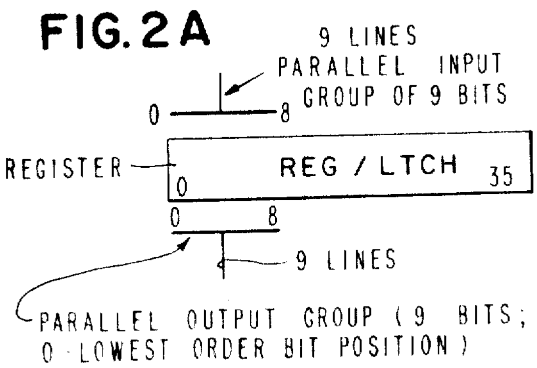
Figure 2B:

Thus, the horizontal line at the left extreme position over the register in FIG. 2A, represents a 9-bit input group (one-fourth of the 36 bit capacity) connecting to the nine leftmost register bit positions 0—8.

The register output gating and line grouping conventions are the same as the input conventions but with the output group represented in size and numerical significance by a horizontal line beneath the register symbol.

Parity Check circuits are represented (FIG. 2B) by a rectangle with the notation "PC."

Figure 2C:
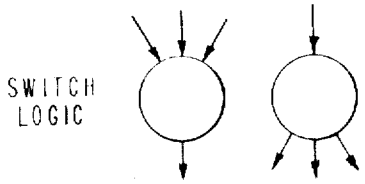
Figure 2C:
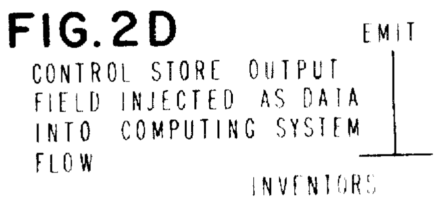

Switching logic is indicated by a circle (FIG. 2C). Arrowheads denote the direction of flow through a switching point. Connection of a group of input lines to a selected one of several groups of output lines is indicated at the right. Connection of a selected one of several input groups to one output group, is suggested at the left in FIG. 2C.

The notation "EMIT" (FIG. 2D) represents a signal field originating at the control register (ROSDR—FIG. 4) of the control section (FIG. 4) of the host data processing system. Transfers of control information from the control register into the data signal handling paths of the host system are made through EMIT field connections. The control section of the host system thereby provides, in parallel with the micro-order control information for controlling system gates, direct information signals (through the EMIT outlets) which are useful as predetermined processing data (e.g. constants) and as diagnostic test information (e.g. to induce predetermined system states for test purposes). The actual use made of the "EMIT" outlets in diagnostic testing will be considered in greater detail later.

SERAD Data Flow

Figures 3A, 3B, 3C:
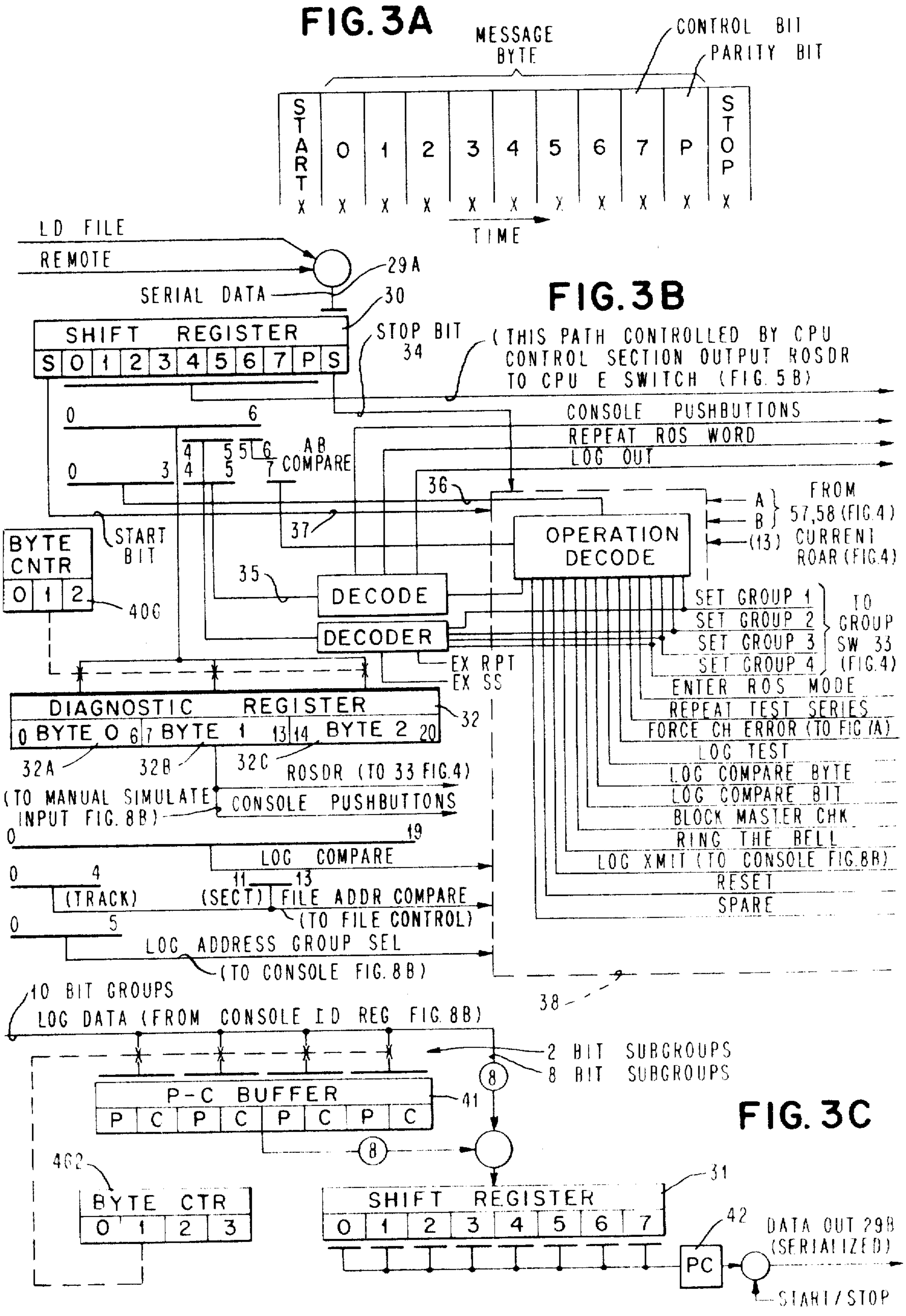
FIG. 3A indicates the format of information received in FIG. 3B.
FIG. 3B is a data flow diagram of the receiving and control sections of the subject adapter (SERAD).
FIG. 3C is a flow diagram of the transmitting section of the SERAD adapter.

As shown in FIGS. 3B and 3C SERAD contains External Communication terminals 29A, 29B. Connected to these are respective shift registers 30 and 31, each of 11 bit capacity. Register 30 is coupled to receive incoming binary message signals (test messages) in bit-serial fashion from terminal 29A. Register 31 is coupled to transfer outgoing binary message signals (status messages) bit-serially to terminal 29B.

Figure 4:
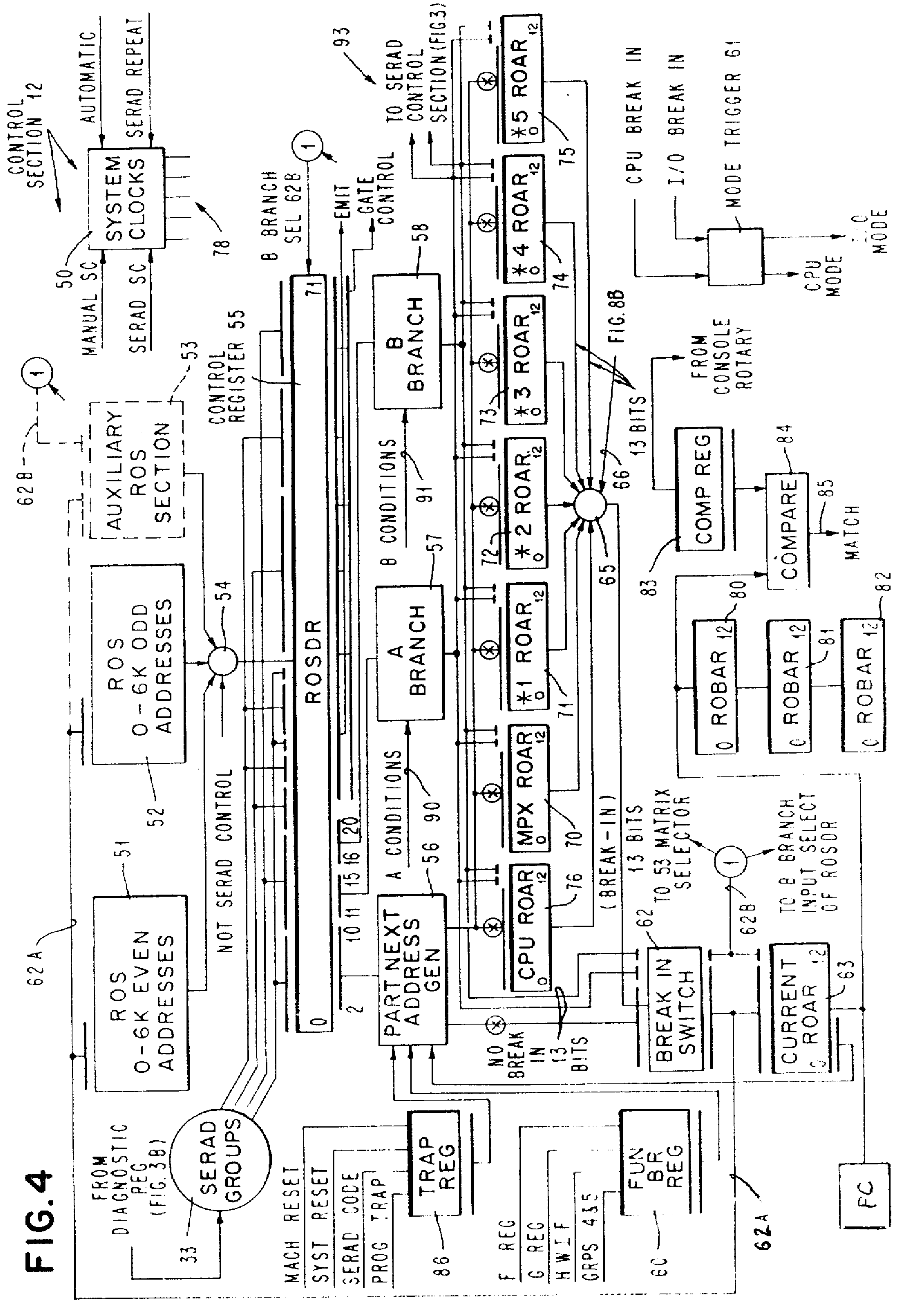
FIG. 4 is a data flow diagram of the control section of the data processing system which incorporates and is tested through the present service adapter SERAD.

Diagnostic Register 32 is connected to receive information in parallel byte groups from register 30 under conditions described later. Groups of seven bits are placed selectively in the three sections of register 32—sections 32A, 32B, 32C—until the 21 triggers of the register hold a desired configuration of bit representations. Under conditions described later the 21 or less bits of a desired configuration established in register 32 are transferred in group parallel to a selected section of the system micro-operation control register ROSDR (FIG. 4). The selection of sections of ROSDR in such transfers is determined through group switching circuits 33 (FIG. 4). The latter circuits are spatially integrated in the LSI circuit packages of the control section 12 (FIG. 4), for efficiency of signal handling and circuit organization, but are controlled from SERAD.

Up to four transfers through the four "positions" of the group switch circuits 33 shown in FIG. 4 may be needed to establish a desired test state configuration in the system Control Register ROSDR. However, for some tests a single transfer will suffice. The manner in which signals are transferred to the control register and utilized therein to control the operation of the data processing system for test exercises will be described in detail later.

Circuit connections 34—37 from register 30 to Control Section 38 establish basic control states of SERAD (discussed later in connection with FIGS. 15A—15F) in accordance with external signals transferred to the register from terminal 29A. The control section 38 includes circuits needed to control sampling (strobing) and entry into register 30 of message bits sent from external equipment and external transmission, from register 31 to external equipment, of system status messages. Other circuits in section 38 are responsive to information signals in register 30 to control internal handling of signals between registers 30 and 31 and other parts of the system FIGS. 4, 5B and 8B). Such other circuits in section 38 are responsive to information in register 30 to perform the functions indicated in FIGS. 15A—15F in flow chart form.

Binary bit signals are assembled statically in register 30, from the serial test message signals on the external lines feeding terminal 29A, into parallel byte signal groups of 11 bits. A typical byte group (FIG. 3A) includes a start bit, an intelligence byte subgroup (bits 0—7 and bit 8 which is usually a parity check bit P), and a Stop bit (binary inverse of Start bit). Intelligence byte subgroups are subjected to one of several forms of handling in a manner described later. Received bytes distinguished as control bytes (bit 7=1) are decoded by SERAD controls 38 to control internal functions of SERAD and functions of the central system. Received bytes not so distinguished are transferred to register 32, under SERAD control. Bytes may also be transferred to central system (CPU) registers via the CPU External Switch (FIG. 5B) under CPU (ROSDR) control (FIG. 4). Register 32 is connectable directly, under SERAD control, to either the CPU control section (ROSDR, FIG. 4), the console unit (FIG. 8B), or comparison logic within control section 38 of SERAD.

Outgoing status messages are transmitted bit-serially through SERAD to external lines. Status information included in such messages is first placed in shift register 31 in parallel byte groups of 8 bits which are thereafter shifted out serially at terminal 29B with start, stop, and parity bits appended by SERAD control circuits. When the transmitted information represents system status received through or from the console unit each 8-bit status byte transferred to register 31 is accompanied by a pair of check bits (parity and parity check status). These are placed separately in parity byte buffer 41 (FIG. 3C) until 8 such bits are assembled into a parity byte. Parity bytes accumulated in buffer 41 are intermittently transferred into register 31, intermediate groups of four status bytes, and thereby are incorporated in the externally transmitted status message. Parity generation circuit 42 (FIG. 3C) appends a SERAD parity bit to every byte shifted out of buffer 31 including the parity bytes received from register 41.

The just described separation within the status message of system status bytes and parity bytes is useful as a diagnostic aid. The parity generated by SERAD generator 42 is used to detect transmission errors and the parity within the interleaved parity bytes is used to identify byte handling conditions preceding the transmission (e.g. the conditions of bytes when transferred earlier from the console unit to SERAD).

Thus, at the external receiver detection of an error in any single transmitted byte suggests that an error occurred either in transmission of the byte or in the parity generation facility of SERAD. On the other hand, a parity or parity check error found by examining a status byte and the associated portion of a separately transmitted parity byte may uniquely identify the source of an error condition originated prior to transmission (e.g. in the console unit or even "further back" in the system circuitry).

Main Control Section Data Flow

The control section (FIG. 4) includes a read only store system 50 of a type described by Tucker in "Microprogram Control for System/360," IBM Systems Journal, Volume 6, Number 4, 1967, pp. 222—241. Each matrix section 51—53 contains configurations of information bit representations in the form of capacitive couples and noncouples at intersections of relatively orthogonal drive and sense wires. The couples are determined by punches in a sheet or card of dielectric material separating the drive and sense lines. Each matrix section 51—53 holds a pattern of code 72 bits in one dimension by 3,000 bits in a perpendicular dimension. The matrix drive selection lines are excited in parallel in each computing cycle to deliver up three 72 bit control words, from three corresponding rows of the three sections 51—53. A selector network 54 is operated in each basic operating cycle to select one of these three words as the main source of system control for the ensuing cycle by transferring the same to the micro-operation control register 55 (ROSDR).

Each word entered into ROSDR represents a system microinstruction, specifying the instantaneous gating status of the system for its current cycle of operation and partially specifying the next address (along the said perpendicular dimension of the three matrices 51—53) of the group of three microinstructions from which the control state of the following cycle will be determined. Groups of such microinstructions form microprograms of control analogous functionally and logically to a sequence counter, but more adaptable to change and modularization.

In comparison to the exemplary Tucker System the present control system of FIG. 4 contains the following features:

1. Plural matrices 51—53 with outputs selectable as at switch 54 in the present FIG. 4 afford greater selectivity and modularity of control.
2. In the present system the normal "next-in-sequence" control address (e.g. the address used when the microprogram is not being interrupted by a BREAK-IN) is a group of 13 bits, produced by logic circuits 56—58. This group includes two conditional branching bits (A, B), rather than one such bit as in the Tucker example. Hence the branch is a more flexible "4-way" branch as distinct from a "2-way" branch (the advantage of this, as explained in U.S. Pat. No. 3,325,785 to W. Y. Stevens, being that a choice of one of four distinct next microprogram states may be made in one cycle rather than two cycles). The B bit is used to determine which matrix output is to be selected.
3. Although not shown in FIG. 4 the present system includes a LATE ROSDR register, as a backup to the main ROSDR register 55, for the purpose indicated by Tucker; namely for the purpose of extending the effect of the current microinstruction control representation late into the current cycle while a successor (next) microinstruction is being transferred from ROS (51—53) to ROSDR 55.
4. A Mode Trigger 61 (FIG. 4) controls "dual usage" (CPU Mode—I/O Mode) of the control system similar to the "-dual usage" described on page 232 of the Tucker article but with certain differences in circuit detail and technique noted below.
5. Late in each basic system cycle (e.g. one "tick" of the basic system clock) selector switch 62 supplies a next control address in parallel to the matrix selection lines (62A, 62B), and to the control address register 63 designated CURRENT ROAR. The selection lines transfer a corresponding microinstruction code representation from one of the matrices to ROSDR as the control for the following cycle. Each next address is obtained either from the normal "next-in-sequence" Address logic 56—58 (NO BREAK-IN), or from the BREAK-IN selection path 65 when the current microprogram is temporarily interrupted by a BREAK-IN function (e.g. to service a channel transfer request).

The eight sources of initial microprogram addresses feeding selector path 65 are the "cable" 66 from the console register of FIG. 8 and the seven buffer address registers 70—76. The registers 70—76 are respectively designated MPX ROAR, No. 1 ROAR,..., No. 5 ROAR, and CPU ROAR. The first six of these buffer registers preserve initial addresses for I/O Mode microprograms associated respectively with six Input/Output channels (a multiplexer channel MPX, and five selector channels, CH 1—CH 5, FIG. 7A). The last-named register (CPU ROAR) effective in CPU Mode operations, preserves microinstruction addresses of "next-in-sequence" microinstructions for recovery of sequence following BREAK-IN.

In continuous microsequences the BREAK-IN path 65 to CURRENT ROAR, and to matrix selector lines 62A, 62B, remains blocked and each next address is transferred to CURRENT ROAR and to the matrix selector lines 62A, 62B through the NO-BREAK-IN path from Next Address circuits 56—58. Concurrently the same addresses are preserved, in anticipation of a BREAK-IN interruption, in one of the buffers 70—76 associated with the current microprogram function. When the control system operates in CPU mode (trigger 61 in CPU mode state) preservation of next cycle addresses occurs in CPU ROAR 76. In I/O mode (mode trigger 61 in I/O mode state) next addresses are preserved in one of the channel ROAR's 70—75 or, in certain instances, in CPU ROAR.

During a BREAK-IN cycle a path is established late in the cycle (after normal next address transferrence) from one of the initial address sources (66, 70,—76), in particular the source associated with the cause of interruption, to CURRENT ROAR and to selector lines 62A, 62B. Simultaneously a new "preservation" path is established for cycles subsequent to the BREAK-IN (until the next BREAK-IN), from Next Address circuits 56—68 to the same one of the registers 70—76 (when an initial address is obtained from the Console Register source 66 a "-preservation" path nevertheless is established between circuits 56—58 and one of the registers 70—76 associated with the function being initiated from the console).

6. The switching circuits 33, although spatially integrated with circuit elements of the ROS system of FIG. 4 are controlled from SERAD control section 38 (FIG. 3B) and connect the SERAD DIAGNOSTIC REGISTER 32 (FIG. 3B) to sections of ROSDR. Thus the circuits 33 represent a portion of a link between external test equipment and ROSDR through which arbitrary control states may be established in ROSDR.
7. "System Clocks" 78 provide cycling impulses for control of system advancement in either automatic (continuous) sequences or in individually controlled single cycle steps (the latter initiated either manually or by SERAD SC impulses). The NOT SERAD control line to selector switch circuits 54 enables the transfer path between matrices 51—53 and ROSDR only when SERAD is either inactive or exercising only partial control over control sequences of the system. With SERAD in control this path is inhibited and inputs to ROSDR are received only through the SERAD switch 33, ROSDR remaining unchanged between input settings despite possible advancement of other parts of the system by impulses from "System Clocks" 78.
8. Connection path 66 affords access to CURRENT ROAR from the Console Register of FIG. 8B for manual and simulated manual control of microsequencing.
9. CURRENT ROAR together with three "back-up" registers ROBAR 1 (80), ROBAR 2 (81), and ROBAR 3 (82) operate as a chain to preserve a history of the four most recent conditions of the control system as an aid in fault diagnostics.
10. COMPARE REGISTER (83) settable from the console provides comparison references to COMPARE circuit 84 for comparison with the state of CURRENT ROAR. A match output 85 is an indication to the system that a particular system state specified by settings of switches on the console panel has occurred.
11. EMIT field (positions 64—71 of ROSDR) enable the control system (and therefore SERAD via its connection to ROSDR) to inject data representations directly into the system data paths and registers (see EMIT inlets in FIGS. 5A—5C).
12. Specific control functions obtained by decoding the various fields of ROSDR are designated in the following list.

Figures 5, 5A:
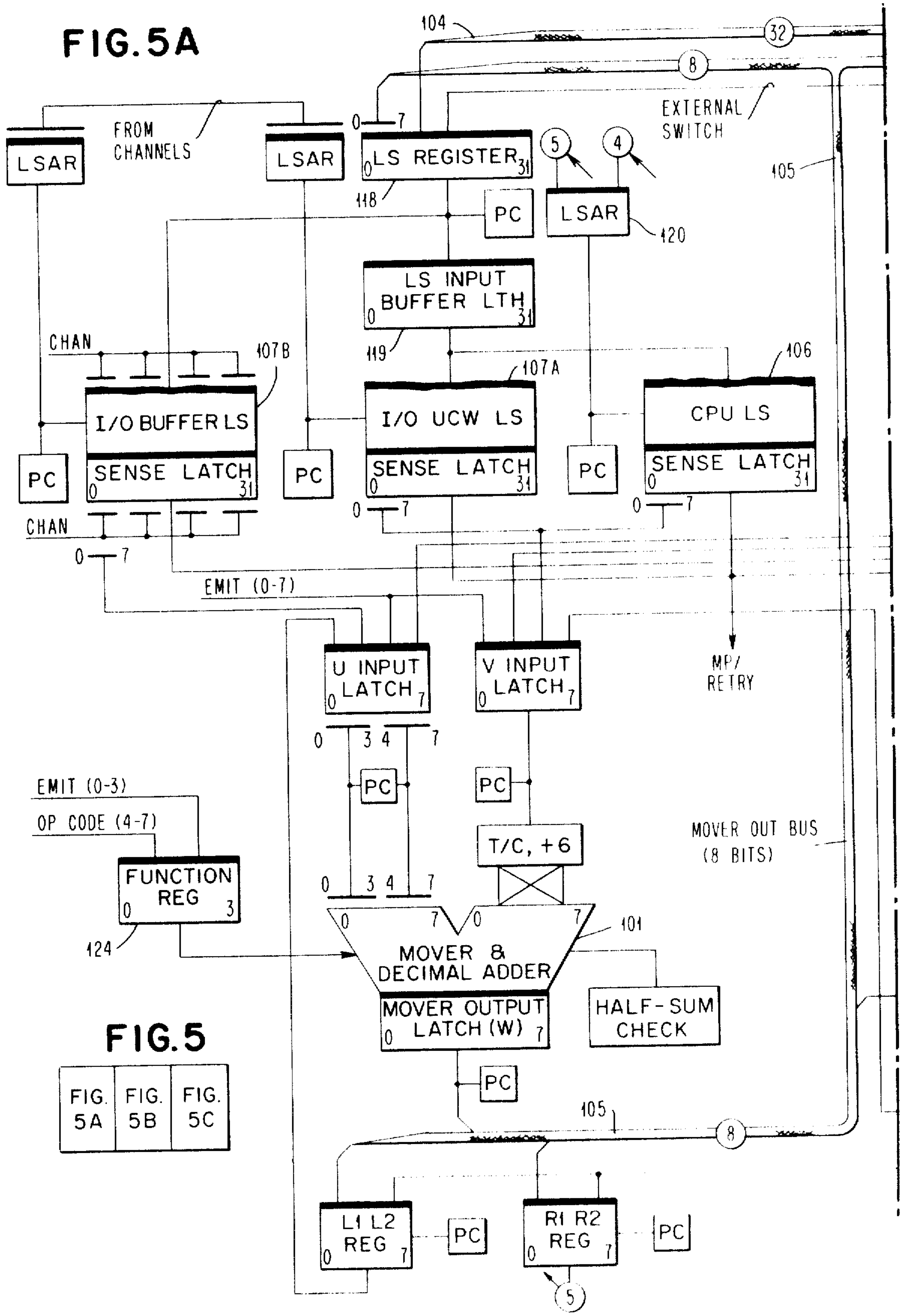
FIGS. 5A through 5C, connected as shown in FIG. 5, contain a data flow diagram of the computing unit (CPU) and local storage units (LS) of the data processing system incorporating the subject test adapter.

| ROSDR field (bit positions) | FUNCTION (CPU MODE unless otherwise stated) | Field Designation |
|---|---|---|
| 0 | Parity (odd) of ROSDR bits 0–35 | P |
| 1 | Enable/Disable the BREAK-IN function for I/O "micro-interrupts" | BI |
| 2–4 | Bits 4–6 of next address (next-in-sequence address to be set into CURRENT ROAR and the associated function buffer in group 70–76). | NAA |
| 5–8 | Bits 7–10 of next address if a Function Branch is not specified by ROSDR field BRC below, or bits 0–3 of next address if a Function Branch is specified. Bits 0–3 are unchanged from previous cycle address in CURRENT ROAR when a Function Branch is not specified. | NAB |
| 9–10 | This Branch Control field decodes into three distinct conditions specifying one of a possible three particular branch addresses associated with two "Forced Restrictions on the Condition Branch" and one Function Branch. The two forced restrictions on condition branching ("force B Bit to 1 if A Bit is 0", and "force B Bit to 1 if A Bit is 1") restrict the AB code produced by circuits 57, 58 from its normal four-position range to a three-position range, thereby conserving "next microinstruction" space in ROS matrices 51–53 in accordance with the teachings of U.S. Patent 3,325,785 to W. Y. Stevens. When a Function Branch is indicated register 60 (FUNCTION BRANCH REG) indicates the source of bits 7–10 of the next address to be one of the following: GP STATS (General purpose condition indicating register, Fig. 5C) bits 0–3- or 4–7, F Register (Fig. 5B), G Register (Fig. 5B), or "hard-wired" I-FETCH status (the predetermined code signal to initiate handling of the next program instruction out of the instruction buffer queue IB of Fig. 5C). | BRC |
| 11–15 | Source of A Branch Bit of next address (selects "A Condition" input to logic 57 from up to 32 possible input sources) | ABR |
| 16–20 | Source of B Branch Bit of next address (selects "B Condition" input to logic 58 from up to 32 possible input sources) | BBR |
| 21–25 | Status setting control for establishing status settings in STATS, A Byte Counter, B Byte Counter, and L1 Counter, of Figs. 5A–5C, either directly or indirectly as a function of another parameter such as the EMIT field (ROSDR 64–71). | SS |
| 21–22 | Used in I/O Mode to control priority of pending service requests from I/O channels, by enabling individual selector channels to present requests of different absolute rank, ranging from level 3 (lowest rank) to level 1 (highest rank). Concurrent requests of like rank from different channels are handled in a predetermined order of priority assigned to the channels. Requests of different rank are handled in the order of rank (e.g. highest to lowest). Requests from MPX channel are always assigned rank level 3. CPU Mode microprograms also have an effective rank of level 3 subordinate in priority to all level 3 channel requests. | IOPR |
| 23–25 | Status setting control in I/O Mode | IOSSB |
| 26–29 | Control function of arithmetic logic unit ALU (ADDER, MOVER Figs. 5A–5B) in cooperation with the Mover Function Reg. (Fig. 5A) for Mover control. | XYALU |
| 30–32 | Selects U input to Mover and/or X input to Adder (Figs. 5A–5B) | UX |
| 33–35 | Selects V input to Mover and/or Y input to Adder (Figs. 5A–5B) | VY |
| 36 | Parity (odd) of ROSDR bits 36–62 | P |
| 37–42 | Selects Fetch (Read) or Store (Write) function in local storages LS (Figs. 5A, 7A). Specifies source of local storage address (one of several LSAR registers, Figs. 5A, 7A). | LS |
| 38–41 | Selects Store (Write) LS function for transfers in I/O Mode from channel or CPU registers (Figs. 5A–5C) or main storage (Figs. 6A–6F), to LS (Fig. 5A). Each channel has a fixed sector in I/O LS reserved to it and only the word position within the sector and, when necessary, the byte position within the word need be specified for any transfer. | LSWR |
| 42–44 | Selects Fetch (Read) LS function for transfers in I/O Mode from CPU LS (Fig. 5A) to channels or CPU registers or Main Storage. | LSRD |
| 43–47 | Miscellaneous control for access to main storage (Figs. 6A–6F), for routing of data signals to registers from External Switch input sources (Fig. 5B), and for control $R_1$ $R_2$ counter (Fig. 5A). | MISC |
| 45–47 | Selects transfer function (Read/Write) of main storage (Figs. 6A–6F) in I/O Mode transfers; also selects inputs in I/O Mode to STATS and A and B Byte counters in Fig. 5C to control ALU and External Switch paths (Figs. 5B, 7B). | IOSTG |
| 48–51 | Controls counting action of A Byte and B Byte counters (Fig. 5C) ("up" or "down" according to state of a not shown "up/-down" Stat), counting action $L_1$, $L_2$ counters (Fig. 5A) in cooperation with a not shown "couple" stat, and setting of status, for retry function discussed elsewhere, into not shown stats denominated SDC, EE, IFTN. | CNT |
| 48–51 | I/O Mode status setting; used with field IOSSB | IOSS |
| 52–55 | Adder Out bus (Z) destination (e.g. designate path from result output of adder/shifter logic to A Register) | Z |
| 56–59 | Destination of adder/shifter/mover logic output (Figs. 5A, 5B); mainly destinations of control bytes to working registers (e.g. $L_1$, $R_1$, A and B Byte counters). | ZW |
| 60–62 | XY Select to adder input (Fig. 5B), shift control (Fig. 5B) for 1 and 4 place shifts. In shifting operations the EMIT field controls "spill-over" destination (F, Q, or Z Reg.) or interchange of F and G register contents. | XYSH |
| 60–62 | Effective in I/O Mode to control I/O Data Flow (Fig. 7A), between peripheral devices and I/O local storage, by gating inputs to and outputs from the one-byte channel buffers. When CPU ROAR (Fig. 4) is preserving next addresses in an I/O Mode microprogram sequence (e.g. a sequence initiated from a CPU mode microprogram sequence) the channel buffer path being worked is selected by the L2 counter. When I/O ROAR's are effective in the next address loop individual channel controls, not shown, designate desired paths. | IODF |
| 63 | Parity (odd) of ROSDR bits 63–71 | P |
| 64–71 | ROSDR bits transferrable as data into registers and logic units (ALU) of the CPU (Figs. 5A–5C, 7A–7C). Also used in conjunction with other fields (status setting fields, Local Storage function fields, and XYSH field) as a source of additional control (extended control field). | EMIT |

In response to a "Trap" condition, indicated by not shown exception triggers, the normal next address of logic 56—58 is suppressed and a predetermined initial address code of one of four "trap" microprograms is injected into the "NO BREAK-IN" path to CURRENT ROAR to terminate the current operation of the computer. Although related to the class of operations known as interrupts, this particular operation resembles a branch more than it does an interruption since the operation in process just prior to the trap is discontinued without remembrance of status and cannot therefore be automatically resumed. As suggested by the named inputs to TRAP REG 86 (FIG. 4) the source of the initial address of the "trap" microprogram, is a prewired code associated with one of the following: Machine Reset, System Reset, SERAD Controlled Reset, Program Trap. Machine and System Resets differ in that Machine Reset affects only the CPU state while System Reset alters the total system state (CPU, Storage, Console, I/O Channels I/O Control Units, I/O Devices).

SERAD controls the control section 12 of FIG. 4 by alternately: (1) injecting control fields into ROSDR with the system in a stopped condition (all clocks suppressed), and (2) dynamically operating the system (in single cycle or multiple cycle mode). In such operations SERAD controls the system either directly, by injecting discrete cycle control impulses into system clocking lines with normal clocking suppressed, or by permitting the normal clocking system to operate cyclically for either a limited period of time controlled by SERAD or even for an indefinite period after initialization of ROSDR from SERAD.

SERAD controls the integrated group switching 33 (FIG. 4) to establish desired states in any or all ROSDR fields. This together with the data transfer capability of the ROSDR EMIT field (ROSDR 64—71), the SERAD input coupling to the External Switch (FIG. 5B), and the SERAD input coupling to the console register (FIG. 8B), enable SERAD to control or dominate status anywhere in the system by direct or indirect manipulation. In cycles of system operation controlled from SERAD inputs to ROSDR from sources other than the Group Switches 33 (e.g. from switches 54) are blocked. Thus even when the system clock is permitted to run for a limited number of cycles under SERAD control, the state of ROSDR is merely repeated in each cycle (although other parts of the system are changeable due to the cumulative effect of repeated application of the ROSDR control state).

The A Bit and B Bit conditional branching lines of the next address controls (FIG. 4) are coupled to SERAD control section 38 (FIG. 3B) via extensions 93 (FIG. 4), enabling SERAD to compare reference A and B conditions received from the external equipment, as part of the test message, with the actual conditional branch state of the ROS control system. This tests the entire system state, in a coarse pass/fail sense, since numerous elements of the CPU and channel systems (FIG. 5) are directly coupled to the "A condition" and "B Condition" inputs to circuits 57, 58 (FIG. 4). Further, since the CPU has considerable control over the channels and peripheral I/O equipment, the A, B comparison may provide useful system status information indirectly, although the location of a system fault may not always be resolved thereby.

Under SERAD control each ROSDR bit is separately determinable. Thus there are virtually $2^n$ system microinstruction states which may be established under external control, as compared to the 9000 microinstruction state representations available in the ROS matrices 51—53. Thus SERAD represents not only a focal point for external tests but also, through its connection to ROSDR, a remarkably flexible status inducing device which is not restricted by the normal control pattern of the system. This for example enables external test gear to operate discrete system elements or circuits in a manner not permitted by the fixed internal structure of the system and even alien to its normal operation.

The clocking section 78 includes an oscillator for basic cycle definition and an 8-element ring counter (eight cascade connected triggers) not shown in the drawing. When coupled to the oscillator, the ring counter generates eight progressively delayed overlapping pulses, each of approximately 30 nanoseconds duration, in response to each oscillator cycle impulse. CPU cycles defined by the oscillator-counter have durations of approximately 115 nanoseconds (the period of the oscillator). The counter output exerts phased control over specific flow path segments of the CPU (FIGS. 5A—5C) and control section (FIG. 4).

Oscillator impulses may be released to the counter ring in either an uncontrolled stream (normal automatic operation) or in discrete randomly timed units (single-cycle operation). The type of operation is controlled either by SERAD or by a not shown two-position toggle switch on the system panel. In the single-cycle position this switch partially enables gates and logic triggers which are further controlled by single-cycle control impulses from one of several sources (i.e. from a START CLOCK pushbutton on the panel) to release one and only one oscillator impulse to the counter ring in response to each control impulse from the then controlling source.

CPU—Local Storage Data Flow

Figure 5B:
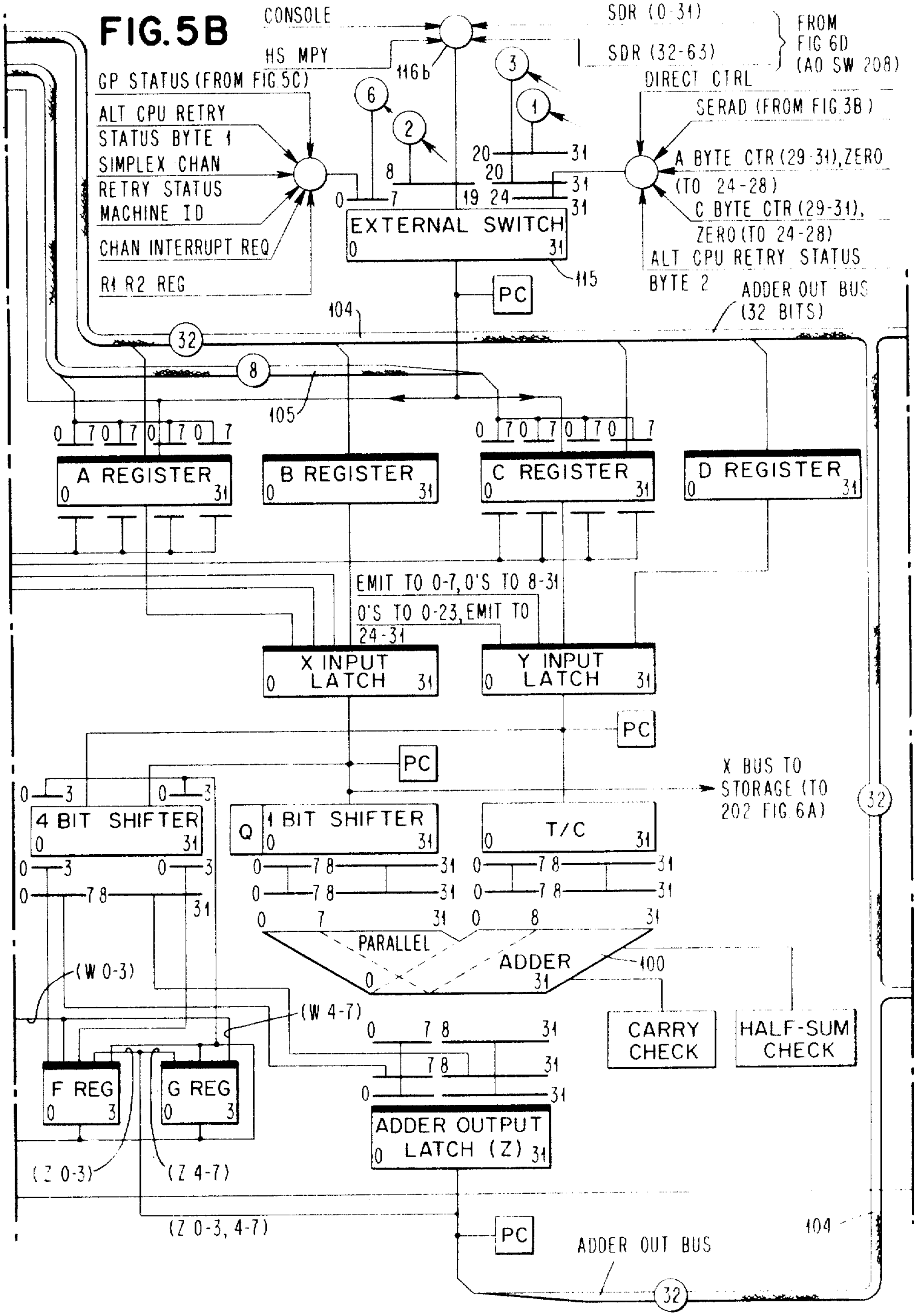
Figure 5C:
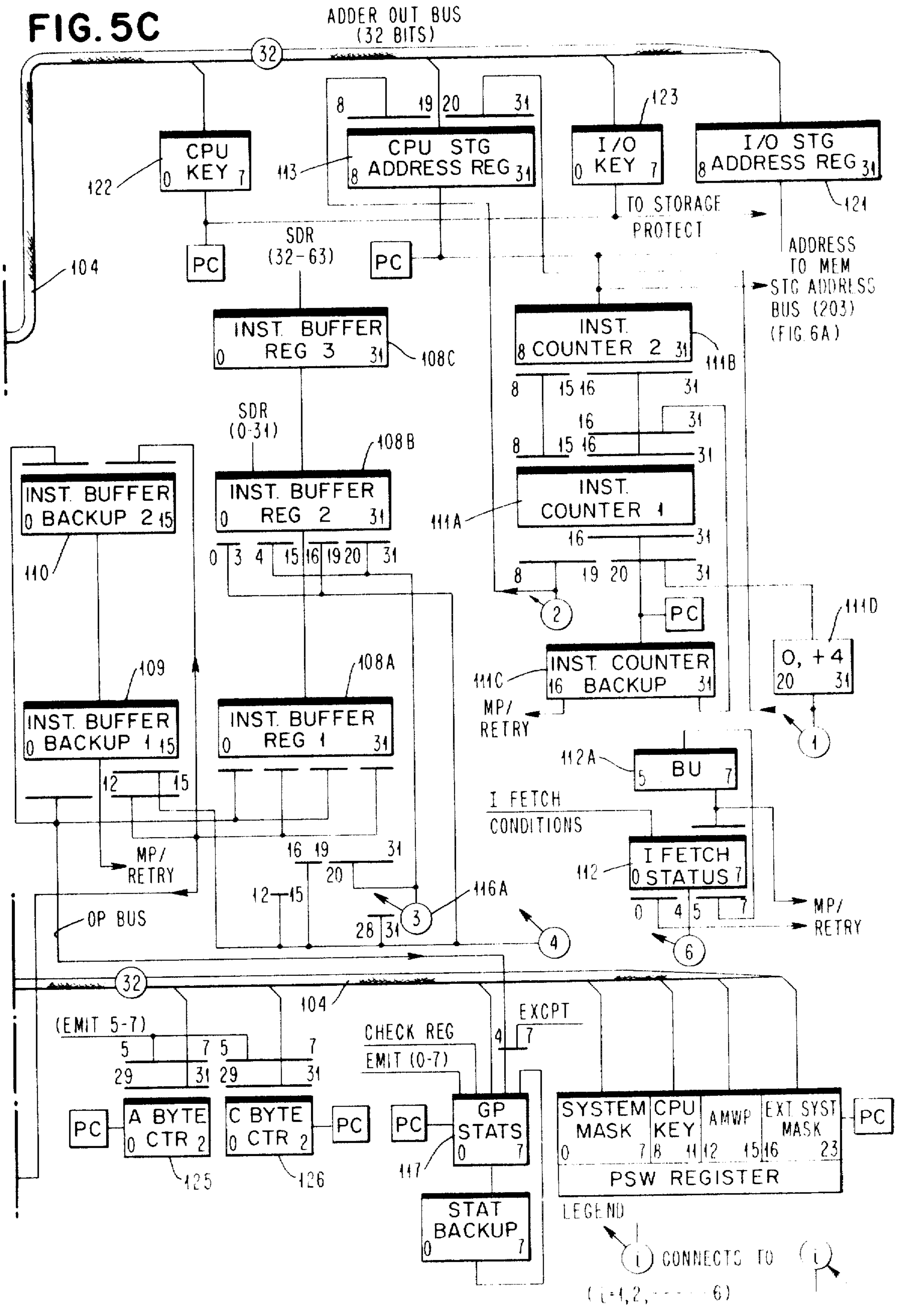

FIGS. 5A—5C, arranged as in FIG. 5, represent the organization of the Central Processing Unit (CPU)—including registers, local storage, and arithmetic logic (ALU)—for the internal (CPU MODE) processing function. A distinction should be made in this regard between the wholly control processing function (CPU Mode) and the part central part peripheral input-output function (I/O Mode) of the CPU.

The input-output function requires the CPU to execute an input-output instruction in CPU Mode to establish an operational linkage path between storage (FIGS. 6A—6F) and I/O equipment through an I/O channel (FIG. 7A). However, after this path is established, the channel functions independently of the CPU in carrying out the input-output function, save for brief periods of engagement with the CPU during exchanges of information with storage. In CPU Mode the CPU is controlled by coded program instructions extracted from main storage, with the decoding of such instructions performed by microprograms. The channel is controlled by internal hardware and commands (the latter differing in format and function from CPU instructions) which are obtained from main storage.

With channels disengaged following execution by the CPU (in CPU Mode) of the instruction to establish an initial linkage, the CPU proceeds (in CPU Mode) to handle its next instruction (input-output, arithmetic, or other) and the channel proceeds to fetch and execute its commands through intermittent engagements with the CPU (in I/O Mode). When a new linkage to the CPU or main storage is needed, the channel interrupts (with an I/O interrupt) the program currently in process. However, in its intermittent engagements with the CPU, for command selection and execution, the channel does not interrupt the CPU instruction program. Instead it interrupts the CPU by a BREAK-IN action in which the channel engages the CPU (in I/O Mode) for a few cycles without drastically changing the CPU Mode program condition of the CPU (e.g. the instruction address count is not changed), the CPU subsequently resuming the interrupted microprogram by referring to one of the buffer ROAR's 70—76 of FIG. 4.

The present system, as regards its general organization for deciphering program instructions and establishing and maintaining program status and protection of stored information, corresponds to the system disclosed in U.S. Pat. application Ser. No. 357,352, filed Apr. 6, 1964 on behalf of G. Amdahl et al., now Pat. No. 3,400,371 and assigned to the present assignee; the disclosure of said application and of other documents incorporated therein by reference being incorporated herein by this reference. Coding and handling in the present system, of program instructions, channel commands, information treated as ordinary data, and status words, (e.g. Program Status Words PSW's and Channel Status Words CSW's) is basically the same as in the above-mentioned patent application disclosure save for variations in the allocation of storage space for interrupted program status storage and in the handling of floating point arithmetic. Such variations being deemed not pertinent to present testing and component status monitoring features of invention are not specifically treated herein.

Basic elements of the ALU portion of the CPU are the 36-bit (one-word) wide parallel Adder 100 and the 9-bit (one-byte) wide Mover 101. A byte of CPU information consists of one parity bit and eight intelligence bits. A word consists of four bytes. The adder handles parallel binary addition of two word representations (X, Y). It also provides a simple register to register parallel transfer path (X to Z and Y to Z paths) for movement of words between registers, with and without intervening shifts of one or four bit-places. The Mover handles logical manipulations and transfers of byte (8-bit plus parity) operands, in either full or half-byte unit groups, and decimal addition of numbers in byte unit groups. Thus, the Mover can produce at its W output the AND, OR, or decimal sum functions of its U and V input bytes. It can also combine U and V half-bytes into a full byte, and skew or transpose at W half-bytes presented at V.

The Adder includes a 1 bit (1 bit place) shifter in its X input leg, and a true/complement selector in its Y input leg.

The Mover-Decimal Adder includes a true/complement byte selector and half-byte cross connection logic in its V input leg, and output latches (W).

A 4 bit shifter presents a signal skewing (shifting) path in parallel with the Adder logic path, feeding its skewed "in-range" output to the Adder Output Latches (Z) and its 4-bit overflow output to either the F or G half-byte register. Only the adder or 4-bit shifter, but never both, is connected to the Z latches in any one cycle by the microinstruction controls of FIG. 4.

Adder Out (Z) Bus 104 provides a parallel word connection path from the Z latches to CPU registers (e.g. A, B, C, D, CPU KEY, CPU SAR, I/O Key, I/O I/O PSW Reg) and to CPU and I/O registers within the local store (LS) stacks, the latter via a buffer LS register. Mover Out Bus 105 couples the Mover—Decimal Adder output to byte sections of the CPU word registers such as the A FIGS. C registers, and to specific byte positions of local store word registers.

The general registers and floating point registers are contained in the 64-word CPU local storage 106. This storage is also used to hold certain channel control words. The I/O local storage 107, partitioned into sections 107A and 107B, is used to store additional channel control words and also, for example, as a buffer for input/output data being transferred between the selector channel one-byte buffers (FIG. 7A) and the main store system of FIGS. 6A—6F. These local stores have direct data transfer paths into the ALU and data receiving paths from the output buses 104 and 105, and from the instruction buffering system 108 (via the External Switch). The latter system 108 includes three instruction word registers 108A, 108B and 108C, and two half-word backup registers 109 and 110. These are employed, together with instruction counting units 111A, 111B, and I-Fetch status register 112, to handle preprocessing of CPU program instructions in an expeditious manner Under the control of microprograms funnelled through the ROSDR register of FIG. 4 in CPU Mode the system shown in FIGS. 5A—5C operates alternately (with some degree of overlap) to obtain instructions from the main store system of FIGS. 6A—6F, in accordance with address information supplied by the CPU storage address register 113, to buffer such instructions in the chain of buffers 108A, 108B, and 108C, for more immediate accessibility to CPU circuits, to buffer next instruction addresses in instruction counters 111A and 111B, with additional backup buffering available in counter 111C, and to perform the functions required to execute the instructions successively.

Lines at various points in FIGS. 5A—5C designated "MP/RETRY" are utilized alternately as a means for coupling multiple CPU's into a multiprocessing (MP) system, or for presenting status information to the control system of FIG. 4 incidental to automatic repetition (RETRY) of microprogram segments following occurrences of intermittent error.

Most operations of the basic CPU system are retriable on a microprogram level. A machine check error occurring during an "I-Fetch" routine (the routine common to all instructions for evacuating and filling the buffer chain 108 and for preparing for the execution of the last extracted instruction) causes the I-Fetch to be retried. The manner in which the execution of an instruction is retried depends upon the instruction and its status of handling at the instant of error occurrence. Some instructions do not change the original data in CPU registers until a last cycle of their execution microprogram. Such instructions are retried from the beginning (I-Fetch) following an error. Other instructions involving intermediate changes of source data in the CPU registers have their microprogram routines partitioned into discrete subroutines. These are retried, when errors are encountered, using intermediate status conditions of I-Fetch Status Registers 112, 112A to establish points of entry to the subroutine (initial microinstruction address). These conditions when presented to the A and B branch controls 57, 58 of the system control section (FIG. 4), through the External Switch 115 and CPU registers, invoke a premicroprogrammed retry operation beginning at the desired point.

External switch 115 controlled by ROSDR (FIG. 4) affords access to many of the CPU registers from internal and external points of the system, including other CPU's when the multiprocessing feature is incorporated. Also access to CPU registers through switch 115 is available to the maintenance console of FIG. 8, the data outlet SDR of the storage system of FIG. 6, a byte transfer path from SERAD register 30 (FIG. 3B), the instruction buffer area 108, the instruction count and status areas 111, 112, the storage address area 113, and other points indicated in the drawing.

Instructions and data are exchanged between double word memory buffers SDR (FIGS. 6B, 6E) and the single word registers of the CPU system in single word units. Addresses of instructions and data are presented through the CPU storage address register (CPU SAR) 113. The counting section 111D of the instruction counting area 111 increments the value of the byte address representation of the next instruction to be extracted from storage, by zero or four units depending upon the function in process. Extensive use of backup registers (BU) and parity checking (PC) assures reliability and reproducibility in each CPU function.

As indicated in the legend in the right lower corner of FIG. 5C certain connections between parts of FIGS. 5A—5C are shown schematically through the use of the indicated symbols. Thus, for example, instructions are moved from the buffer system 108 to the CPU registers and local storage via the external switch and intermediate connections represented by the encircled numeral "3" at 116A and 116B.

In each cycle of CPU operation information signals are transferred from CPU registers (A, B, C, D,—) and/or registers in local storage 106, 107A, 107B, through the ALU system consisting of the Adder, Mover-Decimal Adder and 4-bit Shifter. Result signals are handled through latches and system buses 104, 105 back to registers and/or local storage. At the same time information may be handled into the instruction buffering system 108 and instruction counting system 111 from storage (SDR) and bus 104, or into CPU registers via the External Switch. Or else condition signals may be transferred relative to the status registers, such as the I-Fetch status register 112 and its backup register 112A, the GP STATS 117, and so forth.

The controlling relationship of the ROS control system of FIG. 4 to the CPU system of FIGS. 5A—5C is understood by appreciating that transfers of signals from registers to ALU to registers are controlled by gates which in turn are controlled by the ROS system output in ROSDR (FIG. 4) or the not shown Late ROSDR.

The A, B, C, and D registers (FIG. 5B) are one-word registers used as immediate working registers for such functions as holding representations of operands of an instruction being executed, or temporarily holding instruction address intelligence representations released from incremented 111D (note External Switch-Register Connection path represented by the encircled "1") while the CPU storage address register 113 and its path to the instruction buffer area 111 are occupied with other functions.

The facility to gate individual bytes into and out of the A and C registers enables the CPU to manipulate single bytes selectively within word signal fields, and to emulate or simulate, through byte manipulation, operations of other computing systems which may not be organized on a word basis.

The F and G registers (FIG. 5B) may be used to hold overflow hexadecimal digits produced by shifter operations. The F register may also be used to retain a guard digit during floating point arithmetic operations (a guard digit being the low-order hexadecimal digit of a seven digit fraction which is retained in order to increase the precision of the final result.)

In addition the contents of the F and G registers may be interchanged.

The F and G registers may also be used as a combined register to store a byte of the result data transferred from the adder or 4-bit shifter to the adder output latches (Z).

The Q register is a 1-bit register that retains the overflow bit resulting from the skewing action of the 1-bit shifter in the X input leg of the adder system 100.

Through not shown means the 4-bit Shifter utilizes parity prediction and checking circuits of the adder unit 100 to check parity of 4-bit Shifter outputs. Since the adder and shifter operate in a mutually exclusive manner such usage does not create conflicts.

The latches and busses of the system are used as delays to time the flow of data through the system logic, in cooperation with the system clocks produced by the clock section 78 of control section 12 (FIG. 4), so that "race" conditions may be avoided. A "race" condition occurs, for example, when result outputs of the ALU logic are able to "race" the corresponding argument inputs to the same logic during a cycle, thereby causing undesired changes in the argument signals presented to the logic.

The R1 and R2 registers (FIG. 5A) are used either in combination as one 8-bit counter or separately as two 4-bit counters. These registers are linked to the instruction buffering system 111 to receive the general register addresses (R1, R2) which are designated in the instruction fields. These registers are also coupled to the mover output bus 105 to participate in the mover logical handling and decimal addition functions. The contents of the R1, R2 registers are transferrable to LSAR, at appropriate phases of a CPU cycle, via the symbolic connection denoted by the encircled "5." This establishes the address selection of a desired register section of the local store system 106. The latter system holds in its array elements the general purpose registers, floating point registers and other registers used by the CPU in its instruction handling operations.

A local store register 118 (FIG. 5A) provides an additional race-avoidance buffer for movement of data from CPU busses or external switch into CPU local store 106, I/O control word local store 107A, and I/O local store 107B. An additional stage of buffering, LS input buffer latch 119, provides an additional race-avoidance delay in the paths to local storage sections 106 and 107A serving to delay presentation of data from buses and External Switch to these local storage arrays to have the presentation coincide with writing phases of the array cycles. The data from the local store latch register 118 may be set into the local store buffer latch register 119 and retained therein beyond the time that new data may be set into the latch 118 giving the local store sections 106, 107 up to one full cycle of CPU time to absorb the data.

A local store address register 120 (LSAR, FIG. 5A) is used to retain both CPU and Channel local store addresses for reference to registers within the CPU local storage section 106. Addresses set into the register 120 may originate either in the ROSDR register of FIG. 4, the I-Fetch logic associated with the instruction buffer system 108, or in a channel (via the mover to R1, R2 register to LSAR connection).

Two storage address registers 113 and 121 (FIG. 5C) enable the CPU system (FIG. 5A—5C) and input output channel system (FIGS. 7A—7C) to concurrently hold storage addresses for presentation to the storage system of FIG. 6A—6F without the need for either addressing system to displace its address data. Thus CPU recovery from program interruptions or microprogram BREAK-IN is not impeded by storage of pending address selection signals. KEY registers 122 and 123 associated respectively with the address registers 113 and 121 retain storage protection key information for use during accesses to the main storage system of FIG. 6A—6F, in blocking unauthorized or defective uses of storage (by either CPU instruction programs or channel command programs).

The L1, L2 register (FIG. 5A) serves as a path for receiving portions of the instruction field from the buffer system 108 during the handling of certain types of instructions, particularly the SI format instructions described in the above-referenced Amdahl et al. Pat. application Ser. No. 357,352 (in which the immediate field section of the instruction constitutes a logical operand of the instructions). In such handling data in instruction buffer 108A is passed through L1, L2 to the Mover-Decimal Adder logic.

The L1, L2 register is also used as a remaining field length counter during execution of variable field length (VFL) instructions (SS format instructions also described in the above-referenced Amdahl et al. application).

The ALU function register 124 is used to retain a function control digit (in hexadecimal notation). A digit of this form may be set into this register from the operation code (Op Code) field of an instruction held in the instruction buffer area 108, via a connection not shown in the drawing, or from the EMIT field of the ROSDR control register of FIG. 4.

The A and C byte counters 125 and 126 (FIG. 5C) are self contained counters which are settable to initial conditions through the bus 104 and the EMIT field of the ROSDR control register. These counters are used to supplement the gating control function of the ROSDR control register, during the handling of VFL-type instructions. They effectively represent extensions of the ROSDR control field for this purpose. The contents of the byte counters may also be used as branch condition entries to the A and B branching logic sections 57 and 58 of the control section 12 of FIG. 4. Stepping of the counter (Increment/decrement) is controlled by the ROSDR output.

The buffer system 108A—C (FIG. 5C), together with the control section of FIG. 4 and the status registers of the system, enables the CPU system to prefetch multiple instruction representations from the main storage system of FIG. 6A—6F, overlapping such prefetching with the functions necessary to decode a currently effective instruction. The three one-word instruction buffer registers 108A, 108B, and 108C, are used to buffer up to three prefetched instruction words for immediate presentation to the control section and CPU through the external switch connections represented by the encircled numerals 3 and 4. Instruction data enters the buffer area through the registers 108B and 108C and later is moved into register 108A. The actual decoding occurs with reference to the contents 108A, operation codes (Op Code) being taken from positions zero to seven of this register through the general purpose stats (GP STATS) indicated at 117 to the function branch controls 60 of the control section of FIG. 4.

Instruction buffer backup registers 109 and 110 provide the capability of saving the OpCode field and the general register designating fields (R1, R2) of the instruction content of register 108A, in anticipation of a possible need to retry any instruction just after it has been displaced by next instruction information moved from register 108B or 108C. Two such backup registers are provided as that information preserved for a retry may itself be further preserved in anticipation of occurrence of error during a retry. Thus, preserved instruction data normally flows from register 108A to backup register 110 and only as needed for retry is such information transferred from backup register 110 to additional backup register 109. Register 110 thereby remains available for receiving additional information from register 108A in support of the instruction which is to follow that being retried.

The instruction counters in area 111 form a chain of buffer registers 111B, 111A, 111C linked to the storage address registers 113 (CPU SAR) and 121 (I/O SAR).

Counter 111A (FIG. 5C) holds the current instruction address. As instructions are processed this address is incremented by either 0 or +4 units in byte address value by the incremented 111D and transferred to the CPU storage address register 113. The updated instruction address is used by the CPU system to access instructions sequentially located in main storage (FIG. 6A—6F) according to the program function currently in process. Branching operations require the usual substitution of a branch address for the normally used incremented address.

The PSW register is used to hold portions of the current Program Status Word (PSW). This establishes the general operational state of the processing system in accordance with the principals set forth in the above-mentioned Pat. application Ser. No. 357,352 by Amdahl et al. now U.S. Pat. No. 3,400,371. Many of the registers and status triggers of the system of FIG. 5A—5C are coupled, through connections not individually shown in the drawing, to the A and B condition branch logic sections 57 and 58 of the control section 12 of FIG. 4, thereby determining the sequence of operation of the control section and CPU system in accordance with immediate system status. Many of the same registers are connected to the Main Storage system (FIGS. 6A—6F) through the "X Bus to Storage" connection.

The gating of signals through the various segments of the signal handling systems shown in FIGS. 4, 5A, 5B, and 5C, as previously mentioned, is under the control of the eight clocking impulses produced by the clocking ring within the clocking section 78 of the control section in FIG. 4. Signals which are established and checked for error early in any CPU cycle include: the entire content of the ROSDR register of FIG. 4, decoded control signals derived from the SS and MISC fields of the ROSDR register (such decoding being implied by the discussion of FIG. 4 although not explicitly shown in the figure), the X, Y, U, and V inputs to the ALU logic circuits (FIGS. 5A, 5B), the LS register 118 (FIG. 5A), and the External Switch control signals (FIGS. 4 and 5B) derived from the MISC field of ROSDR.

Signal conditions established and verified during midportions of CPU cycles include: the content of the not shown LATE ROSDR register mentioned in the discussion of FIG. 4 (which, it will be recalled, is used as a backup register for the ROSDR register (FIG. 4) to enable the ROSDR to receive new microinstruction information while micro-operations of a previous microinstruction are still being performed), logical result signals transferring out of the adder and mover systems, the condition of GP STATS 117 (FIG. 5B), the setting of local store address registers LSAR (FIG. 5A), the output of the External Switch (FIG. 5B), the content of instruction counter 111A (FIG. 5C), and the states of the L and R counter-registers (FIG. 5A).

Signals established and verified late in CPU cycles include: the output of the address selector path 62 (BREAK-IN SWITCH, FIG. 4) to selector lines 62A, 62B and CURRENT ROAR, the status of the Trap Register 86 (FIG. 4), the clocking impulses to cycle the ROS matrices (FIG. 4), the W and Z bus outputs (Mover and Adder-4-bit Shifter outputs, FIGS. 5A, 5B), the A and C byte counters 125, 126, (FIG. 5C), inputs to the Storage Address Registers 113, 121 (FIG. 5C), and inputs if any to the CPU from the storage and channel systems of FIGS. 6A—6F and 7A—7C.

In addition to the status control elements shown in FIGS. 5A—5C the following not shown status control elements are provided in the system;

A. Ignore Latches—two latches functioning to block detection of all data errors (in the system of FIGS. 5A—5C) when desired.

B. Master Check Latch—a latch determining the retry status of the system. When set to On, this latch blocks all writing functions to local storage, main storage and backup registers which normally hold retry status. This latch is set to On condition by the detection of an error and to Off condition either under microprogram control or reset pushbutton control.

C. A Retry In Process Latch—controls certain branches of the microprogram when set to On condition in response to error. In effect this "tells" the microprogram that a malfunction has occurred in a repeated CPU function to aid in distinguishing intermittent errors from permanent faults.

D. An N-counter—counts the number of consecutive errors occurring during a CPU function and is therefore an important element in determining whether the function will be repeated, or the system will be stopped for hands on maintenance, or status will be logged (monitored and transmitted) to external equipment through the channels or the SERAD console log transmission unit. The N-counter is reset under microprogram control at the successful conclusion of a repeated CPU function.

E. A Block Start Latch—freezes the status of the machine in an uncorrectable error situation. This latch is set On when the N-counter reaches a maximum value or when a signal is received from the microprogram control representing a hard stop micro-order. It is reset Off only by a logical resetting of the system (pushbutton).

F. Check Point registers—two check point registers define microprogram entry points (addresses of control store ROS, FIG. 4) for the retry function. Check Point register number 1 is entirely under microprogram control and is used to influence the microprogram addressing logic 56—58 (FIG. 4) to "backspace" the ROS addressing controls selectively according to the circumstances of error. The two registers used in combination determine the course of action to be taken following an error.

G. Overlap—when storage is not busy during certain CPU functions, a micro-order is issued from the ROSDR section of FIG. 4 to enable the channel system to begin to cycle storage even before a BREAK-IN occurs.

Storage System (FIGS. 6A—6F)

Figures 6, 6A:
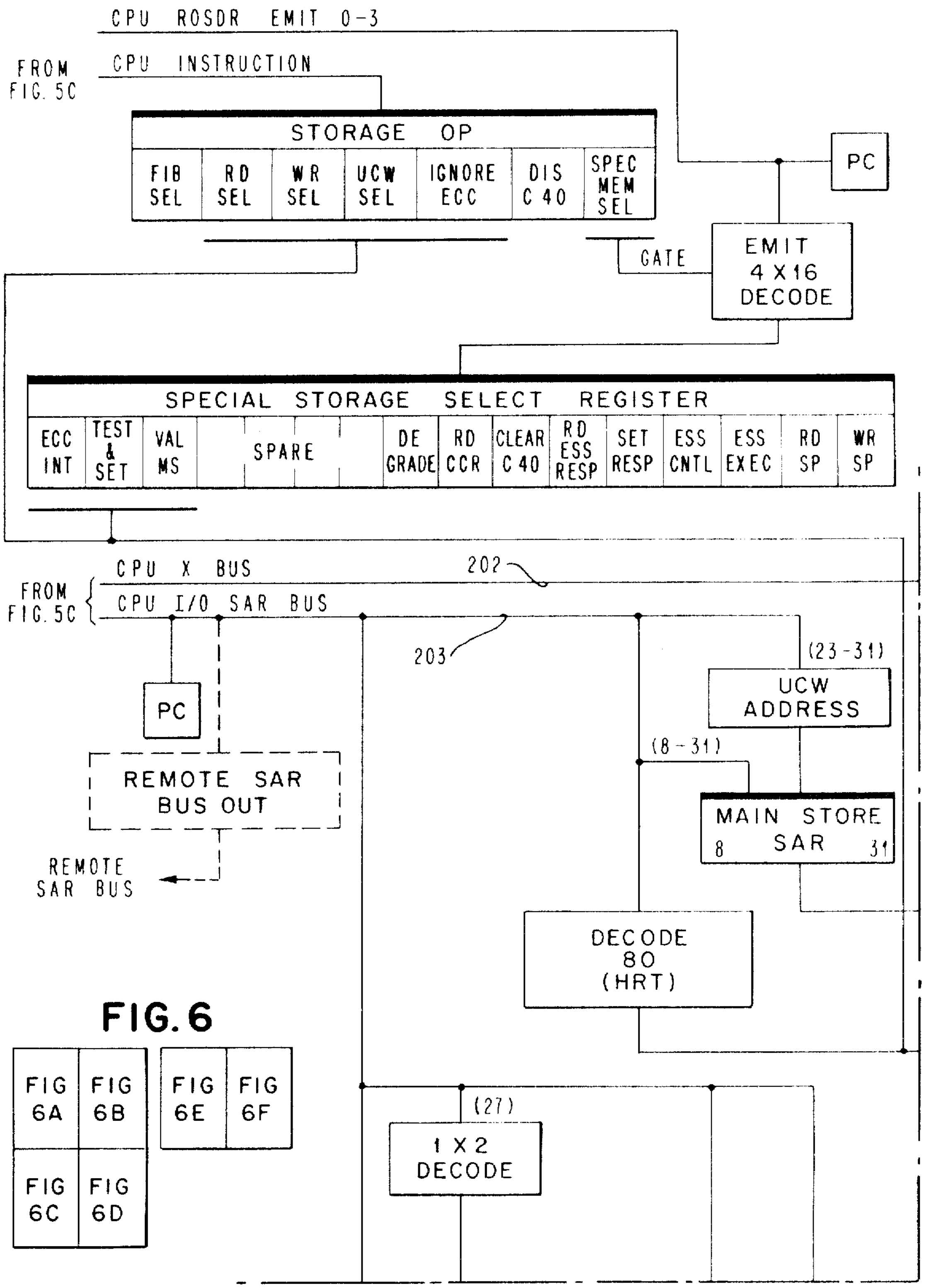
FIGS. 6A through 6F, arranged as shown in FIG. 6, comprise a data flow diagram of the main storage subsystem of the same data processing system.
Figure 6B:
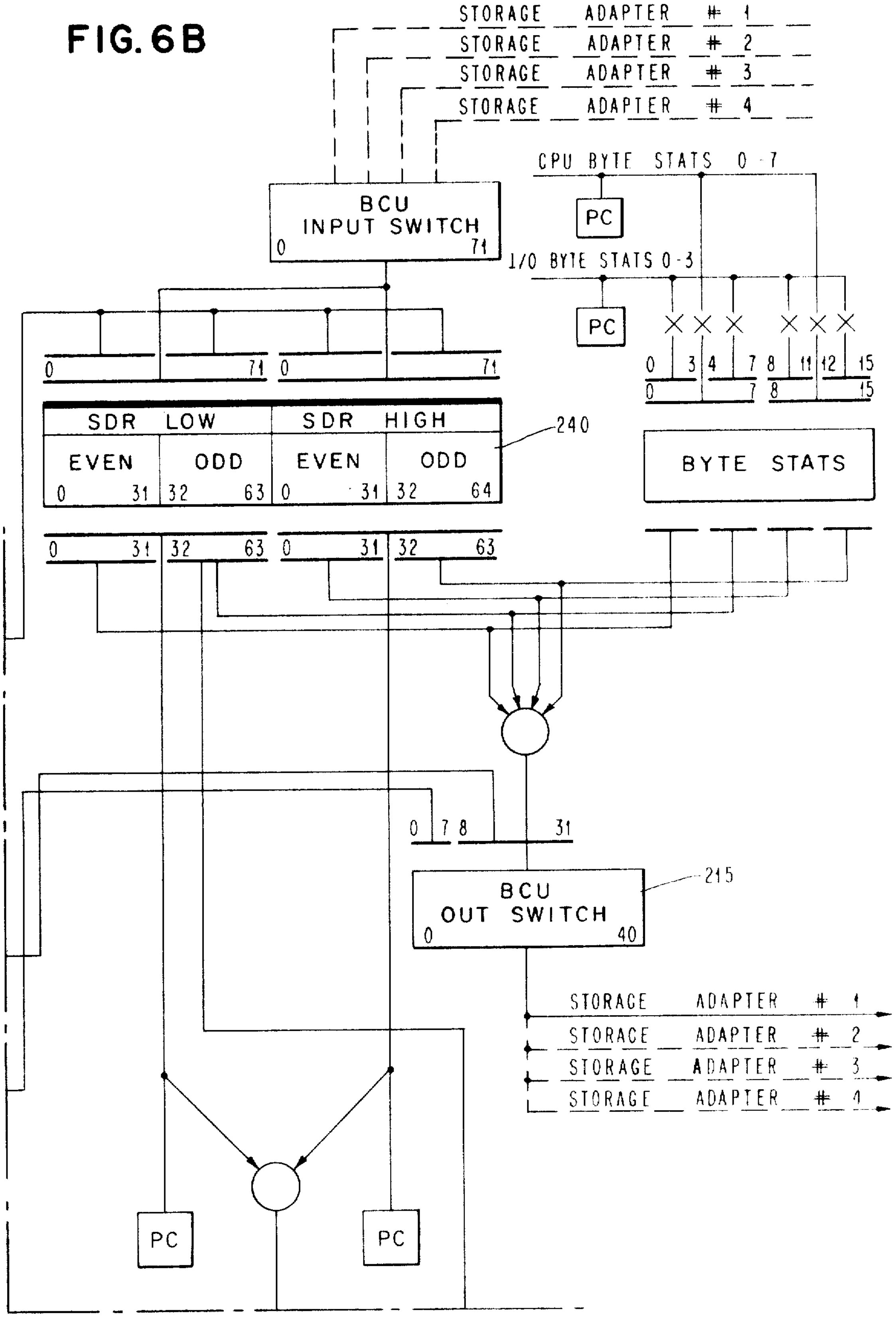
Figure 6C:
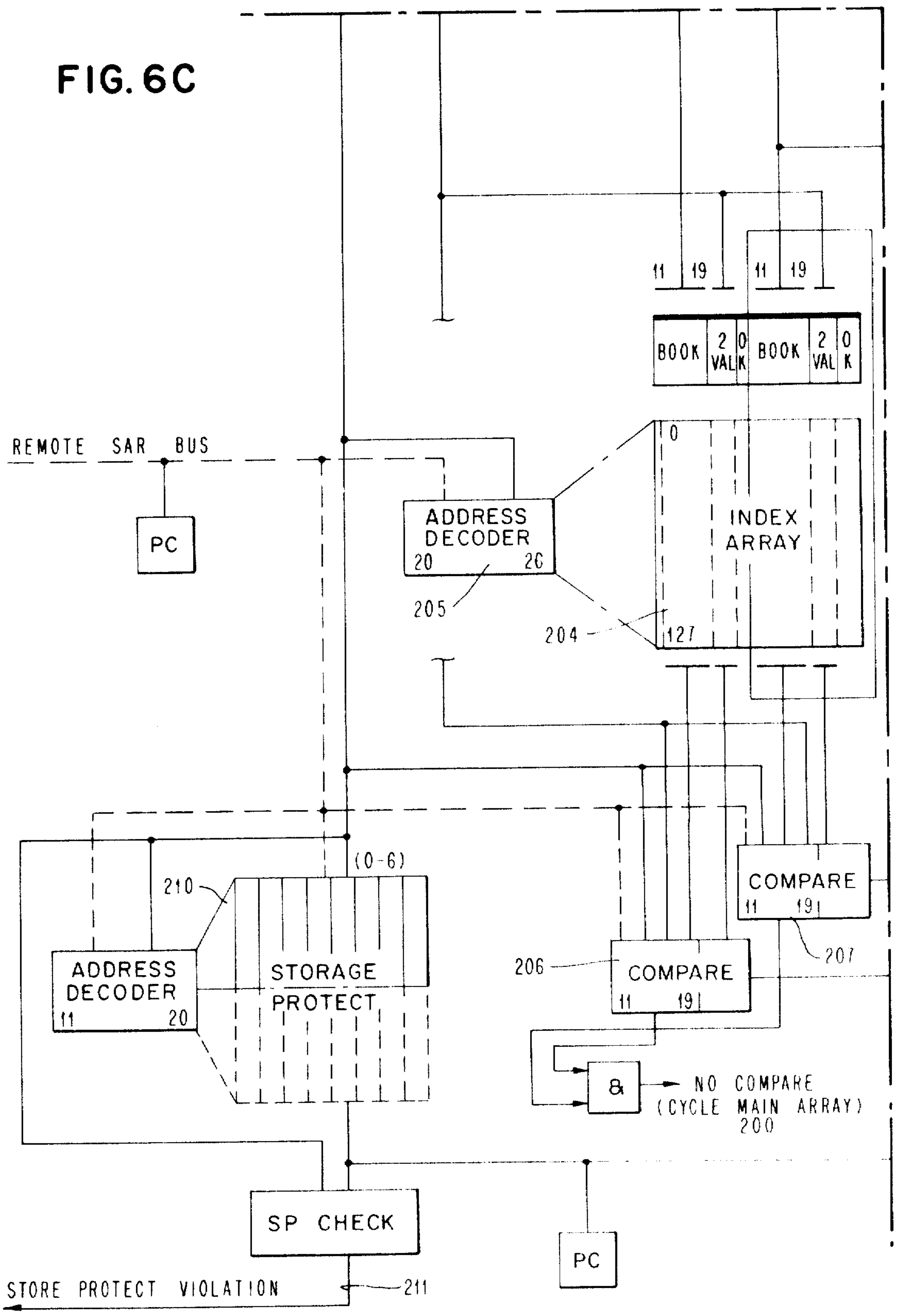
Figure 6D:
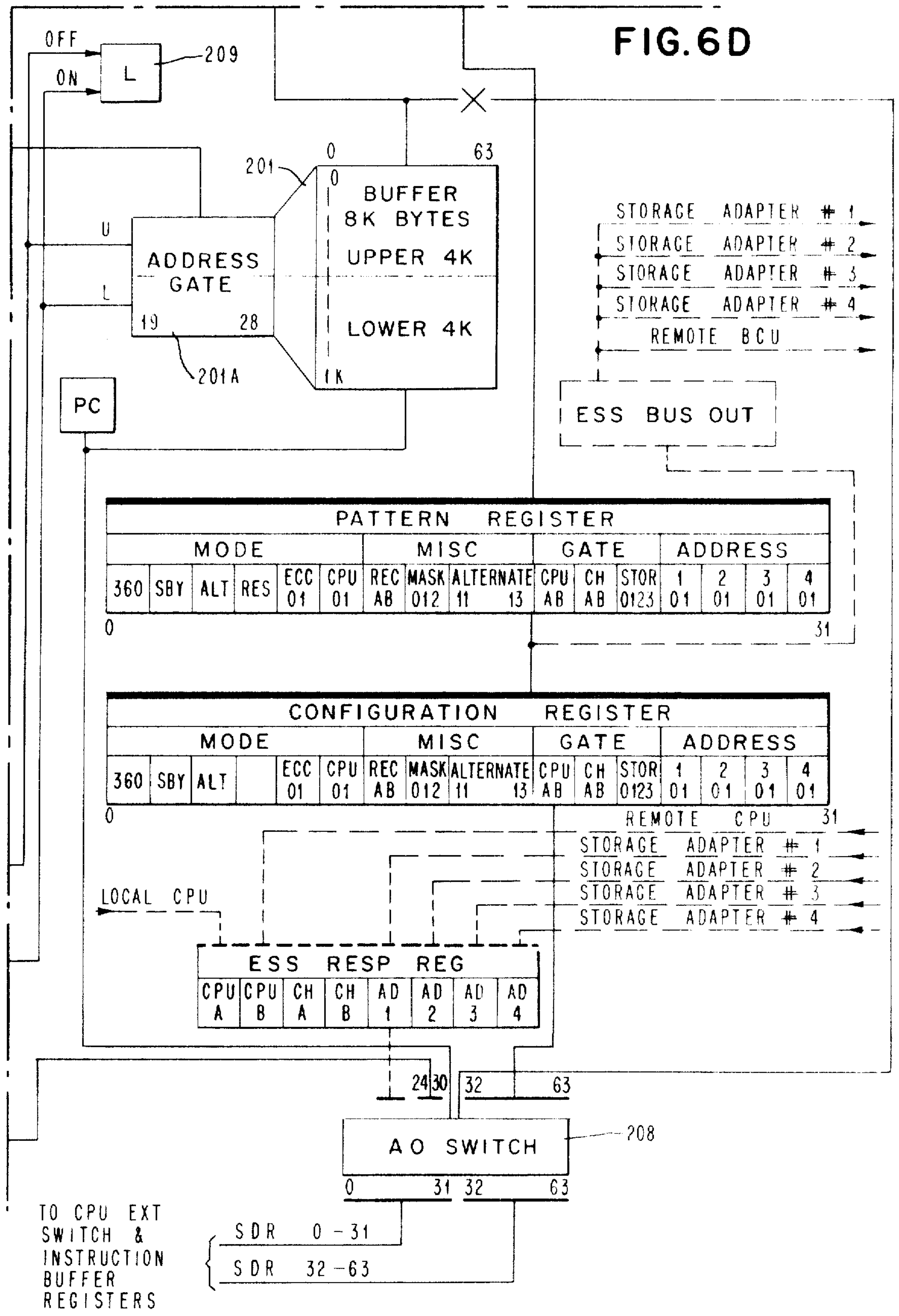
Figure 6E:
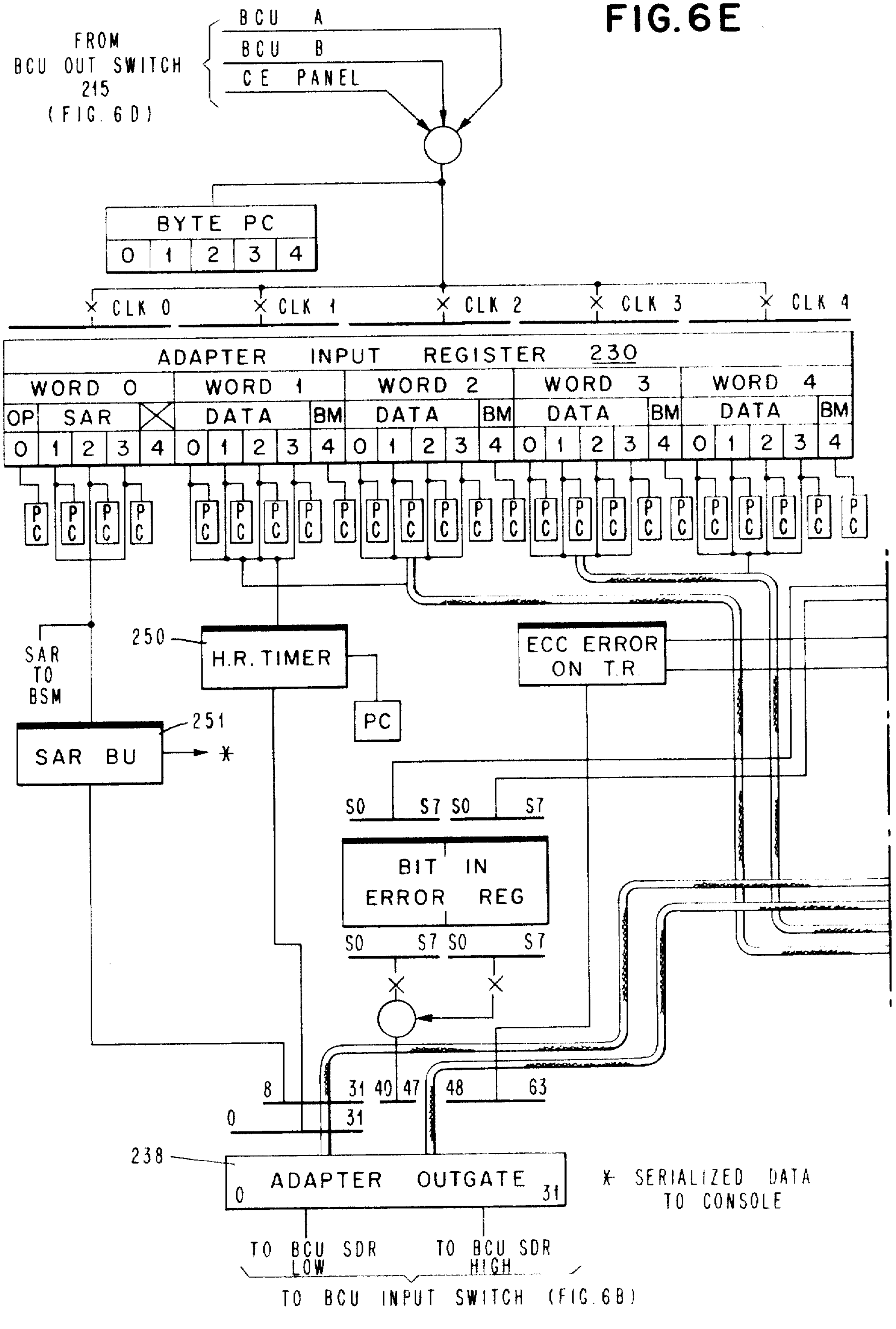
Figure 6F:
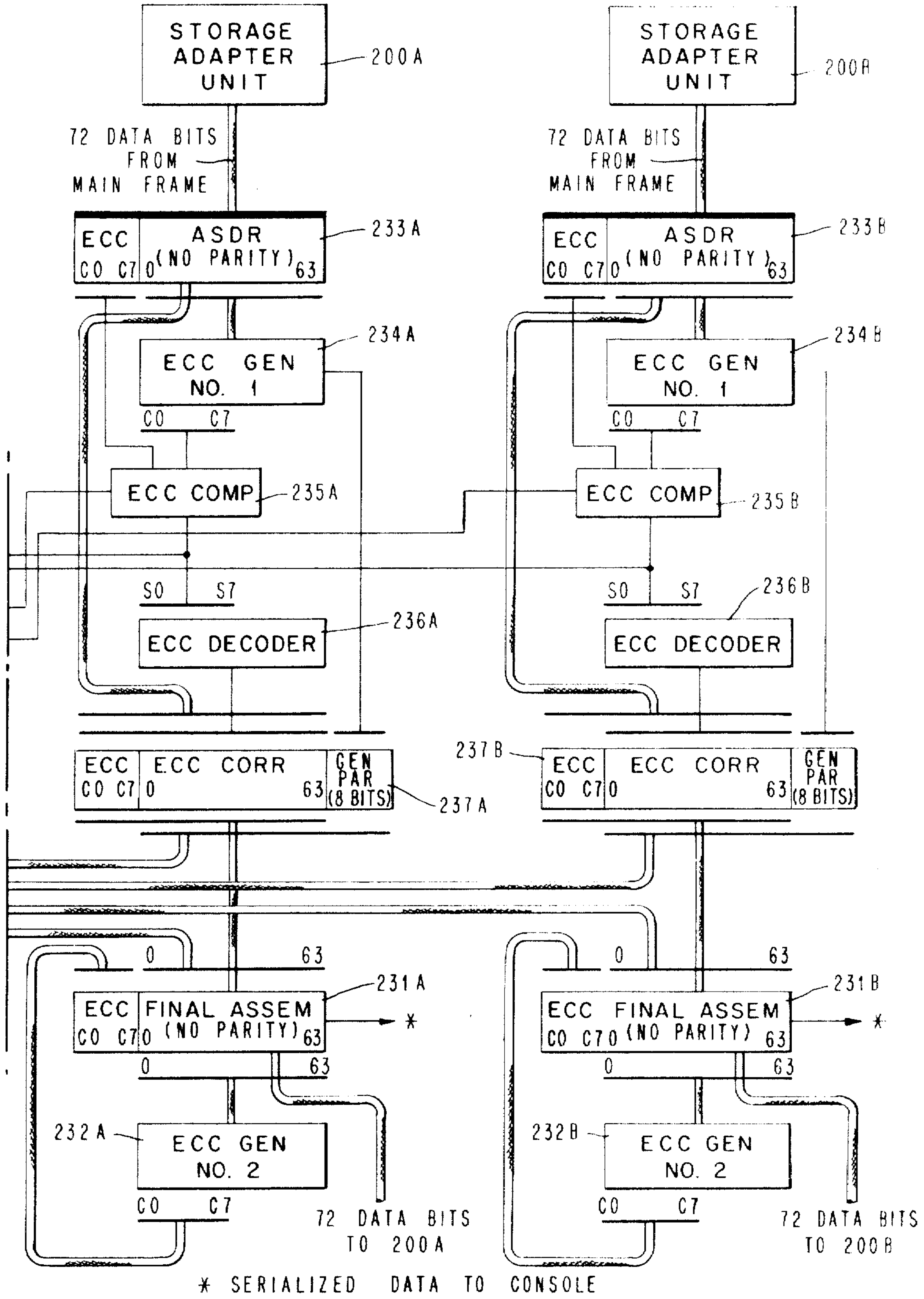
Figures 7, 7A:
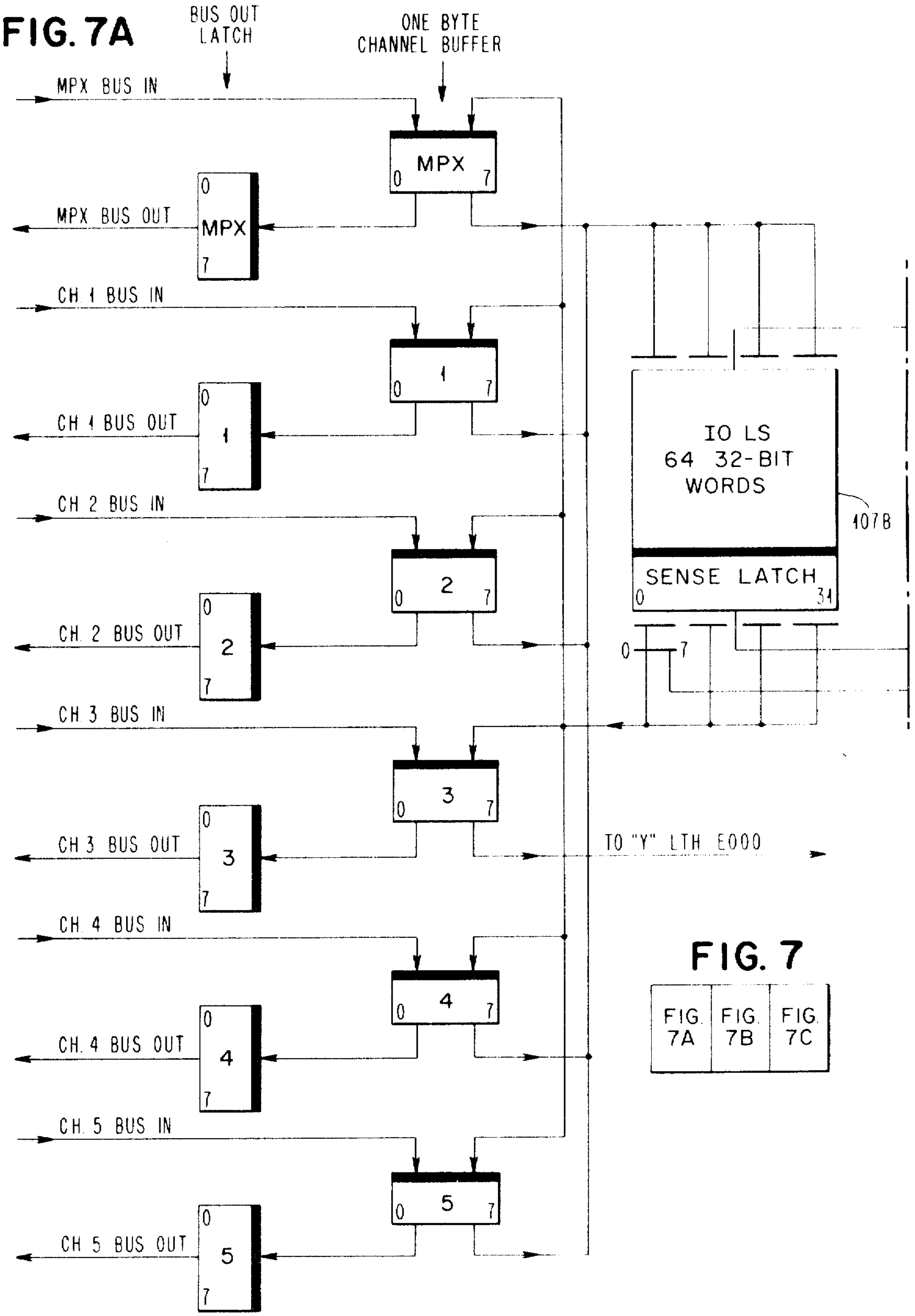
FIGS. 7A through 7C, connected as shown in FIG. 7, represent a data flow diagram of the input-output subsystem of the same data processing system.

FIGS. 6A—6F, arranged as indicated in FIG. 6, represent the storage system which holds the bulk of data immediately used by processing and input-output systems of FIGS. 5 and 7.

The main storage system includes a number of relatively slow access large capacity main storage matrices (e.g. core storage matrices with 2 microsecond access cycles) suggested at 200 in FIG. 6F and a faster access smaller capacity subsidiary store shown at 201 in FIG. 6D (e.g. LSI stacks of storage flip-flop circuits with common access gates and wires and cycle time of approximately 230 nanoseconds).

The large slow access main store matrices 200 each contain between 32,000 and 128,000 byte (quarter-word) data representations with adaptability to further expansion. Data entering and leaving main matrices 200 must pass through the storage adapter unit shown in FIG. 6E and through portions of the bus control unit BCU shown in FIGS. 6A—6D. The fast access 2,048 word subsidiary buffer store 201 (2048 words = 8192 bytes = approximately "8K" bytes) and its controls are incorporated in the BCU.

The function of the BCU is to regulate the flow of data signal representations, between main storages 200 and subsidiary storage 201 and between the CPU and channel systems of FIGS. 5 and 7 and storages 200, 201 to reduce average access time needed to retrieve stored information.

The matrices 200 and 201 are divided into 4,096 byte (4K byte) sections called "books." Books are subdivided into 32-byte sections. Pages are subdivided into 16-byte block sections. Thus there are two blocks (eight words or 32 bytes) in a page and 128 pages in a book section of either store.

Information is moved from main store 200 to subsidiary store 201 in block (four-word) units and between either store and the CPU or channel system in single word units. To each page section in the main stores 200 there are assigned two fixed page sections in subsidiary store 201; one in the upper 4K compartment and another in the lower compartment. Thus in seeking to obtain a word of information from any address location of the main-subsidiary storage system, it is only necessary to know whether the associated block is presently represented in the corresponding subsidiary store block and page sections in order to be able to shorten the access cycle to the information word. This information concerning the status of the subsidiary store sections is provided by the index array 204 as described below.

The BCU of FIG. 6A—6D is capable of interfacing with up to 4 storage adapter units of the type shown in FIG. 6E and thereby capable of interfacing with up to 8 slow access large volume main storage matrices of the type suggested at 200 in FIG. 6F.

Figure 7B:
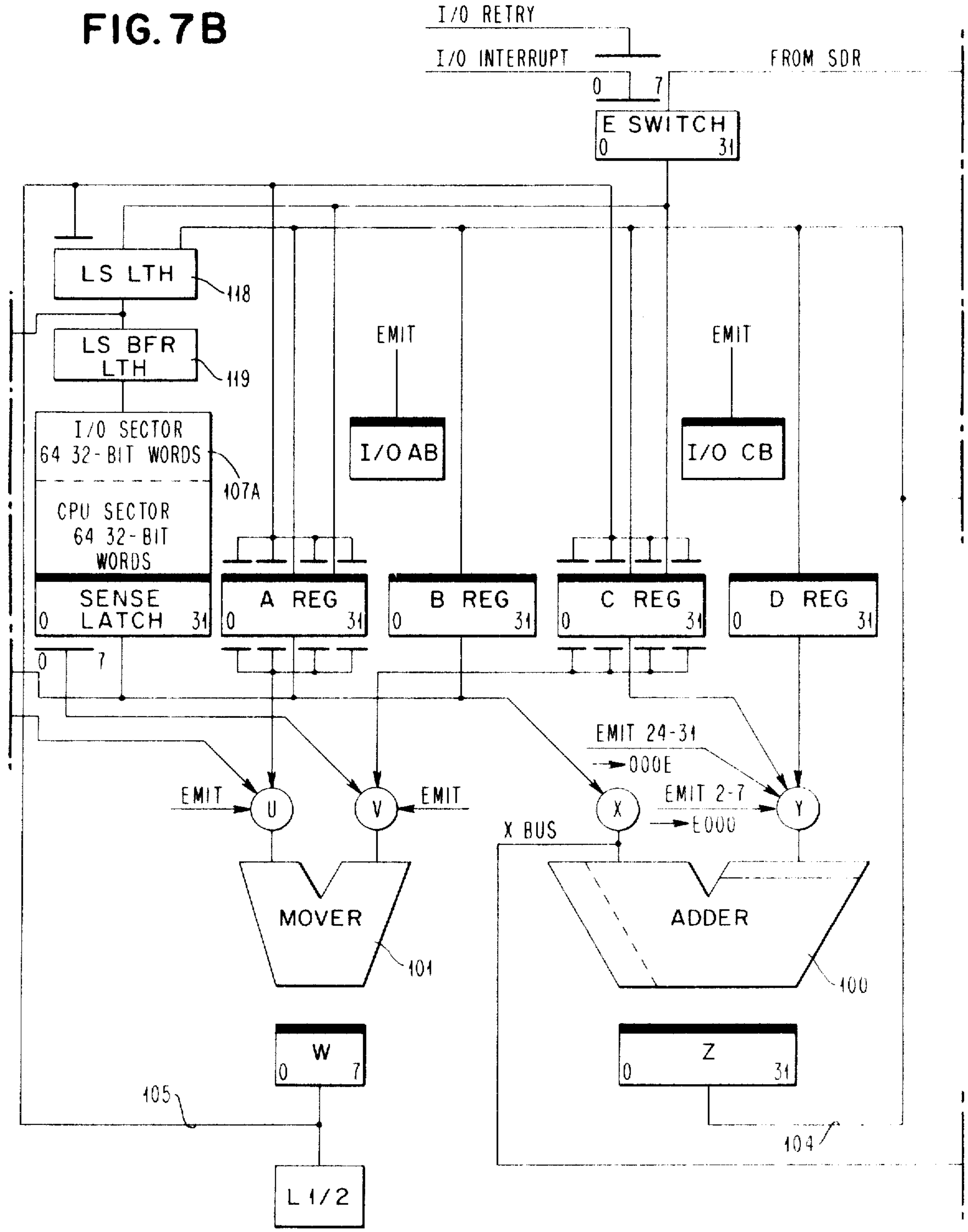
Figure 7C:
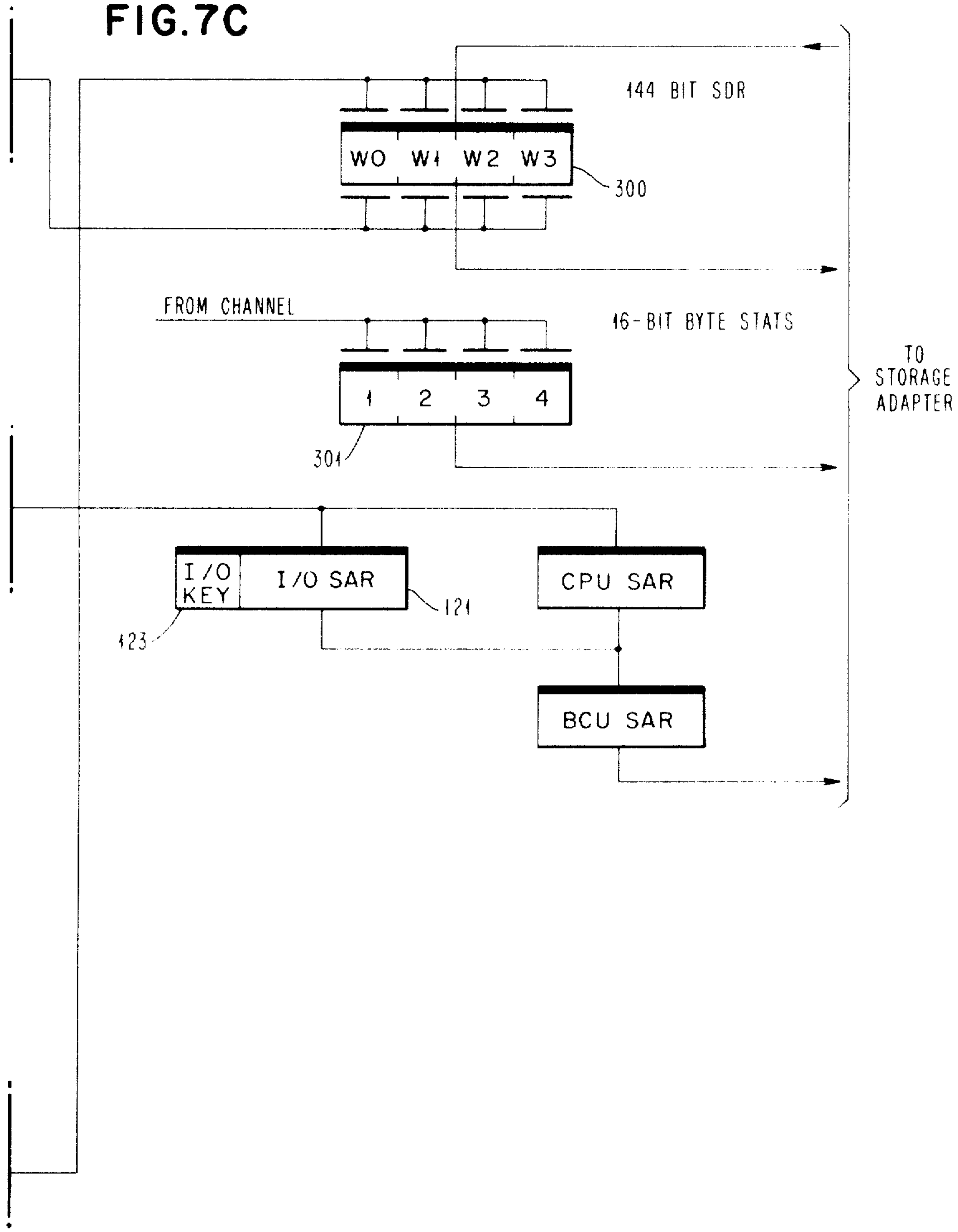

Information to be entered into storage is first presented to the BCU at X Bus Extension 202 (FIG. 6A) of the "X bus to Storage" cable (FIG. 5B). Information extracted from storage leaves through AO Switch (FIG. 6D) and enters the CPU-Channel flow at External Switch (FIGS. 5B, 7B). Such extracted information is presented to the External Switch in double-word (64-bit) parallel groups from which the desired word(s) is (are) selected one word at a time.

Storage addresses are transferred to the BCU, at CPU-IO SAR bus extension 203 (FIG. 6A), from the SAR registers of FIG. 5C. "Remote SAR" extensions to the address path 203 (shown in dotted outline in FIG. 6A) enable the storage system to be addressed by multiple CPU's in a multiprocessing environment.

On "fetch" (extraction) operations the information is preferably obtained from subsidiary store 201 and the main store array is not cycled, thereby effectively reducing the extraction access cycle. If the information is not in the subsidiary array 201 the main array 200 is cycled once and the subsidiary 201 is cycled twice to transfer a block (four words) of information to the subsidiary store within an assigned page area (buffer page assignments are made when a first access to an unassigned page occurs even though transfers are made on a half-page, or block, basis).

On "store" (insertion) operations CPU information is entered into the main and subsidiary arrays concurrently. The two arrays are cycled at their different rates for this purpose when a store micro-order issues from CPU ROSDR. Channel information is stored only in the main arrays. The paths to storage are described in more detail below.

In a fetch operation index array 204, address decoding logic circuits 205, compare circuits 206—207, and decoding logic 201A (in FIGS. 6C and 6D) determine the presence or absence of addressed information in subsidiary storage 201. If the information is present it is extracted rapidly from array 201 and the slow main array 200 is not cycled. If not present the main array is cycled to produce the block containing the desired information and the subsidiary array is cycled twice to store the block in its corresponding address location. Simultaneously the addressed portion of the information is transferred to the requesting address source (CPU or Channel), and an assignment indication is placed in the index array to indicate the block transfer (and if necessary the page assignment; e.g. on first reference to any page).

Determination of whether addressed information sought to be fetched is present in subsidiary array 201 is accomplished as follows. The portion of the address specifying page position is decoded by decoder logic 205 to produce from the index array two sets of address indications stored therein. One set is associated with the upper compartment of array 201 and the other is associated with the lower compartment. Each indication includes a book address, two "Valid" bits allocated to the two blocks of the associated page, and one "OK" bit. The two book address indications are compared in circuits 206, 207 with the book address section of the address on bus extension 203. On an affirmative comparison the Valid and OK bits of the matching indication are examined by the circuit 206 or 207. If the Valid bit indication assigned to the addressed block (half-page) is a "1" (indicating that information is stored in the corresponding subsidiary store location) and the OK bit is On (indicating that the information in this subsidiary store address is currently the same as that in the corresponding main store address) the information is extracted from subsidiary store 201 (by completing the decoding of the address on the address bus and selecting upper/lower compartment of subsidiary storage according to the output of comparison circuits 206, 207). The double word (64 data bits and 8 parity bits) extracted from the addressed location of store 201 is transferred through AO Switch 208 to the CPU External Switch (FIG. 5B) where one of the two words is selected for admission to the CPU system.

If the compare circuits 206, 207 indicate that information sought to be fetched is not present, or not up-to-date, in subsidiary store 201, the main array 200 is accessed. The information of an entire block (four words) is retrieved and entered into subsidiary store 201 (through Adapter Out-Gate of FIG. 6E, BCU Input Switch of FIG. 6B and SDR register of FIG. 6B). At the same time the portion of the information actually addressed is sent to the CPU External Switch through the AO Switch 208 and its bypass connection to the cables feeding into store 201. In such transfers the corresponding section of the index array is brought up-to-date by modifying the appropriate Valid bit assigned to the transferred block and by modifying the book address and OK bit indications if necessary. Such is necessary if the page being addressed is not presently represented in store 201 or, if represented, not up-to-date (OK bit previously set at 0).

Buffer assignment latch 209 (FIG. 6D) determines the handling of index array modification (new compartment assignments in buffer 201). This latch is turned on by compare circuit 206 and off by compare circuit 207. New assignment is required when the compare circuits fail to issue a book match indication. At such times the immediate latch condition reflecting last earlier use of the array 201 determines compartment selection (off-upper, on-lower), unless the Valid or OK bits in the associated index array page position indicate page occupancy in one compartment address and vacancy or availability of space in the other compartment address. In the latter case the vacant compartment address is assigned.

Thus when an unequal index address comparison causes a transfer from main to subsidiary storage the subsidiary store upper/lower compartment and corresponding index array position selected for the operation are determined either by the last position of Latch 209, if Valid and OK bits in the corresponding right/left (upper/lower) positions of the index array, reflect complete vacancy or full occupancy conditions in both compartments, or by logic controlled by the Valid and/or OK bits when such is not the case.

In an index array new page assignment the corresponding page position of the index array, in the right/left position corresponding to the selected upper/lower subsidiary store compartment, is modified to indicate the book address of the newly transferred page block, the Valid bit assigned to the transferred block is set to 1, and the OK bit of the same index array position is set to On (to reflect at least partial currency of information in the corresponding subsidiary store space).

On store operations (CPU or channel transfer to main store array 200) the index and subsidiary arrays may be modified. In a CPU store the information to be stored may also be placed in subsidiary array. The index array is interrogated at the page position being updated and if a matching book indication and block Valid bit are found the information sent to main store (from SDR, FIG. 6C and BCU Out Switch) is also entered into subsidiary store 201. Since either a word or a byte may be handled in such operations the word and byte address information are used to select for modification only the desired portion of the selected block position of the subsidiary store.

Channels store and fetch data only to and from main arrays 200. When a channel is storing data the index array is interrogated and if the address is presently represented in the subsidiary store the block Valid bit for that address is set to 0. The storage protection system indicated at 209 receives program established protection key information from the key registers of FIG. 5C and utilizes the same to determine whether any reference to storage is in violation of prearranged protection assignments represented by keys in storage protect array 210. A protection violation indication is obtained at 211. When a violation is obtained in this fashion, data being transferred from either the subsidiary store 201 or the main store array 200 of FIG. 6C is blocked before it can pass through the CPU external switch of FIG. 5B.

The pattern and configuration registers in FIG. 6D in combination with the ESS bus out and response register units shown in dotted outline in the same figure enable the storage system of FIGS. 6A—6F to be utilized by multiple CPU systems of the type shown in 5A—5C in a multiprocessing system. The pattern register establishes intercommunication connections from the BCU out switch 215 to multiple storage adapter units of the type shown in FIGS. 6E—6F through the ESS bus out unit. The ESS response register reflects the connection status of each CPU, channel, and storage adapter unit in such a multiprocessing system.

The storage adapter (FIG. 6E) is a logical appendage to the main store array 200 (FIG. 6F). The main store array 200, is actually subdivided into two discrete storage arrays 200A and 200B. These cooperate with the circuits of the adapter shown in FIG. 6E to transfer information between the BCU of FIGS. 6A—D, or between the CPU-channel circuits and the main arrays. The adapter includes error correction code (ECC) handling circuits capable of generating and utilizing Hamming-type error correction codes as information is transferred relative to storage. Within the store 200A, B information is carried in 72 bit (8 byte) units of which eight bits are supplemental error correction code bits and 64 bits represent the actual stored intelligence.

Incoming data (Store operation) is received in the adapter input register 230 in word units of 32 bits each (4 bytes) accompanied by four parity checking bits, one for each byte of the word. Incoming words are checked for correct byte parity as they are fed into the register 230. Up to five words (Words 0—4) may be assembled in register before the storage arrays are cycled.

The information supplied to the adapter input register through the BCU out switch 215 of FIG. 6D is arranged to include as a first word (word 0) the address to be selected (SAR) and the fetch or store operation (OP) to be performed relative to such address. The other four word spaces of register 230, taken in double-word groups (words 1, 2 and 3, 4) couple respectively to the two halves 200A, 200B of the main storage array.

On a Store operation the two halves of the array, 200A, 200B are cycled concurrently with reference to the address location represented by word 0 of register 230 and words 1 4 of register 230, or portions thereof, are transferred to the selected location during the write phase of the cycle The transfer takes place through final assembly registers 231A and 231B (FIG. 6F). Error correction code generating circuits 232A, 232B (ECC GEN NO. 2, FIG. 6F) insert newly generated ECC codes into ECC code positions of registers 231A and 231B.

On a fetch operation four words of information (one block) transfer in parallel from matrices 200A, 200B to corresponding sections of adapter storage data registers (ASDR) 233A, 233B. New ECC codes are calculated in ECC generators 234A, 234B (ECC GEN No. 1) and compared to the stored supplemental ECC codes in comparators 235A and 235B. Errors are picked up by ECC decoders 236A, 236B, and applied to correction units 237A, 237B, to identify and correct the particular bit or bits in error. Units 237A also generate byte parity bits and forward the corrected information, with byte parity added and without ECC code, to the adapter out gate 238 (FIG. 6E). Gates 238 connect to the BCU and CPU through sections of the BCU-SDR register 240 shown in FIG. 6B. The information issuing from the ECC correction logic 237A and 237B also transfers to the final assembly registers 231A and 231B retaining the supplemental ECC code, but not byte parity, for regeneration of storage during the restoration (write) phase of the cycle.

All storage operations are initiated by a request signal. A store operation involving the assembly of five words in the adapter input register 230 must be synchronized with the CPU clock. Thus, in a first storage "subcycle" (CLK 0) of 115 nanoseconds duration a first word is sent from BCU to Register 230 (FIG. 6E) to establish the address and function (fetch, store, or other). Then in four subsequent subcycles, coinciding with CPU clock cycles (CLK 1—CLK 4), four words of information (words 1—4) are placed in Register 230, at intervals of 115 ns.

On fetch operations a "PROCEED" signal to the requesting BCU signifies an initial phase of extraction of data from the main arrays 200A, 200B. Consecutive 125 nanosecond pulses originating in the adapter system control the transmission of double words from outgoing logic 237A and 237B to the respective low and high sections of the SDR register 240 (FIG. 6B) of the BCU.

A word section of the main array 200A, set aside to hold a timing word (HR timer) is stimulated from time to time to disgorge its contents through the timer register 250 (FIG. 6E) and adapter outgate 238 (FIG. 6E) to the BCU and CPU. CPU interruptions are induced when the timer word changes value from positive to negative. The backup address register SARBU 251 (FIG. 6E) preserves each address reference to the main array 200A, 200B in order to retain for examination the addresses for which error correction actions have been taken.

In a multiprocessing environment an adapter and pair of main storage arrays such as 200A, 200B constitute a configurable unit or module. Such units can be electrically isolated from the associated CPU units by means of partitioning switches. Switches performing this function may be controlled through programming and use of the ESS interface (FIG. 6D). ESS (establish subsystem) instructions executed by CPU units (FIG. 5A—5C) are effective to cause status conditions to be established in the pattern and configuration registers and associated ESS elements (FIG. 6D) which represent switch conditions effectively partitioning the system.

Input–Output Subsystems (Channels)

The basic channel system consists of one multiplexer (MPX) channel and up to five selector channels (CH1—CH5). The channels are partially integrated with the CPU system; that is the channels use portions of the micro-operation control section of FIG. 4 and the data flow and ALU sections of FIG. 5A—5C to perform their input-output (I/O) functions. The channels also have individual controls by means of which they are able to function independently of the CPU elements; for example to execute operations which do not involve exchanges of information with storage.

The channels utilize the BREAK-IN technique previously described to exchange information with the main storage system of FIGS. 6A—6F. Channel transfers are made only to the main storage arrays 200 of FIG. 6F leaving the subsidiary storage array 201 of FIG. 6D free to service the CPU. However, the index array 204 associated with the addressing of the subsidiary array 201 is interrogated during channel transfers and if the desired address of storage is presently active in the subsidiary array, the Valid bits for that page of the subsidiary array are turned off to prevent use of "obsolete" data.

Each channel includes a 9-bit buffer register and two 9-bit busses (bus-in and bus-out). The 64 word local store array 107B (FIG. 7A) serves as a link between the channel and the main storage system of FIG. 6E—F. The channels transfer data in stages through the local store, and CPU elements, to the storage connecting register 300 FIG. 7C and the address register 121—123 FIG. 7C. The byte stats 301 permit the channels to control the storage adapter unit of FIG. 6E to extend transfer control into the storage arrays 200 (FIG. 6F).

When the channels have control of the CPU data flow (I/O mode) the local store section 107A is employed. Eight words out of this array serve to hold channel control information. To use this section of local store, channel information must pass through the section 107B, the adder X bus and its connection via the latch registers 118 and 119 to the section 107A.

The local store section 107B (I/O LS) and the section 107A have similar cycle timings but different actions during the cycle. The section 107A is cycled twice during a CPU cycle, once for reading information and once for writing information. The I/O LS section 107B is also cycled twice during any CPU cycle but once for reading or writing information under control of the microcontrol section of FIG. 4 and once for reading or writing information under the control of the individual control hardware within the channel currently receiving service.

Each channel has two 9-bit buffer registers (9 bits = one byte = 8 intelligence or command bits + one parity bit). One such register in each channel receives information from peripheral devices via a Bus-In connection and the other such register emits information to external equipment via the Bus-Out connection. The first mentioned register is connectable to the second register for queueing information during outgoing transfers from the local store stack. The channels also have a direct connection not shown to a byte section of the Y input of the Adder 100 for purposes not particularly relevant to the present discussion.

Each channel has an individual address register ROAR in the control section of FIG. 4 (see registers 70—75).

Priority control circuits, not shown in any of the figures and not particularly relevant to the present discussion, are utilized to enable the channels to engage the CPU and storage in a variable order of priority according to urgency. The variable priority system is generally similar to that disclosed in copending Pat. application Ser. No. 486,326 filed Sept. 10, 1965 in behalf Peter N. Crockett et al. and assigned to assignee of the present invention. Insofar as it is relevant to the present discussion the disclosure of said application of Crockett et al. is incorporated herein by this reference. Lowest priority is given to the CPU program function (CPU mode operations).

Channel functions are initiated by the CPU (in CPU mode) through execution of I/O instructions. Engagements with the channel during the execution of such instructions for initiating the I/O function of the channel (e.g. the channel activities necessary to secure the command information upon which the channels will function) are accomplished by using the CPU ROAR Register 76 (FIG. 4) as the source of the initial microinstruction address of the CPU mode engagement routines. The connections from the channels to the channel ROARS 70—75 and the connection of the CPU to the CPU ROAR 76 are not shown in FIG. 4 but are understood hereby to be included.

Engagements with the channel occurring during execution of I/O instructions require conditioning of the CPU to I/O mode. This is accomplished by a micro-order issuing through the read only store data register ROSDR (55, FIG. 4) which conditions the L2 register (FIG. 7A) to designate the channel to be engaged, whereupon the channel issued the request necessary to set the mode trigger of FIG. 4 to the I/O mode condition for the desired engagement routine. In such engagement routines the channel utilizes the CPU ROAR register 76 of FIG. 4 as the means for exercising control over the CPU microprogram although the CPU ROAR register is normally used to retain the last CPU mode microinstruction address preceding a BREAK-IN.

The channels communicate with the storage through the BCU (FIG. 6A—6D), reaching the BCU through the CPU Adder X Bus path to storage and I/O storage address register path (IO SAR) to storage address controls in the BCU and adapter system of FIG. 6A—6F. The channel has the ability to fetch or store up to four words of information on each storage access, such exchanges being carried out between the local stores 107A, 107B and the main store array 200A, 200B of FIG. 6C.

The ability of the individual channel control hardware and the I/O Mode microprogram controls to time share the I/O local storage 107B within a CPU cycle is useful to enable the channels and CPU to function concurrently to accomplish data transferring functions. Thus, for example, one channel may during a portion of a CPU cycle be entering data into the local store section 107B under its individual hardware control while data of another channel is being exchanged between the section 107B (FIG. 7A) and the main store arrays of FIG. 6C. Thus the channels need only interrupt (by BREAK-IN) the ordinary processing functions of the CPU when exchanges between main storage and the local storage array are required.

Each channel is allocated eight full words of local storage capacity in the I/O local store array 107B and has an additional buffering capacity of one byte in the individual buffer register connected to the channel Bus In.

The channels have the following control registers not shown in the drawing of FIG. 7A:

Data address byte register (DAB)—This is a 5-bit register (four bits plus parity); it is set to the four low order bits of the data address from the adder output (Z) bus (FIG. 5D). This address segment can be fed to the Y bus input of the adder FIG. 5B to be decremented during a channel storage transfer routine and is also used to point to the starting position of a record in the local store buffers.

Last word count register (LWC)—This is a 6-bit register (five bits plus parity) also set from the adder Z bus outlet, and also connectable to the adder Y bus inlet for decrementing. Its value is such during a channel routine that it should go to zero when the last storage operation is completed.

End Register (ER); a 6-bit register (five bits plus parity) settable from the adder Z bus and pointing to the last word and byte address in local store of a record.

Buffer Address Control Counter (MUP); a three bit plus parity register reset to zero at the beginning of an operation and incremented as words are transferred to or from main storage relative to the buffer local storage. This register keeps track of the word address for microprogram control of the buffer local store.

Difference Counter (DIFF); A two bit plus parity register used to keep count of the number of empty word positions in the buffer local store 107B (FIG. 7A). In Channel Write routines (main store to local store transfers) a main store data fetch is initiated when the number representation in this counter has a value of four or more. On In Channel Read routines (local store to main store transfer) this counter indicates the number of full word buffers waiting to be unloaded, and requests store cycles of main store when this number is four or greater. This counter is incremented and decremented as word buffer posit positions are filled or emptied by main store transfer actions. It is set initially to eight for Write transfers (main store to local store) and zero for Read transfers (local store to main store).

Word and byte address counters. The Word address counter (WAC) is a three bit plus parity counter used together with the byte address counter (BAC), which is a two bit plus parity counter, to control the word and byte address designations set into the buffer local store address registers during data transfers to or from the buffer local store relative to either main store or the channel Bus-In interface.

The channels also have numerous STATS or status indicators which connect to the A and B condition input nets 90 and 91 of the A and B branch logic 57, 58 of the control section of FIG. 4.

Channel individual control hardware includes several rings (ring counters) for indicating the full and empty condition of the various channel buffer registers, whereby desired transfers between I/O local store and the one byte buffer registers may be effected. In obtaining control from the CPU (CPU mode to I/O mode BREAK-IN transfers) each channel is required, during CPU execution of the I/O instruction in which the initial engagement of the channel takes place, to establish in its associated ROAR (70—76, FIG. 4) the initial address of the subsequent routine by means of which subsequent engagements are to be handled. During such subsequent engagements (i.e. on conclusion of an I/O BREAK-IN routine) the channel microprogram establishes the initial condition for the successor routine in the associated ROAR as the last operation of the current routine.

System Control Panel (Console)

The system control panel (FIG. 8A, 8B) is a modular, but integral part of the system under consideration. It houses the controls and circuits for monitoring and indicating system status. It also houses manual controls for operating the system and cooperates with SERAD in transmitting system status to external equipment, and in receiving simulated manual status inputs from external equipment. FIG. 8A contains the exterior view of the panel and its controls and FIG. 8B contains the flow diagram characterizing the handling of information within the console logic circuitry.

The panel provides the facility to reset the system, to store data in main storage under manual control and to display information in main storage or in CPU registers. It also permits loading of initial program information. The panel structure of FIG. 8A is mounted on a larger console unit not shown which houses the LD (Load Diagnostic) microdiagnostic file described later in connection with FIG. 25 and a keyboard printer (not shown) through which printouts are obtained of information developed by the processing system.

The console circuitry is packaged in large scale integrated (LSI) unit packages as are all of the circuits previously described for the SERAD, CPU, storage, and I/O systems.

The console logic provides the following controls and functions:

1. Manual controls including an operator control panel, operator intervention controls, and manual and diagnostic controls for maintenance personnel.
2. Display and log: Includes display indicators and log monitoring circuits.
3. Diagnostic entry control (includes controls over inputs from SERAD to the console register 320 manual simulate path—and manual entry controls to the same register).

In general the manual controls are used to initiate CPU functions via microprogram action. The console register 320 provides a focal point for moving signals between the console and CPU registers (note outputs of console register to CPU registers, via External Switch, and controls, via line 66 of FIG. 4 and inputs from CPU registers via Adder Output Z Bus of FIG. 5B). A portion of the information supplied to the Console Register (Part of Byte 0) may be decoded in console circuits (OP DECODE) as control information designating the handling of other portions of the information in the console register to other parts of the console and CPU Systems. This in conjunction with the console clock 321, bit ring 322, and byte counter 323, determines fully the operation of the console as a subsystem of the complete system. A connection from the CPU clock system to the console clock 321 permits console operations to be carried out in synchronism with CPU functions.

Data may enter the console one bit at a time through the serialized data line 324 which couples to the CPU circuits through the serializer net illustrated in FIG. 23 and discussed later. This net spatially integrated with CPU circuits monitored by the console, receives its selection signals from the clock, bit ring, and byte counter 321–323 of the console.

Data may be supplied to the console one byte at a time from the CPU Adder Output (Z bus) connections to console register 320. This connection to the Adder Z bus and connections from the output of the register 320 to line 66 of the system control section (FIG. 4) enables a program utilizing the data flow of the CPU to communicate indirectly, through the console register, with the addressing controls of the microprogram control over a system microprogram or microoperation. The data fed to the control section may be modified in passage through the ALU Logic of the CPU for additional flexibility of control.

Status information arriving one bit at a time through line 324, or one byte or more at a time through the Adder Z bus connection to the console register 320, is channeled into the console byte register 325 under control of the clock system 321—323 of the console unit. Console bytes are each 10 bits in length and consist generally of eight status or information bits, one supplemental parity bit, and one parity check status bit. The parity check status bit indicates the parity condition of the nine other bits of the byte resulting from a checking manipulation of the eight information bits and associated parity bit in a parity checking circuit.

The byte register output is connectable to either a 512 byte storage array constructed of integrated circuit triggers arranged with common accessing wire in a manner similar to the local storage and subsidiary storage arrays of FIGS. 5—7. The output of the byte register is also connectable directly, through the switch 326 designated AO switch, to a register 327 designated ID register. The same switch 326 and register 327 are connectable to receive byte outputs of the 512 byte store 330 through an intervening buffer register 328. The output of the said buffer register 328 is also connectable through lines 329 to the console register 320 whereby the information stored in the console storage unit 330 may be transferred a byte at a time, through the external switch connection lines 331, into the CPU data flow FIGS. 5A—5B). Thus the console unit is capable of reciprocally assembling up to 512 bytes of CPU status information in its storage 330 and afterwards transferring the same to the main or subsidiary storage units of the main system through the CPU external switch connection. This connection to the CPU external switch is designated "-console" in FIG. 5B of the CPU drawing.

Data in the ID register 327 may be applied either to the drivers of the console panel indicator lights, via connection 333, or to the SERAD output system of FIG. 3C. When connecting to SERAD the console storage addressing and the ID register input are established by SERAD control signals on the lines 335 through 337. Lines 336 and 337 carry control signals from the SERAD control section 38 (FIG. 3B) to gate 340. Signals furnished by this gate operate the AO switch 326, and other console control elements (not shown) to transfer information selectively, from either the byte register 325 or the buffer register 328, into the ID register 327.

The SERAD log transmit output 341 of the ID register feeds SERAD shift register 31 (FIG. 3C) and buffer register 41 (also FIG. 3C). The eight status bits of each 10-bit byte in the ID register 327 are set into the buffer 31 and the parity bit and parity check status bit of the bytes are placed distributively in the eight positions of register 41. As previously described, information in SERAD register 31 is generally shifted out with a new SERAD parity bit appended to each eight bit group and SERAD start and stop bits also appended to each group, and intermediate each transmission of four status groups the associated set of eight parity and parity check status bits in the register 41 are transferred into register 31 for transmission as an interleaved group (with SERAD parity, start and stop bits added).

The console byte counter 323 counts from 0 to 512, and provides byte selection gating signals to the byte address gates of the console buffer store 330.

The bit ring 322 is a 10 stage ring counter stepped by impulses from the console clock. Together with the byte counter 323 it provides bit selection gate impulses to the status log serializer net of FIG. 27 ("log bit select to funnel") which connects to "serialized data" line 324. The bit ring 323 also controls distribution of inputs to the console. As the bit ring steps from its "nine" position to its "zero" position it provides an impulse to increment the byte counter by a unit step.

The console clock is a two stage binary counter which provides stepping impulses for advancing the bit ring and thereby advancing the byte counter. The console clock is stepped by ungated clock pulses from the CPU clock system 78 of FIG. 4. Console operations are generally performed in response to log out requests from SERAD (LOG XMIT) or the CPU (e.g. from status set by decoded signals from field SS of ROSDR, FIG. 4), the latter usually occurring in response to an unscheduled machine check (fault) condition or in response the scheduled handling of a diagnostic program instruction. This starts the operation of the console clock bit ring and byte counter and results in transfer of a serialized stream of system status bits to the byte register 325, from which a stream of bytes is transferred either to console buffer store 330 or ID register 327.

In response to other signals the console controls may be cycled to transfer the content of the buffer store 330 through registers 328 and 320 to the external switch of the CPU (FIG. 5B) from which the CPU microprogram may control further transfers into the CPU main storage arrays 200A, 200B of FIG. 6F. Thus a 512-byte set of logged information bits may be preserved both in the console storage 330 and in the substantially larger main storage array, 200A, 200B. Also the same information may be sent from the main store array 200A and 200B, through the normal I/O channel communication paths, to peripheral recording equipment of considerably greater capacity than the main storage for more permanent storage. The serializer net coupling to the serialized data line 324 is sufficiently extensive to enable the console buffer to gather status information from many elements of the CPU and channel units.

Data other than log information may also be sent to the console under CPU microprogram control. To do this the CPU sets the console register 320 (byte zero) to the function code 00000010 which is a particular function code denoting this operation. The CPU then transfers four other bytes selectively from any register through the adder bus (Z) outlet (FIG. 5B) into register 320. Byte one of register 320 receives the data byte which is to be stored in the console buffer. Byte two of register 320 receives (in bit position seven) the high order bit of the console buffer address. Byte three is set to the remaining bits of the console buffer store address, address control being exerted through control lines 345 for this purpose. The console register contents at byte position one are set into position of store 330 specified by the signals on lines 345 and the console (via OP DECODE and ENCODER circuits) sets a code 00100 into bit positions 1—5 of byte position zero of console register 320, thereby signalling the CPU microprogram that the operation is complete (a not shown console response line from OP DECODE to CPU accomplishes this).

To move the contents of the console store 330 to system main storage 200A, 300B (FIG. 6F) a "move log to main storage" operation is performed in which the console buffer data is transferred one byte at a time through registers 328 and 320 to main storage under CPU microprogram control. For this purpose again byte zero of register 320 is used as a function control and bytes two and three hold the address control for the console store 330. The function code for this operation, 100000011, is set into byte zero of register 320 by the microprogram controls of the CPU again through the CPU adder (Z) bus outlet. Byte one is set to all zeros (9 zeros) with valid parity. Bytes two and three contain respectively the high order bit and remaining bits of the console buffer address. Next the console buffer output in register 328 is transferred into byte position one of register 320 where it is "superimposed" over the all zeros byte. Next the console sets a 00100 code into bit positions 1—5 of the zero byte position of register 320 indicating to the CPU microprogram as before that the operation is complete. CPU microprogram then acts to transfer byte one of register 320 which represents the data transferred out of the console buffer 330, to the main store, of FIG. 6F, via one or more CPU registers. The foregoing procedure is repeated until the desired section of buffer 330 has been completely transferred into system main storage. The area in main storage assigned for such assembly may be assigned on a permanent basis to assure availability of space for log out functions as required.

The console also operates under SERAD control to transfer information from buffer store 330 to external equipment linked to SERAD. For this purpose SERAD, on receipt of command signals in its register 30, issues signals to the console causing the console address gates (LOG XMIT) via address lines 335. The console store cycles through a sequence of byte addresses the origin of which is designated by SERAD control information on lines 335. It will be recalled by reference to FIG. 3B that such control information is received from the SERAD control section 38 which in turn receives its information from the external equipment through terminal 29A and shift register 30. In this operation LOG line 336 is energized and the control extended from the aforementioned SERAD register 30 and control section 38 and console "log transmit" connection 335, produces a stream of byte from the ID register 327 into the SERAD output system of FIG. 3C. Here the parity and status information is segregated and transmitted to external equipment in the interlaced sequence previously described.

Another function performed by SERAD is that of transmission of status log information of CPU monitoring circuits (serializer net) through register 325 directly to console switch 326 without intermediate storage in console store 330. In this mode of operation the console clock and bit ring 321, 322 are induced to cycle to assemble a desired byte group of log bits from system elements designated by SERAD into the byte register 325 and such assembled bytes are transferred through switch 326 into register 327 and through the latter into the outgoing register 31 of SERAD (FIG. 3C) via lines 341.

A ten position rotary switch on the console panel of FIG. 8A controls manual diagnostic tests of the system. This switch (the diagnostic control switch) and associated internal circuitry within the console unit (both not shown) enable a system test technician to initiate "ripple" tests of the various system stores in these, addresses of the stores are selected in numeral sequence ("rippling") for testing. Data obtained from each store is compared to reference data or parity checked to determine whether storage is operating correctly.

System Timing

Timing of the various system clocking functions is pictured in FIGS. 9—14. FIG. 9 characterizes the basic 115 nanosecond cycle timing of the CPU logic and controls (ROS and clocks) and the CPU local store. As indicated in FIG. 9, a cycle of the subsidiary store 201 of FIG. 6A is approximately twice as long as a CPU cycle although only one-eighth as long as a main store cycle of the arrays 200A, 200B of FIG. 6F

Figure 10:
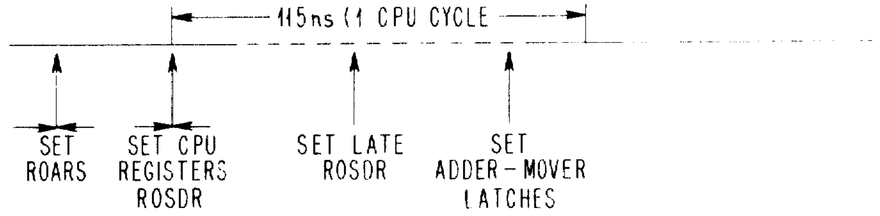
Figure 11:

On an expanded scale FIG. 10 indicates activities occurring at particular phases of a CPU cycle. FIG. 11 indicates the relative timing of local store access cycles. Note that two full cycles of access to local storage (read or write) require only as much time (115 ns) as one CPU cycle. Thus, for example, in one CPU cycle information may be read out of one local store position and written into a different local store position.

Figure 12:
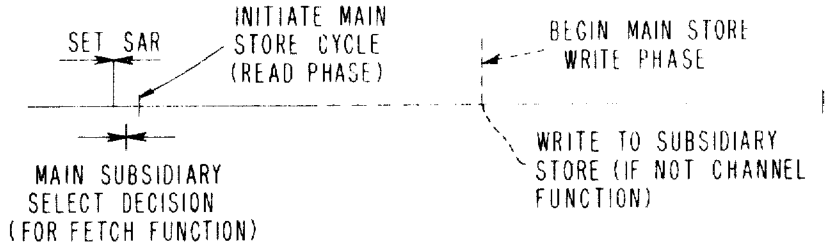

FIG. 12 indicates the relative timing of the cycles of access to main and subsidiary storage. Before a main store fetch cycle beings a logical decision is made, as previously explained, to determine whether the desired information is already available in the subsidiary store, whereby the cycle of access may be shortened. If the information is not available a cycle of access to main store is started.

A cycle of access to main store includes both a read phase and a write phase. In a fetch operation information signals are produced from storage during the read phase and transferred to the CPU. In a store operation information to be stored is transferred from the storage data register to the main store array. If the store operation is requested other than a channel unit (i.e. by the CPU) the same information is placed in the subsidiary store array by commencing a cycle of the subsidiary store array in coincidence with the write phase of the main store cycle.

Figure 13:
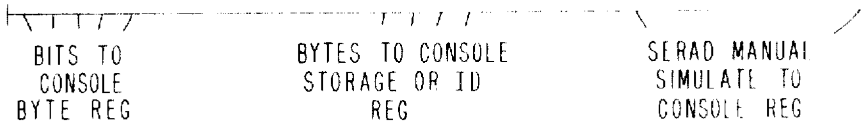

FIG. 13 suggests the sequence of operations of the console unit in relation to its monitor/logging function. As suggested in this drawing bits are supplied to the console byte register in discrete unit intervals, bytes are supplied to the console store or ID register in other unit intervals, and words or bytes are supplied to the console register, from SERAD or CPU (Z-bus) or manual elements on the console panel, in other discrete unit intervals.

Figure 14:
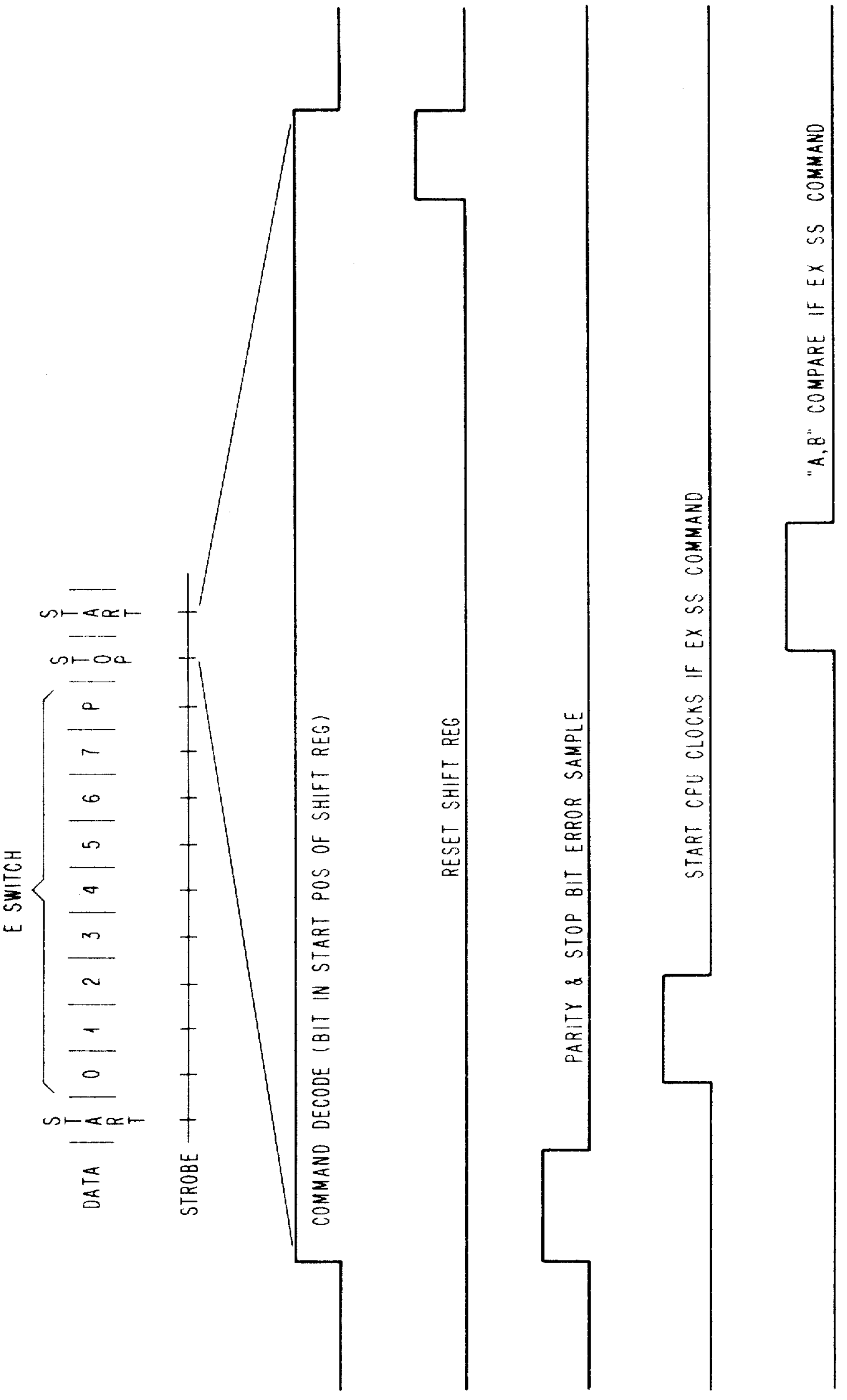

SERAD, as suggested in FIG. 14 receives messages in byte units of 11 bits each. Such byte units consist of a start bit, 9 intelligence bits, and a stop bit. Each bit is accompanied from the source by a strobe signal defining the bit midpoint. The strobe signal is used by SERAD to sample the incoming signal on terminal 29A into the last position of shift register 30 (FIG. 3A). As indicated in the exploded view in this figure, between the strobe of the stop bit of a byte and the strobe of the start bit of the next byte the information content of the shift register 30 is examined. If it represents a command to SERAD (Bit 7=1) it is decoded (COMMAND DECODE) after SERAD controls have validated the Start, Stop and parity bit portions of the byte of information then held in shift register 30. If the byte is not a SERAD command (bit 7=0), the data register 30 is transferred to one of the sections of Diagnostic register 32 selected according to the state of the Byte Counter shown in FIG. 3B. If the byte in register 30 is a SERAD command (Bit 7=1 and DATA MODE latch reset) it is decoded in control section 38 (FIG 3B) to establish a control action in SERAD and/or the system elements connected to SERAD. If the DATA MODE latch is set the system controls (ROSDR) transfer the information portion of the byte—in register 30 (Bits 0—7) to a CPU register via the External Switch (FIG. 5B). Once in a CPU register the information may of course be sent to any other part of the system under CPU control.

When a SERAD command operates the system (CPU) clocks in a testing function (EX SC COMMAND) the CPU clocks are started at an early phase of the interval in which the command is decoded, and at a later phase of the same interval in which the command is decoded, and at a later phase of the same interval an A, B comparison is performed as explained below.

Outgoing transmissions from shift register 31 are similar in form to incoming transmissions into shift register 30 except that between each series of four bytes of console log information an additional byte of segregated parity and parity check information is interlaced in the manner previously described.

SERAD Operation

Referring to FIGS. 3A—3C, 14, 15A—15F and 16, the SERAD unit operates as follows when receiving signals in shift register 30 from external equipment (e.g. LD disc or remote processor). The SERAD controls idle awaiting the appearance of a bit strobe signal from the external equipment connected to terminal 29A. Upon appearance of the first and each succeeding bit strobe signal register 30 is shifted left one bit position and the bit at 29A is placed in the Stop (right most) position of register 30. When a bit appears in the Start (left most) position of register 30 byte reception is complete. The parity (P) and stop bit positions of register 30 are validated before any further action is taken. If an error is sensed an Input Error latch is set in SERAD control section 38 and a control switch also in section 38 is examined to determine whether further action relative to the LD Disc system is required. With the control switch in disabled position the system resumes byte reception by resetting register 30 and awaiting appearance of the next bit strobe signal. With the control switch in Normal position the LD disc file to the SERAD input 29A is disengaged and a "WAIT FOR RESET" latch in section 38 is set, effectively placing the SERAD system in a stopped condition while trouble with the LD disc file system is diagnosed through manual or other means not shown. On resumption of operation register 30 is reset and the system awaits the appearance of a first bit strobe from the transmitting source. It is noted at this point that the LD disc file system is controlled to inhibit transmission of bit strobe signals from its "strobe track" until a desired segment of information track appears beneath the reproducing head of the disc. Hence the SERAD receiving system does not begin to receive bits until such time. The manner in which the desired track and sector of the disc are recognized is discussed later.

If the parity and stop bits of a just received byte in register 30 are both valid, the SERAD system proceeds to determine what next to do with the information.

Figure 15A:
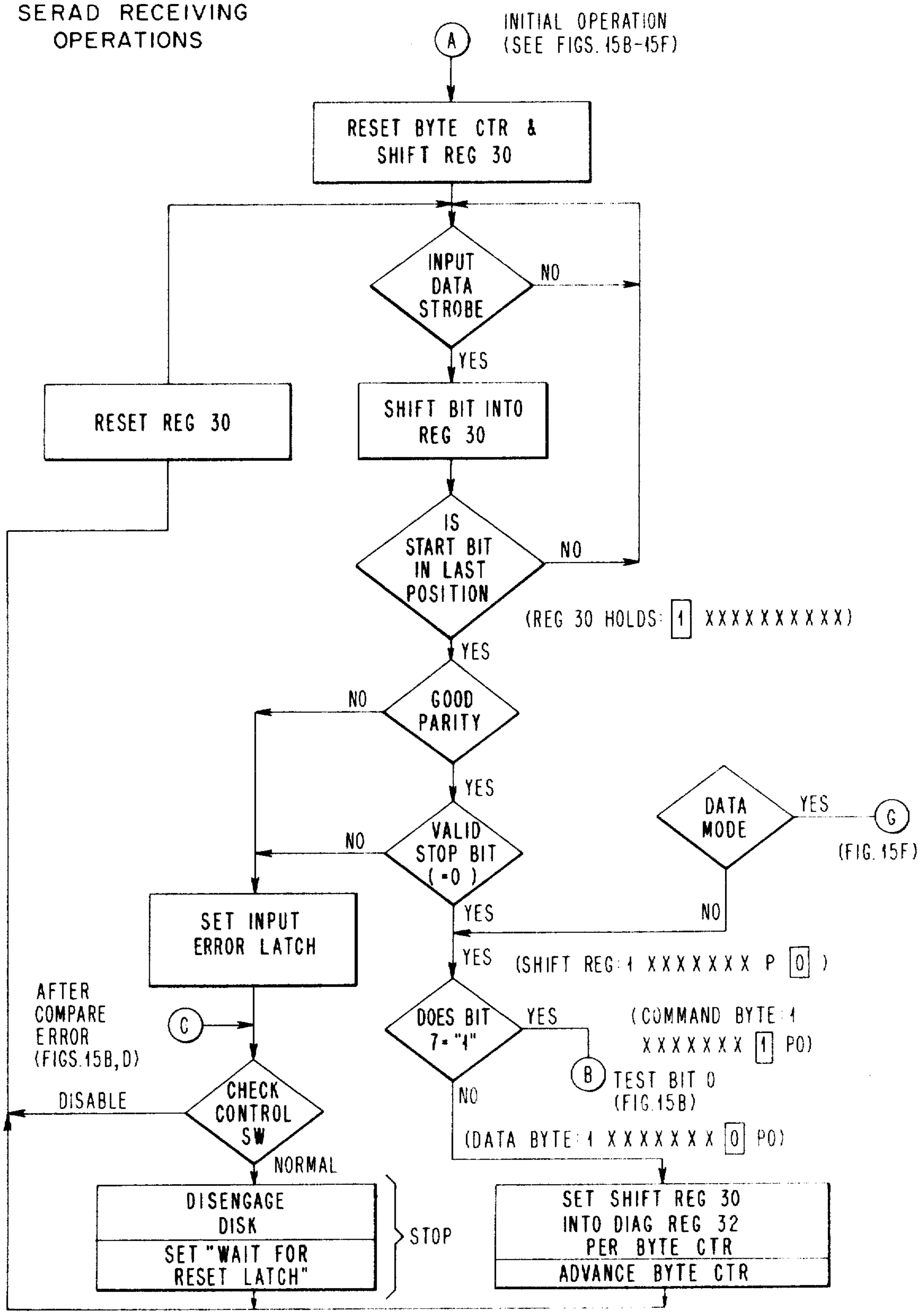
FIGS. 15A—15H contain flow charts of system operations performed in, or controlled by, the adapter.
Figure 15B:
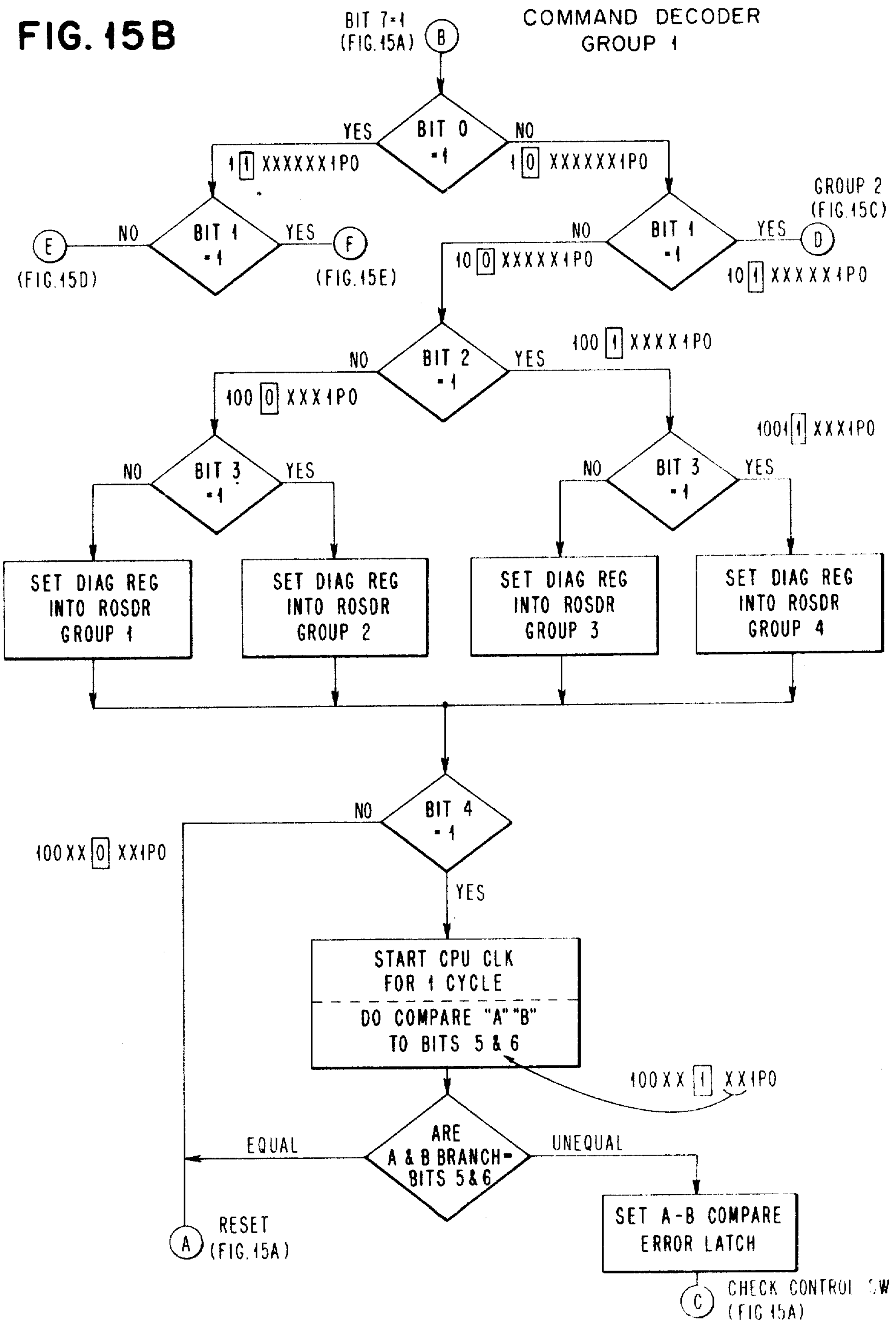
Figure 15C:
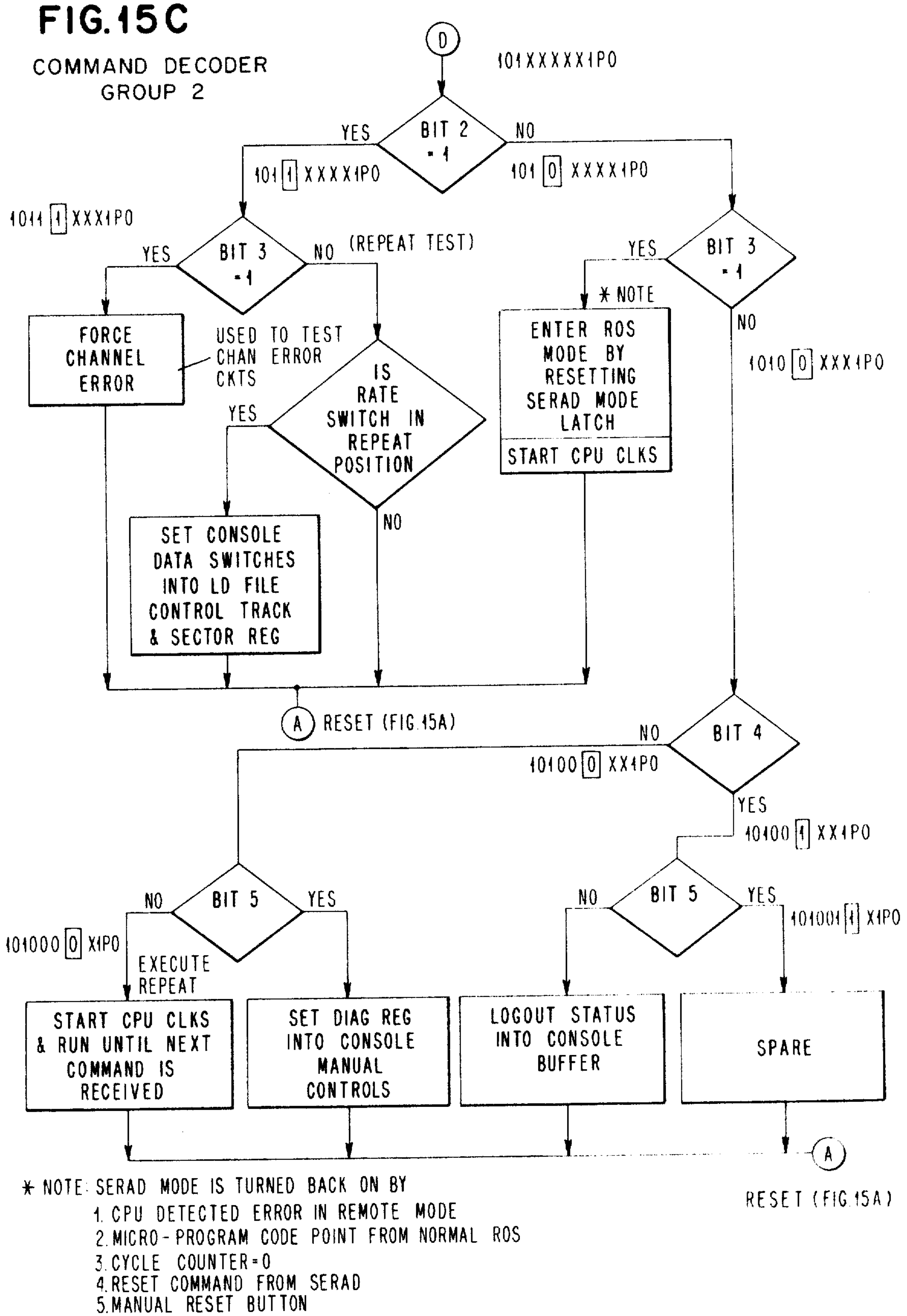
Figure 15D:
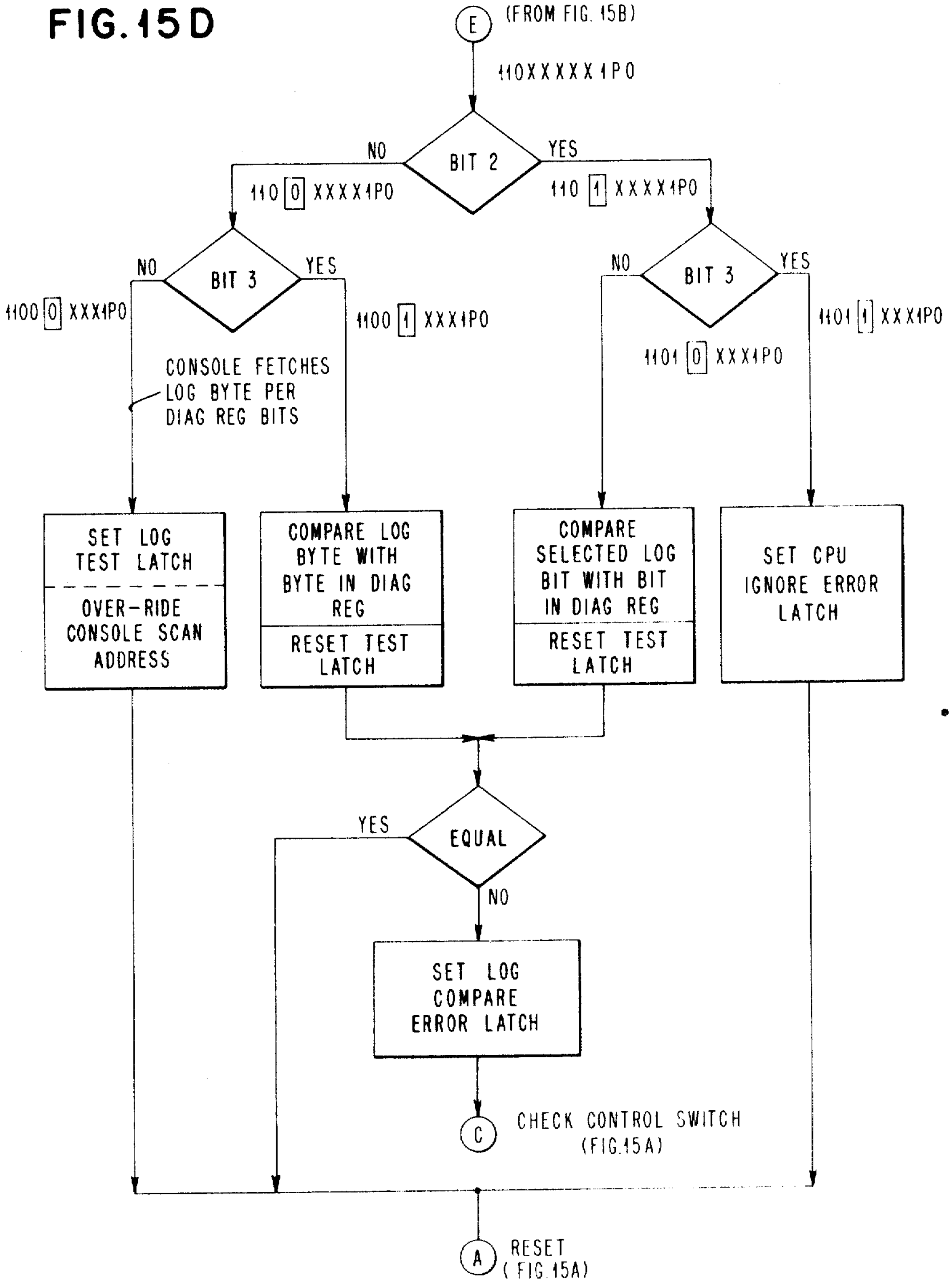
Figure 15E:
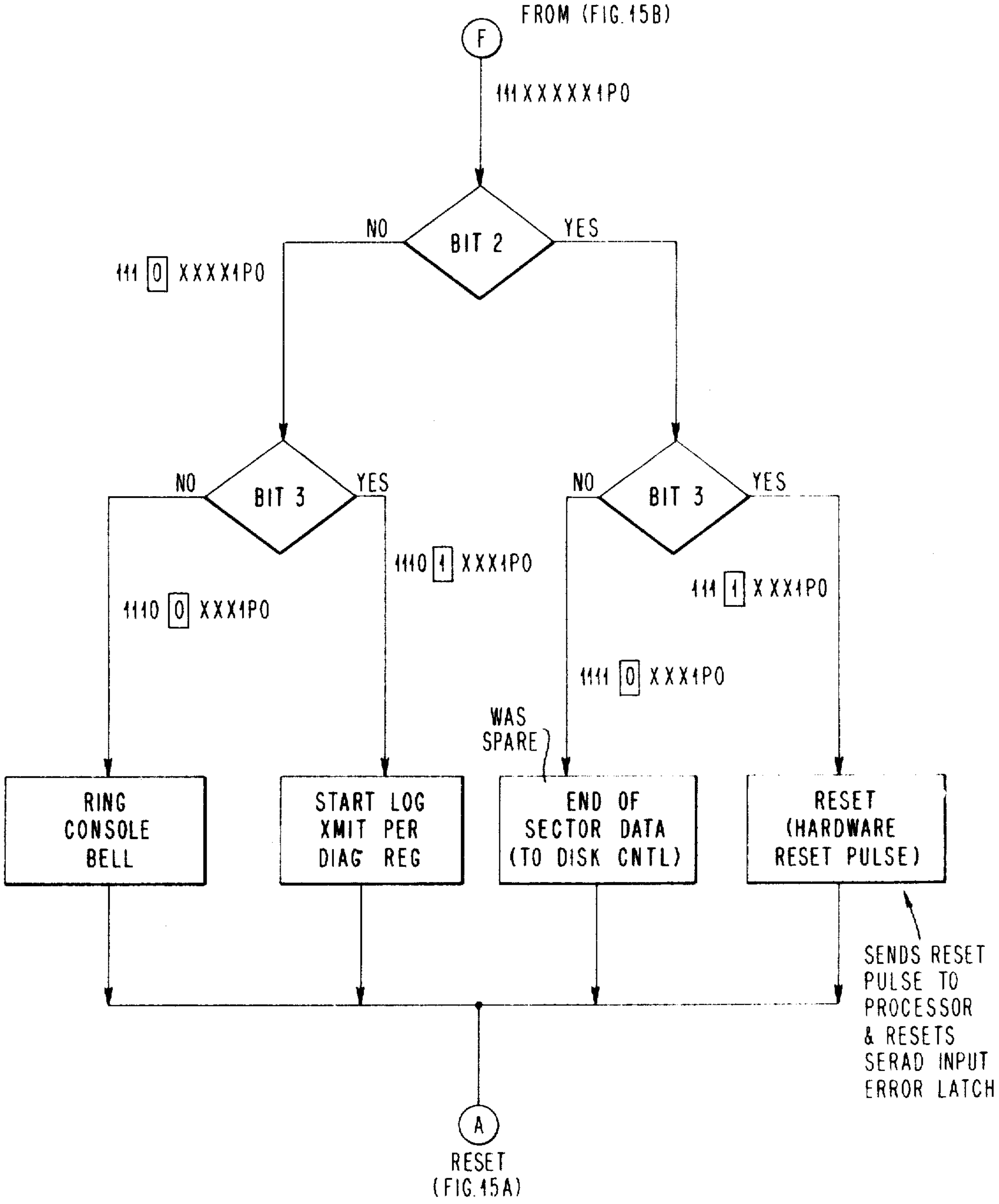
Figure 15F:
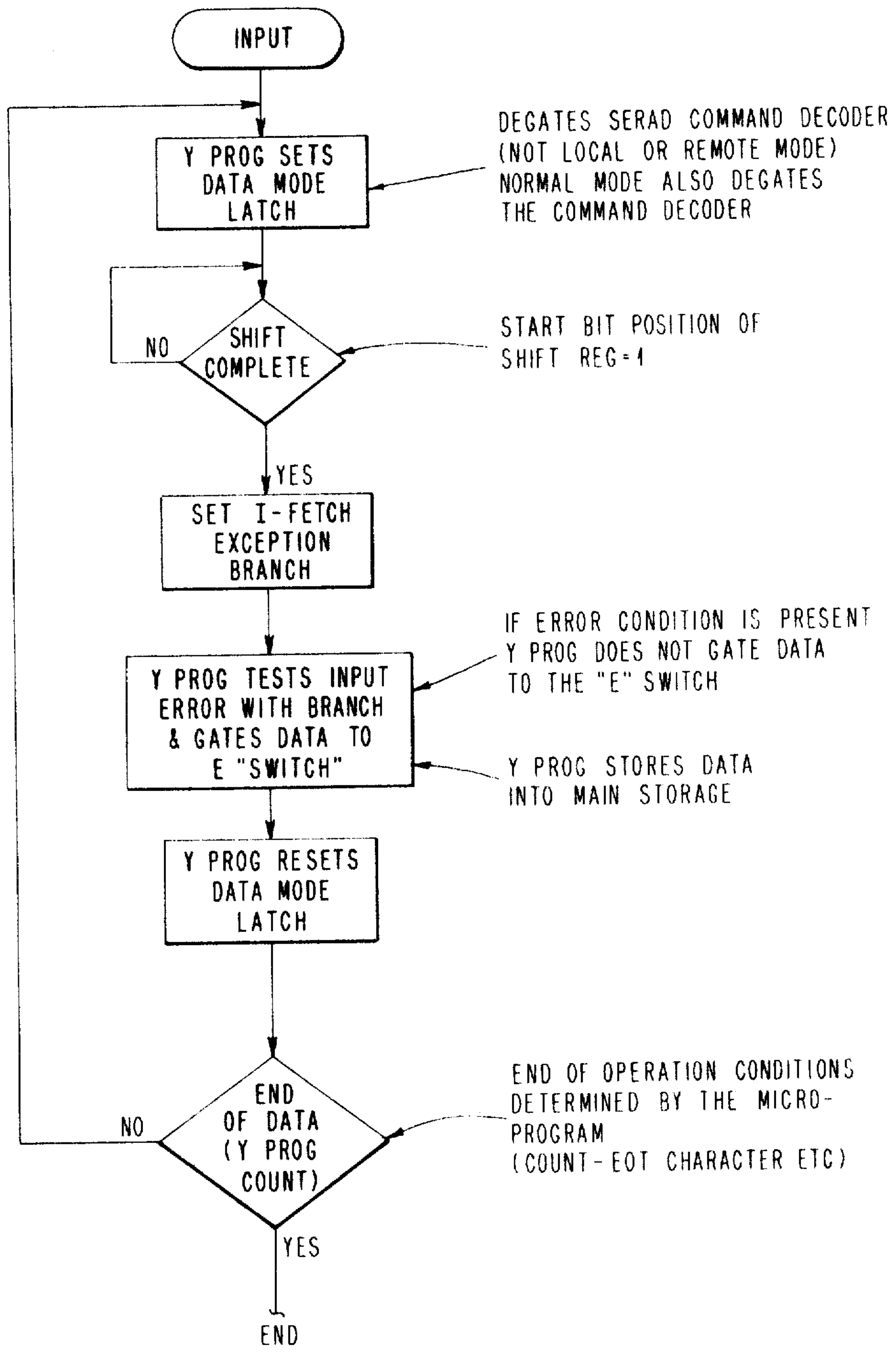
Figure 15G:
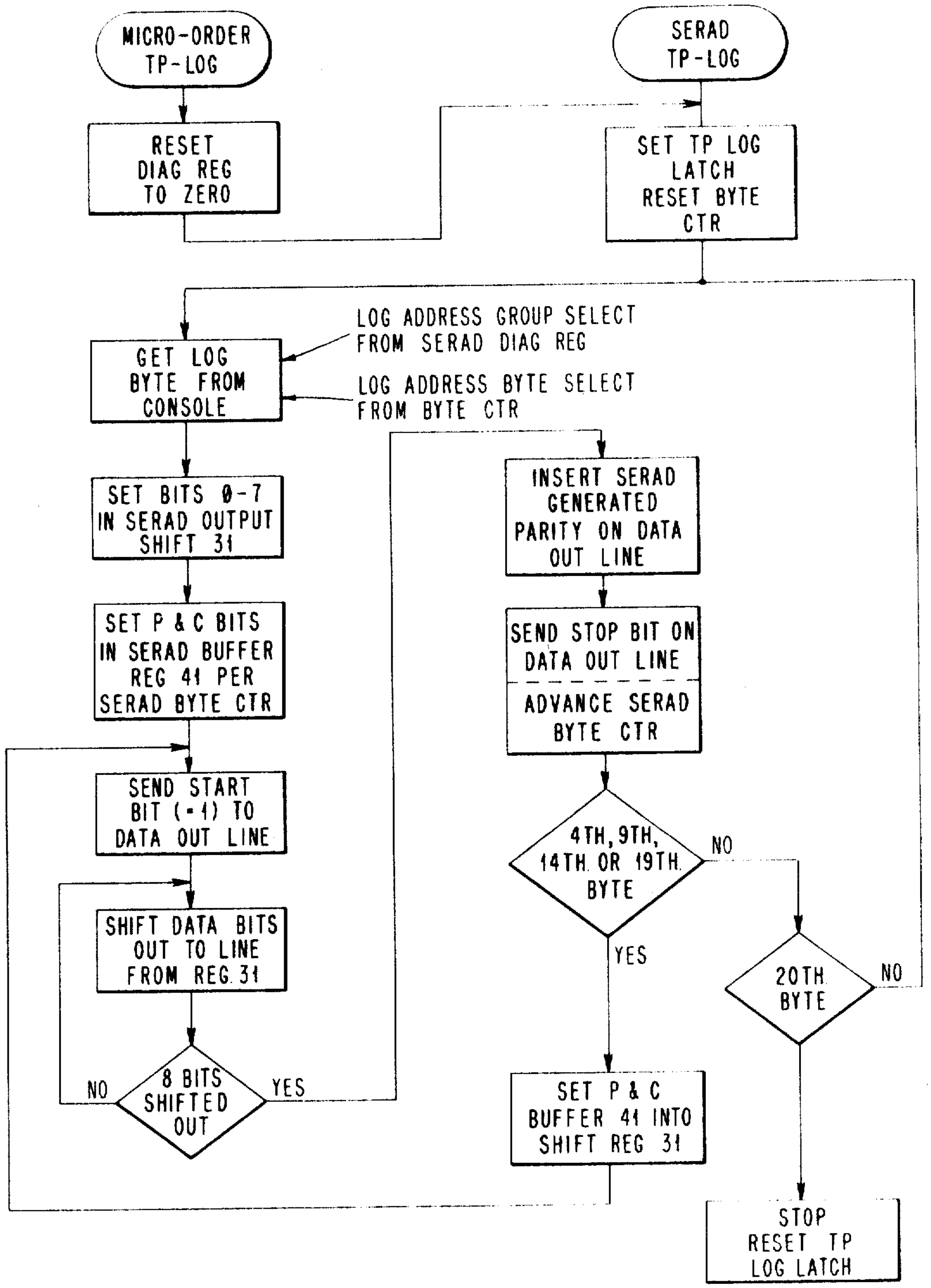

The DATA MODE latch in section 38 is examined to determine whether the data in register 30 is to be sent to the CPU system registers of FIGS. 5A—5C, via the External Switch, under system (ROS) microprogram control (as described in FIG. 15F). If the DATA MODE latch is not set (SERAD in control) the signal in bit position seven of SERAD register 30 is examined by control section 38 to determine whether information in bit positions 0—6 of the same register represents SERAD control (command) information or other information (data byte).

Data bytes (Register 30 Bit 7=0) are handled automatically from register 30 over to one of three byte sections of the diagnostic register 32 designated by the byte counter (FIG. 3B). The byte counter is then advanced, register 30 is reset, and the system idles to await appearance of the first bit strobe signal of the next byte to be received in register 30.

SERAD command bytes (bit 7=1 in register 30) are decoded by decoding logic in SERAD control section 38 initiating one of the following operations. Information may be transferred from the diagnostic register 32 (FIG. 3B) to the system control register ROSDR (FIG. 4). Following such transfer the CPU system may be operated for a single clock cycle, and the states of the A and B system branch control signals (logic 57, 58, FIG. 4) may be compared to reference information in bit positions five and six of register 30. Other operations which may be performed include: introduction of a forced error condition into a channel presently linked to the main system, control feedback to the LD disc unit, "ENTER ROS MODE" operation (transfer of control to the CPU system reenabling CPU clocks and ROS), a REPEAT EXECUTE operation (partial transfer of control to CPU, whereby the CPU clocks run with inputs to ROSDR blocked until a next command byte is received in SERAD register 30), console control operations to simulate operations of manual elements on the console panel and/or to initiate logging (monitoring) functions, comparison operations may be performed comparing system or console information to information in SERAD (register 30 or 32), an Ignore Error latch in the CPU may be set to cause the CPU to be released from a disabled condition following an error, or an audible alarm bell in the console unit may be operated.

These operations are represented in greater detail in FIGS. 15A—15F and in the following table.

TABLE.—COMMAND DECODING

[Reg. 30, Bit 7=1]

| Reg. 30 bits 0–6 | Operation signal produced |
|---|---|
| *o o a b c d e*... | Transfer SERAD diagnostic register 32 to Group section *a b* of ROSDR (*a b*=binary code designation of Group 1, 2, 3, or 4; i.e. 00, 01, 10, or 11). If Bit 4=1 (c=1), single cycle CPU (blocking normal input to ROSDR from ROS); then compare A, B outputs of logic 57, 58 (Fig. 4) to bits 5 and 6 (*d*, *e*) in SERAD Reg. 30; set compare error latch if A and *d* or B and *e* are mismatched. |
| 0 1 1 1 *x x x*... | Force Channel Error. |
| 0 1 1 0 *x x x*... | If Rate Switch (SERAD control section) is in "REPEAT" position transfer console data switches to LD file unit track and sector address controls. |
| 0 1 0 1 *x x x*... | ENTER ROS MODE by resetting mode latch in SERAD control section and starting system clocks 78 of Fig. 4 (restores control to System control section 12). |
| 0 1 0 0 1 1 *x*... | NOT USED (SPARE). |
| 0 1 0 0 1 0 *x*... | Actuate console to scan total system status to buffer console store 330. |
| 0 1 0 0 0 1 *x*... | SERAD Diag. Reg. 32 (Byte 0) into console reg. 320 (Byte 0) to simulate manual control function in console unit (Fig. 8B). |
| 0 1 0 0 0 0 *x*... | Start CPU clocks letting CPU operate until next command is received block ROS to ROSDR. |
| 1 0 0 0 *x x x*... | Actuate console to transfer log byte from serializer net (funnel) to console byte register 325, selecting the byte to transfer according to data in SERAD diagnostic register (byte 0). |
| 1 0 0 1 *a b c*... | Compare log byte in console byte reg. with byte in SERAD diagnostic reg. position designated by bits *a b c* of command. |
| 1 0 1 0 *a b c*... | Compare log bit, in console byte reg. position designated by command bits *a b c*, with bit in corresponding position of byte 0 section of SERAD diagnostic reg. |
| 1 0 1 1 *x x x*... | Set CPU "Ignore Error" latch. To prevent CPU detected errors (while testing error ckts) from stopping the service adapter. |
| 1 1 0 0 *x x x*... | Ring audible alarm bell on console. |
| 1 1 0 1 *x x x*... | Log transmit 20 byte console group (16 console bytes; 4 interlaced *p c p c p c p c p'* bytes; *p'*=SERAD parity bit) from either serializer net or console buffer store 330. Diag. reg. 32 holds information designating source of byte groups. (Serializer or store 330) and origin address within source. |
| 1 1 1 0 *x x x*... | End of Sector signal to LD disk file controls. |
| 1 1 1 1 *x x x*... | System Reset pulse. |

The log transmit operation (FIG. 15G) is initiated either upon decoding a log transmit SERAD command (1101*xxx*1 in bit positions 0—7 of SERAD register 30) or upon receiving a TP log signal from the system microprogram controls (FIG. 4). When system control is exercised the SERAD diagnostic register 32 is initially reset.

The SERAD byte counter (FIG. 3B) and a TP log control latch are respectively reset and set. Console information is fetched to SERAD registers 31 and 41 in 10-bit byte groups (eight information bits 0—7 to register 31, one parity bit P and one console parity check status bit C to register 41). Sixteen such groups are fetched as a set in one log transmit operation, and SERAD transmits the set in twenty of its transmission bytes.

It will be recalled that the console store holds 512 bytes which would be equal to 32 groups of 16 bytes. Thus an address designation is needed to distinguish which group of 16 bytes is to be fetched. This is provided by five of the seven bits of byte zero of the diagnostic register 32 (LOG ADDRESS GROUP SELECT) from information established therein either from the external equipment (via SERAD register 30, prior to a SERAD TP log) or by the act of resetting the diagnostic register (from system microprogram control), the reset condition designating a first 16-byte group.

The information to be fetched has been either preset into the console store 330 or is taken directly from the serializer log net (funnel), depending upon a sixth bit in byte zero section of the diagnostic register. Information preset into console store 330 has been placed there either under system microprogram and Console Op Decode control, through operation of the added Z-bus to console register and console register to console storage circuit paths, or under SERAD control through log commands (Bits 0—7 of reg 30=010010x1 or 1000xxx1)

Figure 15H:
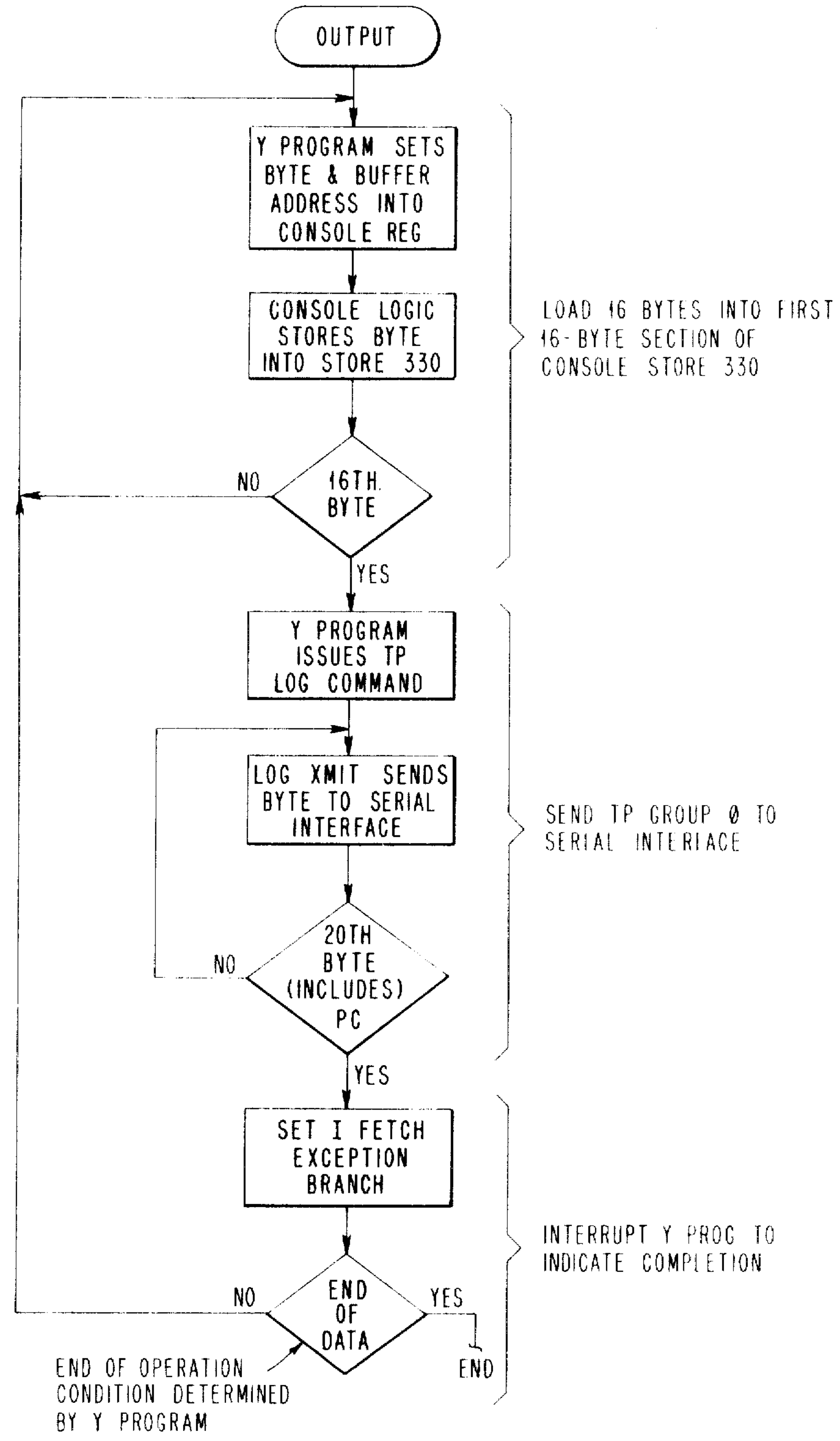

The sequence of operations involved in loading the console store 330 from the CPU Z bus and transmitting such system information (note that Z-bus signals have more general significance than log status information obtained through the serializer net, not being necessarily associated with the physical state of any particular CPU components), is described in FIG. 15H.

The notation "U Program" in this figure refers to the microprogram operation of the ROS system of FIG. 4. Sixteen CPU Z-bus bytes are loaded into the first 16-byte section of console store 330 and the CPU microprogram produces a TP log signal, which resets SERAD diagnostic register 32 and operates the SERAD control section 38 to simulate decoding of a 1101xxx1 command byte from bit positions 0—7 of SERAD register 30.

SERAD then fetches and transmits the 16 bytes in a 20 byte group (16 data bytes and four segregated-interlaced parity and parity check bytes), as previously explained.

When the operation of FIG. 15H is completed an "I FETCH EXCEPTION" signal is set (latched) causing the CPU microprogram to branch to an interruption, at a particular phase of the instruction fetching sequence by which the next program instruction is referenced. This interruption permits the CPU to note (by software not discussed) termination of the desired transmission operation.

SERAD Controls

Figure 16A:
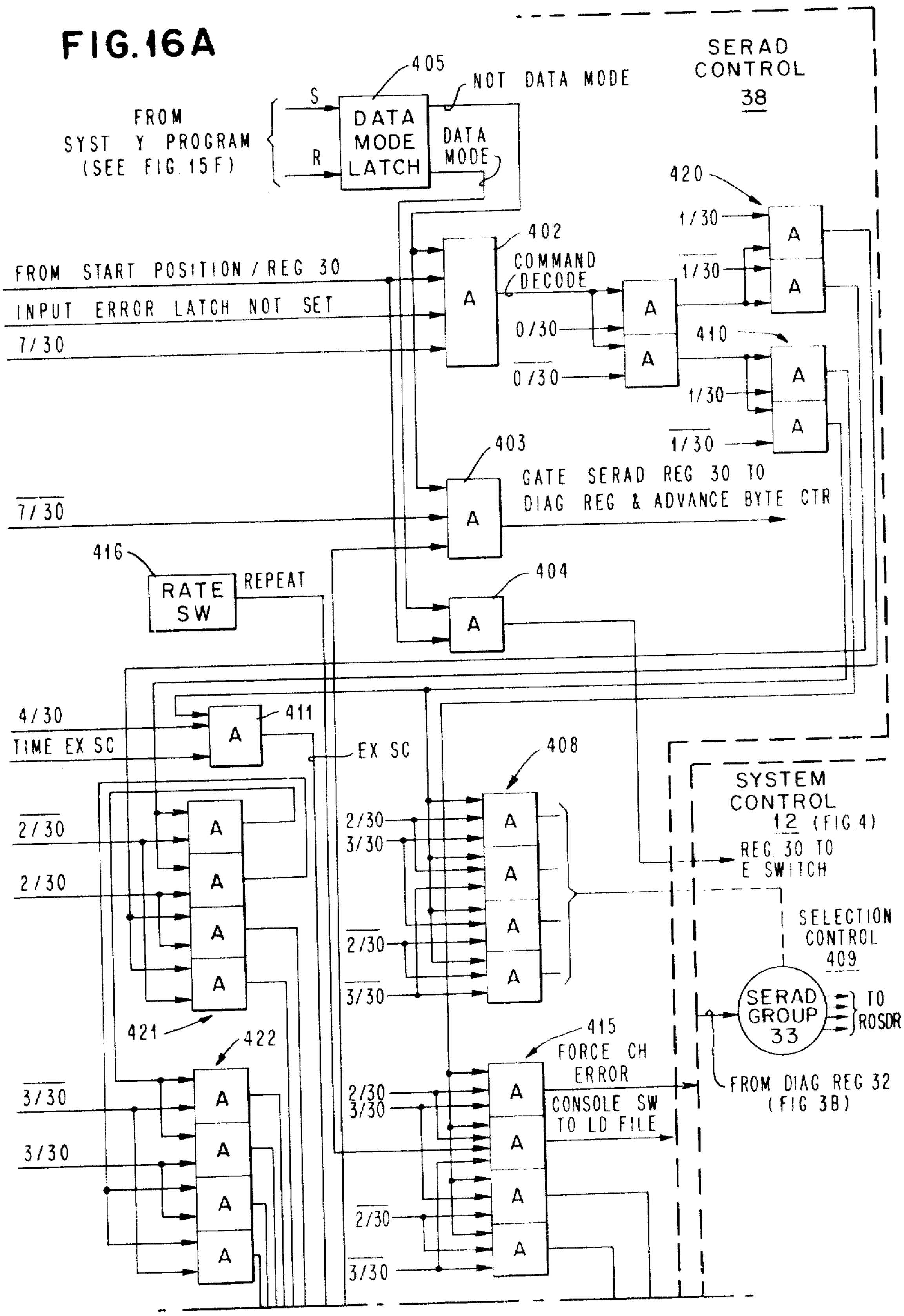
FIG. 16 illustrates pertinent details of the control section of the present adapter.
Figures 16, 16B:
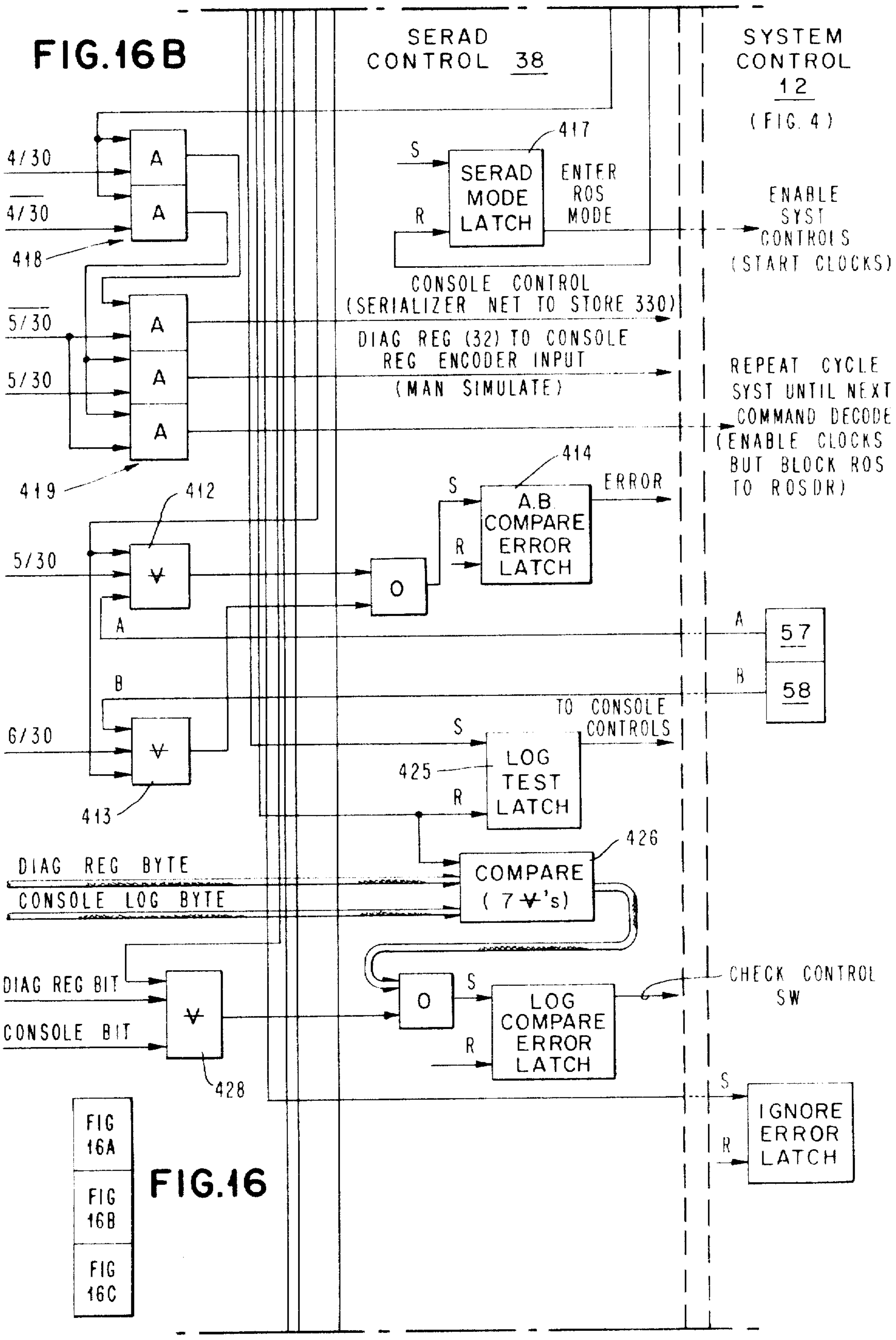
Figure 16C:
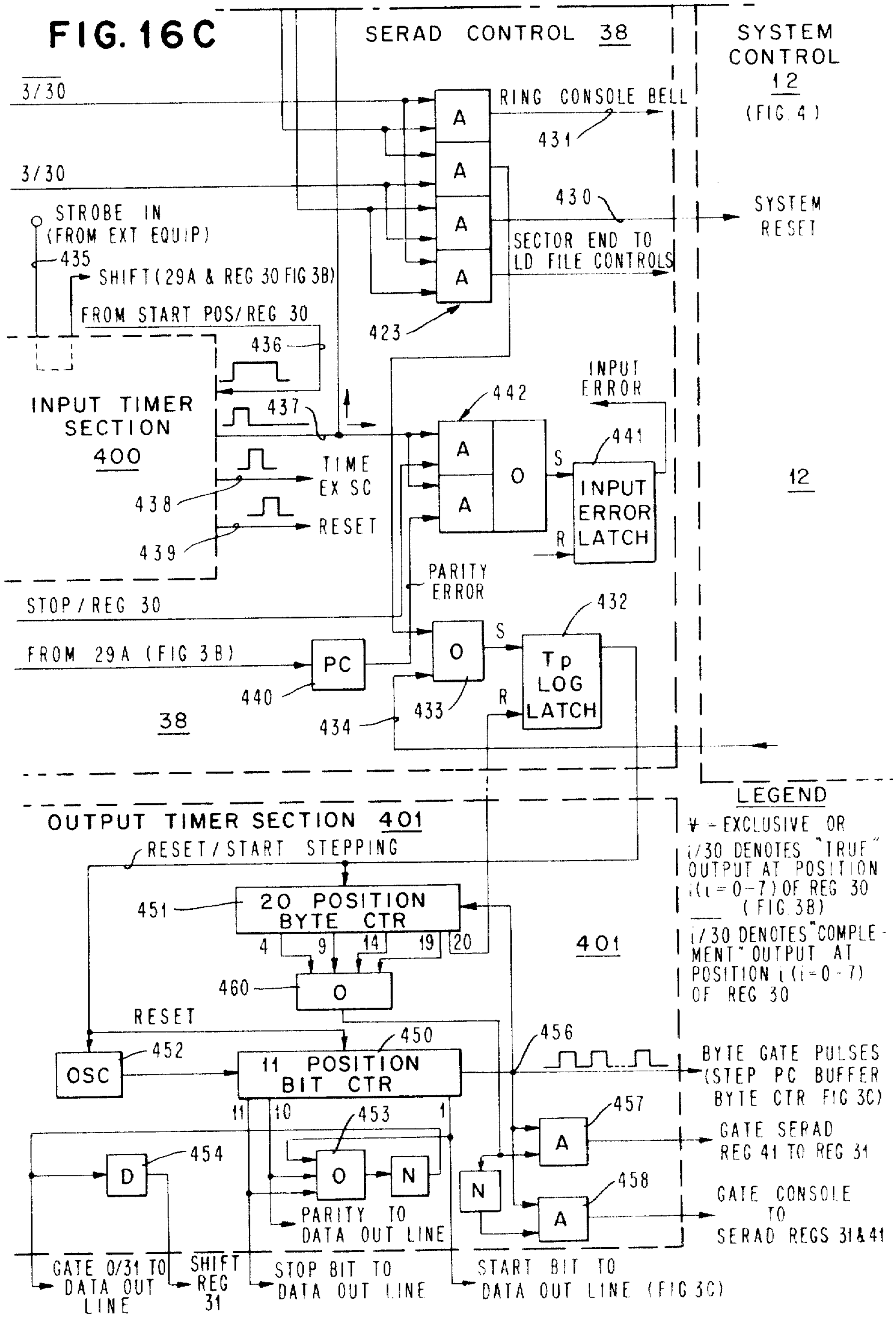

As shown in FIG. 16 SERAD control section 38 includes the latches mentioned in FIGS. 15A—15H and timer circuitry 400, 401 for its input (receive) and output (transmit) functions. In receiving operations appearance of a signal (1-bit) in the start position of SERAD input register 30 conditions AND gates 402—404, one of which produces an output signal depending upon states of DATA MODE latch 405 and bit position seven of SERAD input register 30.

An output from gate 402 denotes the presence of a SERAD command in register 30. An output from gate 403 denotes the presence of noncommand information in register 30 and causes transfer of such to SERAD register FIG. 3B). Such transfers are followed by advancement of byte counter 406, FIG. 3B. An output from gate 404 is sent to the system control section as a signal to transfer the content of register 30 through the system E-Switch (FIG. 5B) to system registers and storage (via "X-Bus to Storage" path, FIG. 5B).

Commands (gate, 402 energized to Command Decode condition) are decoded to produce the operations of the foregoing table. Gates 408 (commands of the form 00xxxxx) select positions of group switch logic 33, in system control section 12, for transfers from SERAD register 32 (FIG. 3B) to sections of system control register 55 (ROSDR).

The select lines connected to the system LSI package 409 control switching of groups of 21 or less bits from diagnostic register 32 to one of four sections of ROSDR. If desired decoding gates 408 may also be spatially integrated with the group switch 33 at 409. Then only three are needed for controlling transfer connections between control sections 38 and 12; one from gate 410 and two from bit positions two and three of register 30 (assuming provision of complement gates at 409).

Gates 410 and 411 (EX SC commands 00xx1de) control gates in EXCLUSIVE-OR comparators 412 and 413 which compare the A, B outputs of system branch control logic 57, 58 with respective bits five and six in register 30. A mismatch in either comparison sets A, B Compare Error Latch 414.

Gates 415, viewed top to bottom are energized respectively by SERAD commands, 011xxx, 0110xxx, 0101xxx, and 0100xxx. The uppermost gate when operated forces a channel error through the system controls. A signal from the next lower gate in group 415 subject to conditioning of a Rate Switch 416 transfers signals from console switches (Reg. 320, FIG. 8B) to LD file addressing controls (via a path described later in discussion of LD file control) and causes repetition of a LD file sequence. The next gate controls resetting of a SERAD mode latch 417 to ENTER ROS MODE condition, which induces the system and its clocks to resume automatic operation from the stopped condition. The last gate conditions other gates 418, 419 to produce one of three functions: Repeat cycle system (step system clocks until next command decode, block ROS to ROSDR path), transfer SERAD register 32 to encoder input to console register 320, start log status operation of Console.

The repeat cycle operation causes the system to repeatedly execute the function designated by an unchanging ROSDR microinstruction. The console register transfer operation causes the console to operate as if in response to manual control elements on its panel (Manual Simulate), and is useful to test the console unit. The log status operation initiates cycling of console clocks and counters. This causes the console to operate its serializer net (integrated in the system circuit package as described later) to scan system component status into console store 330 in a predetermined sequence. A total of 256 console bytes may be stored in one such function filling one-half of the store 330. A latch (not shown) may be used to "remember" which half of store 330 has last been filled so that the console byte counter 323 may be set in advance, if desired, to cause overwriting of the "oldest" information (longest unchanged half).

Groups of gates 420, 421, 422, and 423 operate to decode commands of the form 1xxxxxx. These commands are used to: (1) set log test latch 425; (2) reset log test latch 425 after operating the seven EXCLUSIVE-OR comparators 426 to compare a selected byte of SERAD diagnostic register information (one selected by the last three xxx bits of the command) with a corresponding byte of console register information and set a compare error latch 427 when a comparison mismatch is sensed; (3) compare selected single bits, in particular diagnostic and console register bytes, in EXCLUSIVE-OR circuit 428; (4) signal the console that an end of an LD file record section (SECTOR END) has been reached; (5) reset the system (indicated at 430); (6) RING the audible alarm bell in the console unit (indicated at 431); and (7) start a log transmit operation by setting TP log latch 432 (OR circuit 433 permits this latch to be set either by the 1101xxx SERAD command or a system signal at 434 derived from system controls).

In receiving operations strobe impulses (line 435), defining midpoints of information bits coincidentally transmitted from external equipment, are converted into sampling and shift impulses. The shift impulses are used to shift SERAD input register 30 and the sampling impulses are used to gate the information at 29A (FIG. 3B) into the lowest (STOP) position of register 30.

When a start bit (=1) appears in the highest (START) position of the initially reset (all 0's) register 30 timer section 400 is activated (line 436) to produce progressively delayed control pulses as at 437, 438 and 439.

Pulse 437 is used to conditionally transfer parity (PC circuit 440) and/or Stop bit status of register 30 into Input Error Latch 441 through logic 442. An error condition is set in this operation when a parity check error is present or the Stop bit is invalid (i.e.= 1). Pulse 437 is also used to partly condition gate 403 for the register 30 to register 32 control operation.

Pulse 438 is used to time execution of the EX SS (Execute Single Step) control function of gate 411 and to time advancement of byte counter 406 (FIG. 3B) after a register 30 to register 32 transfer.

Pulse 439 is used to time resetting of register 30 after the information therein has either been decoded (Command Decode) or transferred (to register 32 or through system E-

Switch). The same pulse is used to reset byte counter 406, FIG. 3B, after Command Decode operations.

Output functions (TP Log Latch Set) are timed by timer section 401. An 11-position bit counter 450 and a 20-position byte counter 451 are reset to initial states and a bit oscillator 452 is started (or gated). Counter 450 times gating of bits from position zero of register 31 to the Data Out line (FIG. 3B) and gating of Start (=1), Stop (=0) and Parity (= bit furnished by PC circuit 42, FIG. 3B) bit conditions to the same line. Start, Stop and parity are gated in respective first, 10th and 11th intervals of the byte transmission cycle. In the other intervals of each cycle, distinguished by circuits 453, data at position zero of register 31 is gated to the Data Out line and after a delay D (454) the register is left-shifted.

For each byte (11-bits) transmitted a byte impulse produced at 456 advances byte counter 451 and conditions gates 457, 458 for intermediate gating functions. Gate 458 is operated when a byte is required to be transferred from the console unit to SERAD registers 31 and 41. Gate 457 is operated when a byte of segregated console parity check information, assembled in SERAD register 41, is required to be transferred into SERAD register 31.

Gate 458 is operated at fourth, 9th, 14th and 19th byte gate pulse intervals of each 20 byte TP log transmission sequence (note OR gate 460 and reset of TP log latch 432 at 20th stage of counter 451). This interlaces four segregated parity bytes with the 16 related console bytes at respective fifth, 10th, 15th and 20th positions of the TP log sequence.

Each byte gate impulse at 456 advances 4-position byte counter 462 FIG. 3C controlling placement of console parity information bit pairs into register 41, FIG. 3C, whereby a full byte of eight parity information bits is assembled in buffer 41 for each four byte units of other console information transferred to register 31. Alternatively, the outputs of counter 451 may be logically gated to control the input gating to buffer 41.

System Configuration-Remote Service

Figure 17:
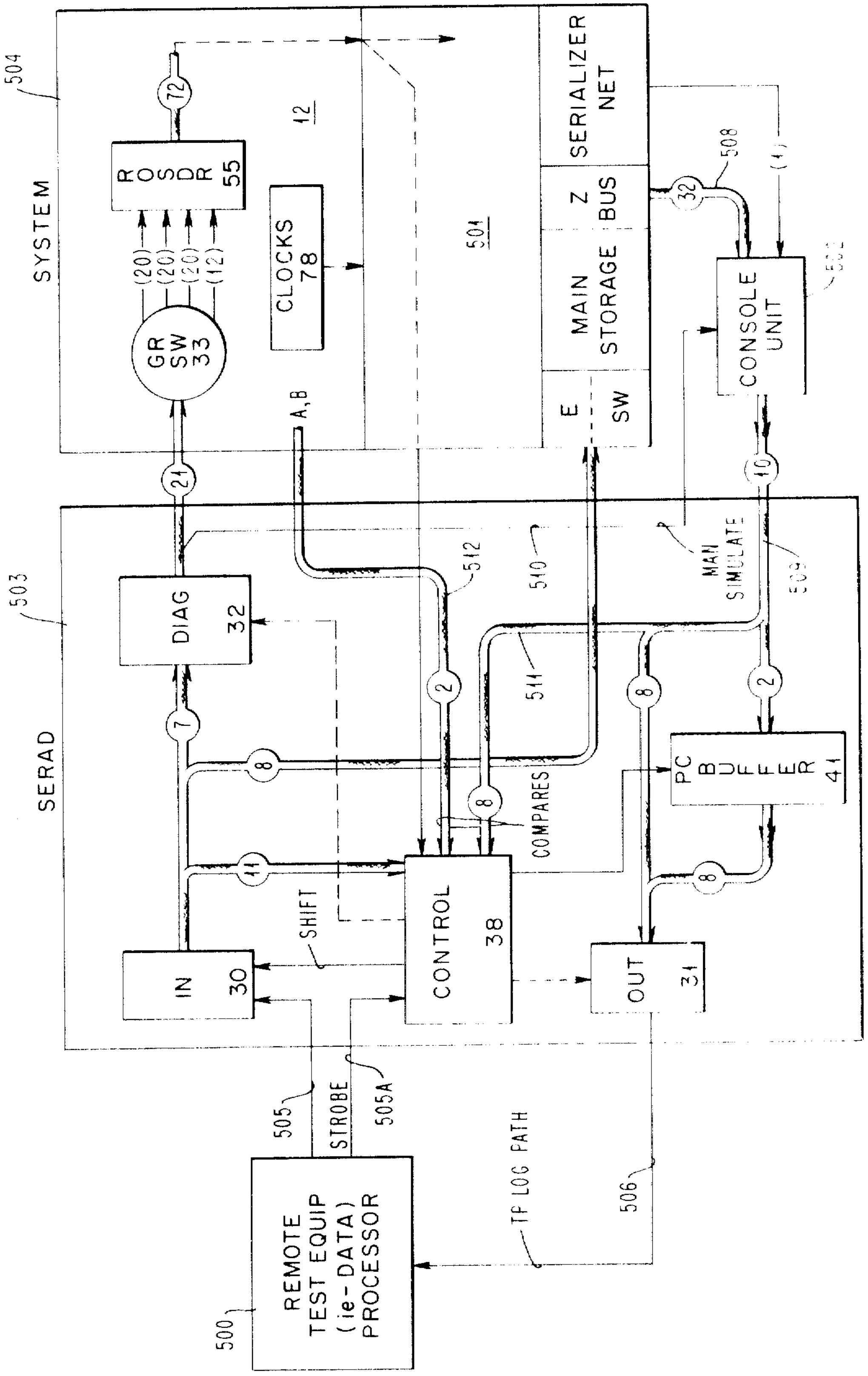
FIG. 17 illustrates, diagrammatically, functions performed by and through the present adapter in carrying out remote diagnostic testing of the system incorporating the adapter.

The system configuration for remote communication, between the system incorporating SERAD and a remote testing device such as a data processor, is illustrated in FIG. 17. The remote processor 500 carries on two-way communication with the system shown at 501 and its console unit shown at 502, through the SERAD unit shown at 503. To aid in the description the system control section 12 is shown separate from the system at 504.

Data is sent through line 505, together with strobe signals over strobe line 505A, to SERAD. The data is received in the input register 30 of SERAD one bit at a time in coincidence with corresponding strobe signals and distributed from that register to different parts of the system. Similarly data received from the system is moved through register 31 of SERAD to the outgoing transmission line 506 through which it is sent to the remote system 500 as log information one bit at a time.

Incoming data is generally stripped of its Start, Stop and parity bits at SERAD register 30, and forwarded to other system elements under control of control section 38. Conversely outgoing data is handled into register 31 in eight bit groups to which controls 38 append Start, Stop and Parity bits at the Data Outline.

Two types of operation may be distinguished in FIG. 17; one in which SERAD using received information controls further handling of other signals within SERAD and the main system 501/504 and console unit 502. In the other type of operation SERAD only receives information on its incoming register 30 and the system controls (Data Mode Control 506 and system microinstructions) cause information in register 30 to be transferred directly through the system E-Switch to system main storage. In the first mentioned mode of operation the system normally is disabled and SERAD fully controls reception of signals, transfer of signals into the system and operation of the system in single or multiple cycles. In the second-mentioned mode of operation the system operates as it would normally but interlaces the operations needed to move the information from register 30 to SERAD to internal storage. The second mode of operation is useful for example to place diagnostic programs in system storage for testing system peripheral equipment. It can also be used to display or print out information for the benefit of system operating personnel, or for general communication between the remote testing source 500 and peripheral equipment of the system.

Similarly two modes of transmission operation from SERAD register 31 to the remote test equipment 500 are distinguished in FIG. 17. The first involves the normal mode of component log status transmission, from the passive or disabled system, under active control of SERAD, the console unit and the associated Serializer Net. The other type of transmission involves active control of the console unit by the System through the Z-bus (adder output) connection 508 to the console unit register 320 and its associated decoding and encoding controls. The second type of operation is used for general handling of information from the System 501 to remote station 500.

The connecting path 510 from the diagnostic register 32 of SERAD to the console unit enables SERAD to simulate operation of certain of the manual control elements of the console. Another path 511 from the console unit to SERAD enables the SERAD system under external control of the system 500 to compare information in the console unit with information received at SERAD, on either a bit or byte basis. A path indicated at 512, from the A and B branch logic sections 57, 58 of the control section 12, enables SERAD to compare the A and B system control conditions with corresponding conditions received from remote equipment in register 30.

System Operating Sequence—Remote Service

Figure 18:
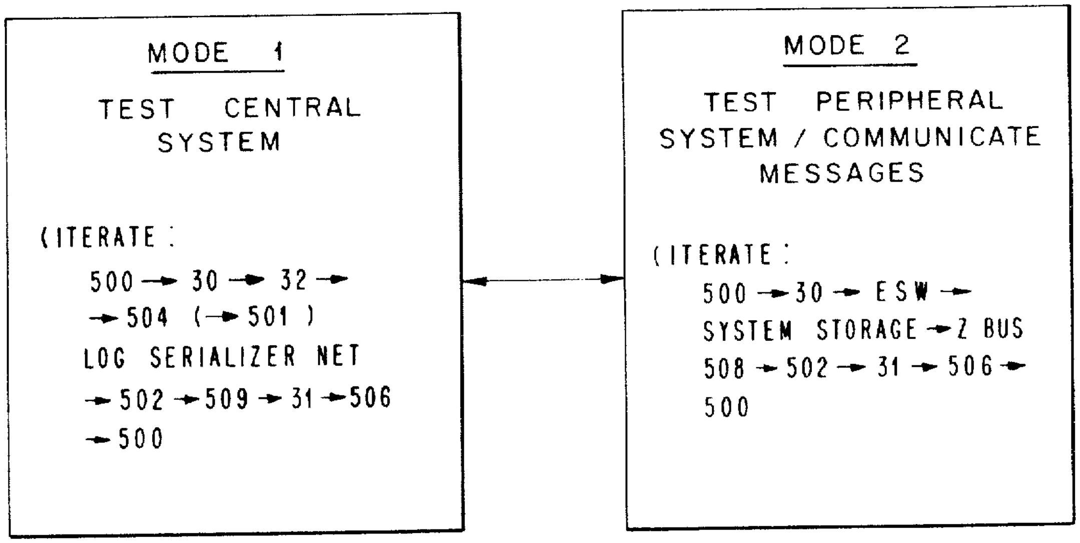
FIG. 18 is a sequence diagram illustrating a REMOTE TEST sequence.

Thus, referring to FIG. 18, a typical sequence of operations involved in a system test would include a series of communications of either indicated mode. Mode 1 communications involve iterative SERAD–Remote controlled transfers over the paths 500 to 30, 30 to 32, 32 to 504, and 504 to 501 by means of which desired states of the disabled system would be established, and transfers in the reverse direction over the paths: log serializer net to console 502 (under console—SERAD control) and, under SERAD–Remote control, 502 to SERAD to remote 500.

Mode 2 sequences generally involve communication between the remote system 500 and the main system 501 in which the main system assumes an active role by interlacing with its ordinary processing operation contacts with SERAD and the Console unit. This mode of operation involves transfers over the path: remote 500 to SERAD register 30 (under SERAD reception control) to system E-Switch (under system control) to system storage (again under system control). In the reverse direction iterative transfers occur over the path: system storage to Z-bus to console unit 502 (all under system control), and 502 to 509 to 31 to 506 to remote station 500 (under SERAD-console unit combined control).

System Configuration-Local Service

Figure 20:
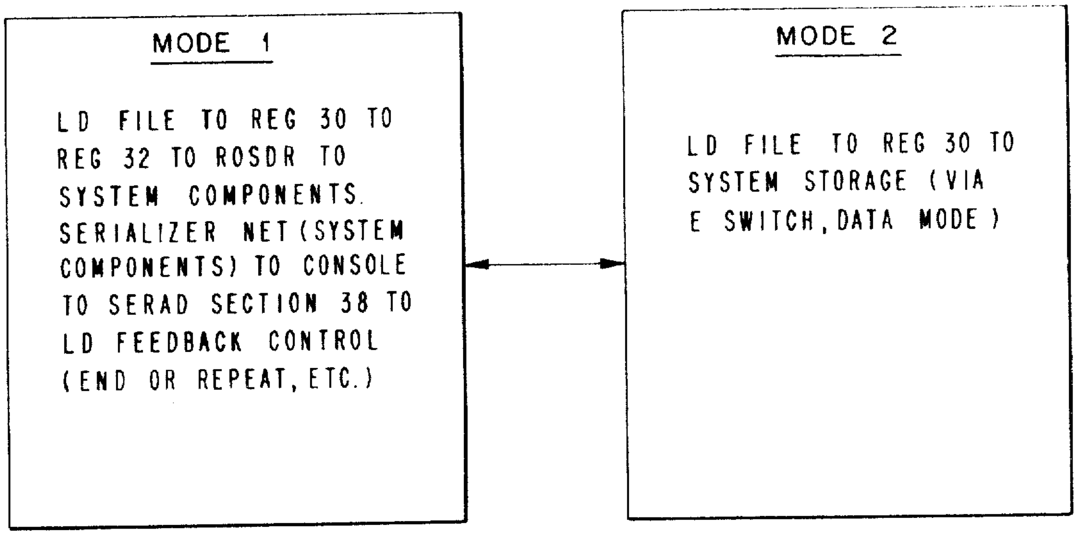
FIG. 20 indicates the operational test sequence for LOCAL MODE tests.
Figures 19, 21:
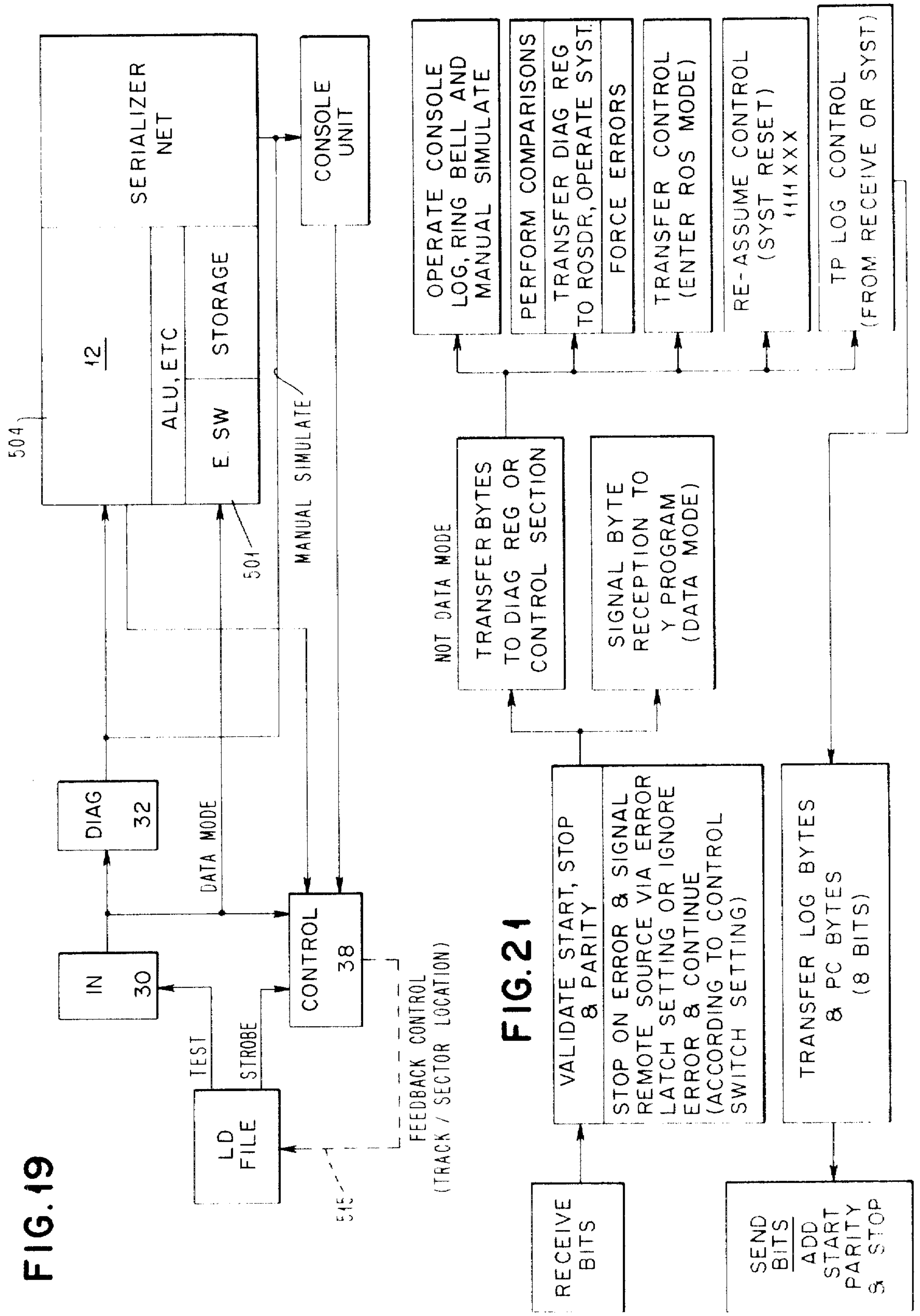
FIG. 19 indicates the configuration of the adapter and its host system in LOCAL TEST mode wherein control originates at a local disc playback unit (LD file) having a read only connection to the adapter.
FIG. 21 illustrates adapter operations in REMOTE TEST mode.

Referring to FIG. 20, the LD disc unit and system under test may operate either in mode 1 or mode 2 to accomplish desired testing and other functions. In mode 1 the LD file provides unit test functions iteratively through the path from LD file to SERAD register 30 to SERAD register 32 to ROSDR (system control register 55), or to console unit elements, interlaced with comparison functions (A and B branch control bit compares and other compares of bits or bytes furnished by the console unit). In mode 2 SERAD operates only to receive information in its register 30 and thereafter awaits Data Mode control from the system control section for transferral of the information received in register 30 to system storage via E-Switch. This type of operation is useful to place diagnostic programs prerecorded on disc records in the store of the actively functioning system; for example to test peripherals, or to communicate test and information messages to a system operator SERAD Operational Sequence Remote Service THe coarse operational sequence of the SERAD unit in accomplishing its remote service function is depicted in FIG. 21 Bytes are assembled from received bits and validated for presence of correct Start, Stop and Parity information. In the absence of error, bytes are forwarded for further handling under either SERAD control (Not Data Mode) or system control (Data Mode). In Not Data Mode data is transferred from register 30 either to the diagnostic register 32, or to the SERAD control section 38. Data applied to the control section 38 is interpreted (decoded) and executed as a command. When a TP Log command is received in this manner system data is transferred to the remote test equipment over the SERAD communication link. In such transfers SERAD appends Start, Parity and Stop bits to each transmitted byte.

SERAD Operation Sequence—Local Service

Figure 22B:
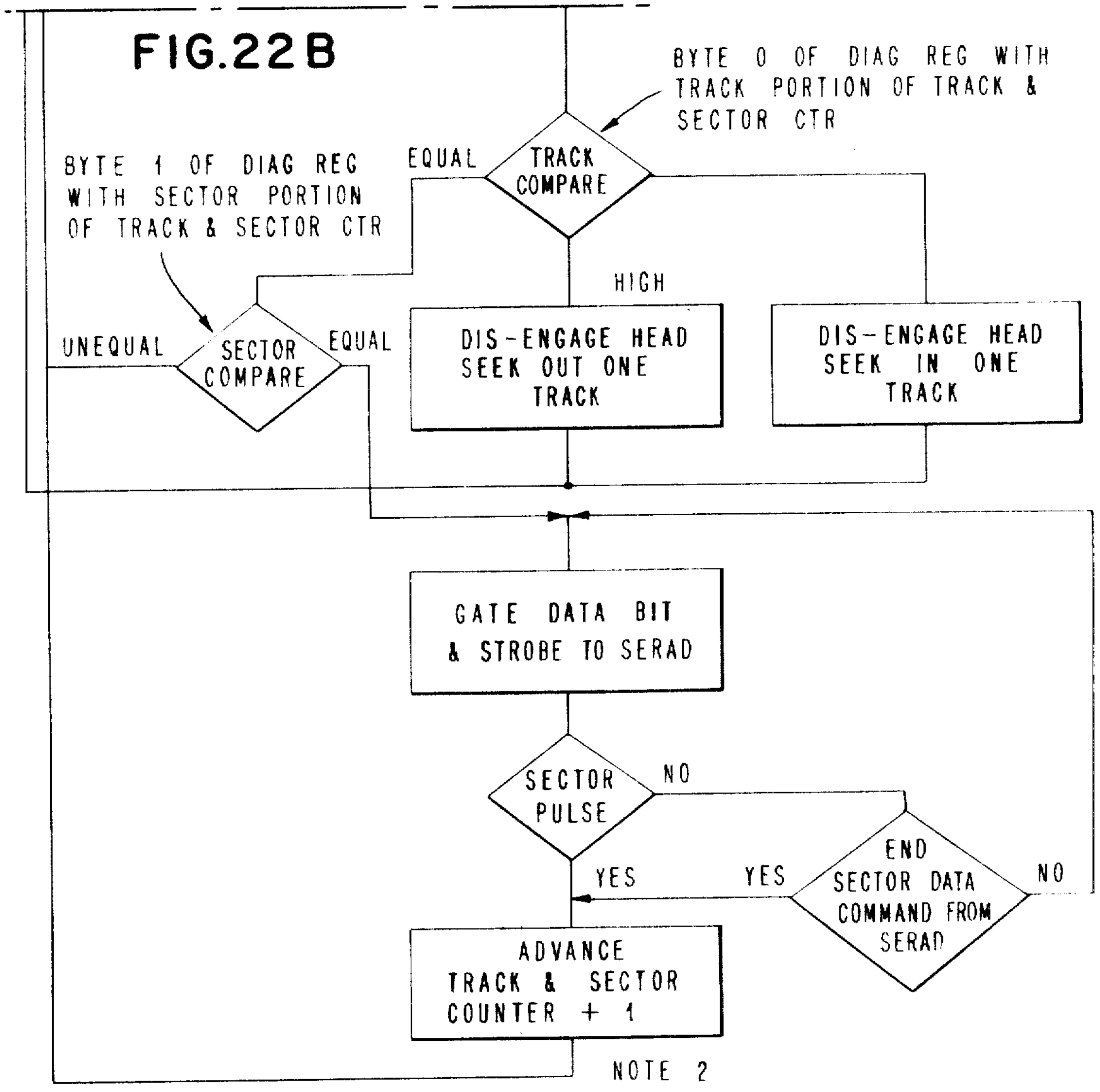

In local service communication with the LD (LOAD DIAGNOSTIC) disc file the sequence of operations is as shown in FIGS. 22A and 22B. Initial track and sector address code information is transferred to a track and sector counter controlling selection of information from the disc. This initial address information originates either at pushbuttons and switches on the console panel or from operation by the active system of the Z-bus to console register communication path.

The internal construction of the LD file is not considered material to the present invention and only the relevant connecting features are considered in this description. For the sake of simplicity and economy a single disc system operated in a playback-only mode is preferred. Records are prerecorded to be shipped for use with the basic drive unit.

Records are arranged conventionally along concentric disc tracks with sector (arcuate) subdivisions defined by sector impulses recorded on a timing track. A fixed head reads the timing track and a movable head cooperating with a "seek" mechanism reads information from other tracks. The track and sector address codes are used respectively to locate a track and the beginning of a particular sector thereof. Two bytes of each sector contain references track and sector address codes. To initiate access the disc head is engaged in playback position and two successive sector impulses are counted. After the second sector impulse data and associated strobe bits (prerecorded on the timing track) are sent to SERAD register 30. Having been prerecorded in the previously described start-stop format the data is easily received and verified by SERAD. After the first two sector bytes (track and sector address) have been received an address comparison is made to determine whether the desired portion of record has been located. The first two received bytes are compared with the contents of the track and sector counter previously mentioned.

An agreement in both the track and sector comparisons signifies successful location of information and the rest of the record sector is read out to SERAD. An equal track comparison coupled with an unequal sector comparison causes blocking of strobes to SERAD until the next sector is reached and the comparison operation repeated.

An unequal track comparison is used to control the seek mechanism associated with the movable head. The head is disengaged and moved incrementally one track at a time in the radial direction; inwardly if the requested track number (track counter) is higher than the recorded track number, and outwardly if the requested track number is lower than the recorded track number. At each track the above operation (wait two sectors, compare, etc.) are repeated until the desired sector is located and read to SERAD.

After a sector has been read (End sector command decoded by SERAD) the sector address value in the sector counter is incremented by a value of +1 unit and the next sector is read. Reading of the disc is stopped when SERAD senses an error or when a signal is received from the system microprogram in normal (Enter ROS MODE) operation.

Serializer Net

As shown in FIG. 23 a typical path from a system element (register flip-flop *f*) to the "Serialized Data" entry line 324 to the console (FIG. 8B) would consist of one leg of a pyramid of NAND-NOR gating, spatially integrated with the circuits including the circuit *f*, and terminating in the single output line connecting to the console "Serialized Data" input line 324. The pyramid is controlled by outlet of the decoding network fed by selection lines 600 from the console clock, bit ring, and byte counter.

Conclusion

There has been described herein an environmental data processing system and an adapter and console unit particularly effective in testing and servicing the system. The adapter is very simply constructed and presents a bit-serial interface between the system and external test equipment. The adapter is capable of transferring data between the external equipment and a passive or disabled system, using portions of the data received from the external equipment as controlling commands. The adapter performs comparison operations in response to certain commands. The adapter and system are also organized to transfer data with the system assuming an active controlling role.

While the adapter, console unit and associated system hereof have been shown and particularly described here with reference to a preferred embodiment it will be understood by those skilled in the art that numerous changes in form and detail may be made therein without departing from the spirit and scope of the invention as set forth in the following claims.

What we claim is:

1. In a data processing system an adapter unit attachment to the system which is dedicated primarily to input/output of signals between system components and external equipment for system maintenance purposes comprising:
   means for receiving signals from said external equipment, said signals including intermixed command signals and test-related signals; and
   means coupled to said receiving means and responsive directly to said intermixed command signals to control said adapter unit
   to perform selective test operations relative to said system said operations including transferral of said test-related signals without intervening storage in system program storage from said receiving means to a select set of components in the control section of said system.

2. In the adapter of claim 1 a terminal for external signal transmission;
   means for collecting status signals from a multiplicity of components of said system; and
   means cooperative with said test operation performing means in response to particular said command signals received by said receiving means to transmit a series of signals corresponding to said status signals from said status signal collecting means to said terminal.

3. In the adapter of claim 2:
   means for disabling said test operation control means; and
   means controlled by the internal sequence controls of said system to initiate operations of said collecting means to accomplish external transmission of said status signals from said system.

4. In combination with the adapter of claim 1:
   main program storage means of said system; and
   means cooperative with said receiving means during normal operations of said system to request signal transfers intermittently from said receiving means to said main storage means whereby in effect the adapter forms an externally controlled supplemental input/output channel between external signal sources and the system.

5. In a data processing system including cyclic control means for controlling elemental clocking and gating functions of the system, said control means having enabled and disabled states of operation, a universal diagnostic test adapter comprising:

first and second registers;

an external signal source;

means for coupling said external signal source to said first register;

first means responsive to a predetermined first signal in said first register to transfer the content of said first register to said second register;

second means responsive to the presence of one of a plurality of predetermined second signals in said first register to perform a test operation upon said system control means, while said control means is otherwise in said disabled state of operation, said second means being effective to transfer signals from said second register to said control means, whereby an initial test state of operation is established in said control means, and to compare status signals emanating from said control means with pass/fail reference signals supplied to one of said registers from said external source.

6. The adapter of claim 5 in a system including manual control elements on an exterior system panel and associated internal circuits for controlling single cycle operations of the system, wherein said second means includes:

means for emitting a discrete impulse in response to the presence of a particular said second predetermined signal in said first register; and means for transferring said impulse to said single cycle control circuits to induce a single cycle operation of said system simulating an operation of said manual control elements.

7. The adapter of claim 5 wherein said second means includes:

means for conditioning the said control means from its said disabled to enable state of operation while preventing changes in the cyclic state of the control means; and means responsive to a particular second predetermined signal in said first register to operate said means for conditioning for a limited period terminating with the appearance of a third predetermined external signal in said first register.

8. The adapter of claim 5 wherein said second means includes:

means responsive to the presence of a particular one of said predetermined second signals in said first register to compare an external pass/fail reference signal concurrently present in said first register to a signal emanating from and representing the instantaneous state of said system control means; and means responsive to a mismatch output of said means to compare to disable said adapter unit, whereby the state of said system when the mismatch occurred may be preserved for further examination.

9. In a data processing system including cyclic control means having enabled and disabled states of operation, a universal test adapter for coupling external devices to said control means, while the latter is in said disabled state of operations, said adapter comprising:

first and second registers;

means for receiving signals from sources external to said system;

means for coupling said received external signals to said first register;

means responsive to the presence of external signals of a first kind in said first register to transfer signals from said first register to said second register; and means responsive to the presence of external signals of a second kind in said first register to initiate selective control operations, in respect to either said adapter, said system or a said source of said external signals, in accordance with a portion of said signals of a second kind in said first register.

10. The adapter as defined in claim 9 wherein said system control means includes a read-only control store ROS having a buffer control storage register for receiving control microinstruction outputs of the store and a buffer address register connected to said output register for receiving address representations designating locations of next to be selected control microinstructions in said store, said adapter including:

means for transferring signals selectively from said second register of said adapter to all stages of said buffer control storage register; and means included in said means responsive to signals of said second kind for initiating subsequent to a said transfer to said control storage register an "ENTER ROS" mode of operation transferring said system control means from the disabled state to the enabled state.

11. An adapter according to claim 9 wherein said means responsive to external signals of a second kind in said first register includes:

means for selectively monitoring the instantaneous states of operation of byte groups of system elements, including, but not restricted to, elements of said system control means;

means coupled to said monitoring means and responsive to a particular signal of said second kind in said first register to control said monitoring means to select a byte group of system element states for monitoring; and means responsive to the same particular signal of said second kind in said first register to compare said selected byte group of system element states to respective signals in said second register representing a reference byte group.

12. An adapter according to claim 9 wherein said means responsive to predetermined external signals of said second kind in said first register includes:

a manual rate switch; and means responsive to a particular signal of said second kind and the condition of operation of said manual switch to initiate repetition of an earlier transmission of signals from an external source to said first register, whereby a sequence of test operations upon said system may be cyclically repeated.

13. An adapter according to claim 9 wherein said means responsive to said signals of a second kind in said first register includes:

means for forcing an error condition in a remote input-output element of said system in response to the presence of a predetermined signal of said second kind in said first register.

14. In a data processing system of circuit components arranged in LSI packages, and including an operator's console unit with associated integrated circuit packages and panel structures devoted to manual control and indication functions of the system, a status handling subsystem to control collection of status signals from system components in said console unit, for purposes of: monitoring status log information at said panel, staging status log information for distribution to external equipment and preserving status information for reapplication to said system, comprising:

a status signal line;

a converging network of connecting circuits connecting multiple circuit elements of said system to said line, portions of said network being spatially integrated in the LSI packages containing respective said system circuit elements;

a network of decoding-selecting gates coupled to and spatially integrated in unit packages with said network of connecting circuits;

receiving circuits in said operator's console unit;

means connecting said line to said receiving circuits in said console unit;

control circuits in said console unit;

a plurality of control conductors connecting said control circuits in said console unit to said network of decoding-selecting gates in said system; and means in said console unit for operating said control circuits to transfer a series of encoded selection control signals to said plurality of control conductors to establish thereby paths for selective bit-serial transmission of binary state signals through said network of connecting gates between a corresponding series of binary components of said system and said receiving circuits in said console unit.

15. The status handling subsystem of claim 14 including:

a buffer store contained within said console unit, said buffer store having the capacity to store series of status signals;

means in said console unit for transferring a said series of status signals, received in said receiving circuits from said series of elements, to predetermined locations of said buffer store in a predetermined sequence; and means associated with said console unit control circuits and said transfer operating means to produce and transfer an aggregate status log of said system elements to said buffer store via said receiving circuits.

16. The status handling subsystem of claim 15 including means for transferring status signals from said console buffer store selectively to indicating elements on the panel of said console unit, to equipment external to said system and to storage elements of said system.

17. In a data processing system in combination a maintenance section including status collection and test adapter subsections including:

a console unit in the collection subsection including a buffer input register, a matrix buffer store coupled to the output of the input register, means for scanning system component state signals into said input register in a predetermined sequence, and a panel display coupled to the output of the buffer store;

means for transferring said system component state signals directly from said console unit buffer input register and indirectly from said buffer store into said test adapter subsection;

first and second buffer registers in said adapter subsection; and means in said adapter subsection and console unit responsive to a signal in said first register of said adapter and cooperative with said transferring means to transfer said system state signals in said predetermined sequence from said console unit to said second register in said adapter subsection.

18. A status collection and adapter combination as defined in claim 17 and including means in said adapter coordinated with the transfer means last mentioned in claim 17 to transfer said signals received in said second register to an external transmission medium in a standardized bit-serial transmission format whereby system status signals are transmitted for external collection.

19. The subsystem defined in claim 18 including means in said adapter and console unit responsive to address signals received in said first register of said adapter to select an initial state signal position in said predetermined scanning sequence as a starting position for said transfer to said second register.

20. The subsystem of claim 18 wherein said adapter includes:

means coordinated with the means to transfer signals from the second register to the said external transmission medium, for calculating and transmitting new check signals to supplement respective groups of signals transmitted from the second register;

a third register;

means coupled to said console unit to receive and transfer earlier calculated check signal information from said console unit to selected sections of said third register, and means coordinated with the said means transferring said state signals to said second register, to intermittently transfer groups of said earlier-calculated check signals from said third register to said second register to effectively cause alternate and discretely separate transmission of groups of state and earlier supplemental check each group containing respective new check signals to supplement the group.

21. In a data processing system including system controls—said controls including a read-only store matrix for producing microinstruction control signals, an output buffer register coupled to said matrix for holding a microinstruction signal for controlling system gates for one discrete cycle of system operation, an address buffer register coupled to said output buffer register and other elements of said system for selecting successive microinstruction signals from random positions in said matrix, and a source of clock impulses for defining the discrete cycles of operation of the said system—a test adapter for connecting external test equipment to said system for testing said system, said adapter comprising:

first and second registers;

means for coupling signals from said external test equipment to said first register;

means responsive to signals in said first register to transfer signals from said first register to said second register;

means responsive to signals in said first register to transfer signals from said second register to said output buffer register of said read-only store matrix of said system;

means operative concurrently with said last-mentioned means in response to signals in said first register to initiate a discrete cycle of operation of said system while said source of clock impulses is blocked and disabling said system and while the coupling between said read-only store matrix and said output buffer register thereof is also held blocked;

means operative concurrently with said last-mentioned means for comparing a signal entered into said address buffer register with a signal stored in said first register; and means responsive to a mismatch output of said comparing means to prevent further operation of said cycle initiating means.

22. An adapter, as defined in claim 21, in combination with:

third and fourth registers;

means responsive to signals in said first register to transfer concurrently status signals from said data processing system to said third register and check signals from said data processing system to said fourth register; and means coordinated with said last-mentioned means to alternately transmit to said external equipment plural groups of said status signals received in said third register and single groups of associated check signals.

23. An adapter as defined in claim 21 in combination with:

means for selectively monitoring status signals within said system in byte groups in accordance with byte selection information received in said first register; and means coupled to said monitor means and responsive to control signals in said first register to compare said selected status signal groups to signals stored in said second register of said adapter unit.

24. An adapter as defined in claim 21 in which said read-only store matrix output buffer is subdivided into a plurality of sections;

said second register of said adapter unit is subdivided into a plurality of subsections; and said means for transferring signals from said first register to said second register in said adapter unit is effective to selectively transfer said signals to said subsections of said second register.

25. An adapter as in claim 24:

wherein said means for transferring signals from said second register to said output buffer register of said matrix includes gating means spatially integrated with the circuits of said buffer register and matrix for selectively transferring said second register signals to sections of said output buffer register.

26. An adapter as defined in claim 25 wherein.
said means for transferring between said first register and second register of the adapter and between said second register of the adapter and output buffer register of the read-only store matrix are adapted to modify a selected portion or the whole of the contents of the output buffer store of the read-only store data matrix prior to initiation of a said cycle of operation of said system.

27. In a data processing system an externally controllable test adapter section to carry test-related binary signals bidirectionally between elements of said data processing system and equipment external to said system for the purpose of remotely testing said system in response to signals sent from said equipment, said adapter section having input signal connections only to a select nucleus of components in the control section of said system for relaying test signals from said equipment to said components under control of said equipment, said adapter section having output connections to components of said system including but not restricted to said nucleus for collecting state signals from said components and for incorporating such signals in transmissions to said external equipment.

28. As an auxiliary physical appendage and electrically connected service feature of a data processing system an externally controllable adaptive signal converter unit comprising:
a buffer register;
means for connecting outputs of said register with select groups of internal elements of said system;
a signal receiver for receiving coded signals, including distinctively coded unit command signals and system stimuli signals, from external equipment physically removed from said unit and system;
means responsive to the codes of said received stimuli signals to selectively transfer said stimuli signals into said buffer register, and
means responsive to certain of said unit command signals to operate said output connecting means to transfer said stimuli signals from said buffer register to said internal system elements without assistance from the system.

29. In combination with a data processing system an externally controllable test adapter unit incorporated in the system as a common service feature of the system comprising:
means for receiving intermixed test stimuli signals and coded command signals from equipment physically removed from said system; and
means responsive to said command signals for controlling testing of said system by coupling said stimuli signals to select control components of said system to stimulate said components to produce artificial test states in said system.

30. An adapter unit according to claim 29 wherein said means for controlling testing includes means responsive to particular said command signals for collecting test response signals from said system.

31. An adapter unit according to claim 30 wherein said means for controlling testing includes means for transmitting said collected test response signals to a said removed equipment for evaluation.

32. An adapter unit according to claim 31 including input and output timing circuit sections for controlling the operations of said respective receiving and transmitting means.